United States Patent
Joao

(10) Patent No.: US 12,412,440 B2
(45) Date of Patent: Sep. 9, 2025

(54) APPARATUS AND METHOD FOR PROVIDING AND/OR FOR FACILITATING SECURED AND/OR ON-LINE CAMPAIGNS, ELECTIONS, AND/OR VOTING ACTIVITIES

(71) Applicant: Raymond Anthony Joao, Yonkers, NY (US)

(72) Inventor: Raymond Anthony Joao, Yonkers, NY (US)

(*) Notice: Subject to any disclaimer, the term of this patent is extended or adjusted under 35 U.S.C. 154(b) by 211 days.

(21) Appl. No.: 17/365,094

(22) Filed: Jul. 1, 2021

(65) Prior Publication Data
US 2022/0051503 A1 Feb. 17, 2022

Related U.S. Application Data

(60) Provisional application No. 63/064,046, filed on Aug. 11, 2020.

(51) Int. Cl.
*G07C 13/00* (2006.01)
*G06F 16/23* (2019.01)
*G06K 7/10* (2006.01)

(52) U.S. Cl.
CPC ......... *G07C 13/00* (2013.01); *G06F 16/2365* (2019.01); *G06K 7/10366* (2013.01); *G06Q 2230/00* (2013.01)

(58) Field of Classification Search
CPC ............... G07C 13/00; G06F 16/2365; G06K 7/10366; G06Q 2230/00
See application file for complete search history.

(56) References Cited

U.S. PATENT DOCUMENTS

| 5,218,528 A | 6/1993 | Wise et al. |
| 5,400,248 A | 3/1995 | Chisolm |

(Continued)

FOREIGN PATENT DOCUMENTS

| DE | 3410381 A1 | 9/1984 | |
| WO | WO-00/28486 A1 | 5/2000 | |
| WO | WO-2015060787 A1 * | 4/2015 | ............. G06Q 30/02 |

OTHER PUBLICATIONS

Joe Liebkind, "How Blockchain Technology Can Prevent Voter Fraud", Oct. 5, 2017 (Year: 2017).*

(Continued)

*Primary Examiner* — Neha Patel
*Assistant Examiner* — Timothy Paul Sax
(74) *Attorney, Agent, or Firm* — Raymond A. Joao, Esq.

(57) ABSTRACT

An apparatus, including: a receiver; processor; distributed ledger and Blockchain technology system; and transmitter. The receiver receives a request for an e-voting ballot regarding an election. The e-voting ballot contains information regarding the elected office race or referendum issue in the election, and a link or hyperlink to information regarding a candidate or referendum issue. The apparatus receives a digital file, containing information regarding a picture, photograph, or video clip, of the individual. The processor transmits the e-voting ballot to a user device. The apparatus transmits a voter account use message and the digital file to the user device. The apparatus receives and stores information regarding a vote or votes cast pursuant to the e-voting (Continued)

ballot. The apparatus stores the information regarding the vote or votes cast in the distributed ledger and Blockchain technology system. The apparatus transmits a vote confirmation message to the user device.

21 Claims, 31 Drawing Sheets

(56) References Cited

U.S. PATENT DOCUMENTS

| | | | |
|---|---|---|---|
| 5,636,346 A | 6/1997 | Saxe | |
| 5,875,432 A | 2/1999 | Sehr | |
| 5,878,399 A | 3/1999 | Peralto | |
| 7,237,717 B1* | 7/2007 | Rao | H04L 67/06 235/386 |
| 11,100,743 B1* | 8/2021 | Sealy | H04L 9/0825 |
| 2002/0029163 A1 | 3/2002 | Joao | |
| 2012/0144458 A1* | 6/2012 | Mechaley, Jr. | G06F 21/43 726/5 |
| 2012/0233253 A1* | 9/2012 | Ricci | G06Q 30/0241 709/204 |
| 2013/0317887 A1* | 11/2013 | Rhodes | G06Q 30/0205 705/7.34 |
| 2015/0221153 A1* | 8/2015 | Dashiff | G07C 13/00 705/12 |
| 2017/0011576 A1* | 1/2017 | Scotson | H04L 63/0861 |
| 2018/0350180 A1* | 12/2018 | Onischuk | G07C 13/00 |
| 2019/0213821 A1* | 7/2019 | Davis | H04L 9/3239 |
| 2019/0288846 A1* | 9/2019 | Zawierka | G06Q 30/00 |
| 2020/0151989 A1* | 5/2020 | Gorenstein | G06F 21/604 |
| 2023/0169436 A1* | 6/2023 | Matsumoto | G06Q 10/06 705/7.39 |

OTHER PUBLICATIONS

Strummer, Democrat network launch online campaign center, Nov. 19, 1999, Newsbytes PM [Retrieved Jun. 24, 2005 from DIALOG File 16:06818023] (1 page).
Gralla, How the internet works millennium edition, 1999, Que, p. 22-23 (4 pages).
TIAA-CREF offers online proxy materials, Oct. 4, 1999, FinancialNetNews, v.IV, n.40, p. 5 [Retrieved Jun. 24, 2005 from DIALOG File 9:01968541] (1 page).
Jordan, California group to explore computer, online voting possibilities, Jan. 19, 2000, Knight-Ridder Tribune Business News, San Jose Mercury News—CA (Cont.).
Jordan (Cont.) [Retrieved Jun. 24, 2005 from DIALOG File 20:09181313] (2 pages).
Barkham, Click the vote: is there anything behind the government's bluster about e-government?, Apr. 27, 2000, Guardian [retrived Jun. 24, 2005 from DIALOG File20:10754102] (2 pages).
Internet Policy Institute to hose online voting workshop, Jul. 31, 2000, Pr Newswire [Retrieved Jun. 24, 2005 from DIALOG File 20:12178335] (2 pages).
Vote with your mouse, 16MAR2000, Computer Weekly, v.25 [Retieved Jun. 24, 2005 from DIALOG File275:02387734] (1 page).
Jordan, Caucus campaigns for 'all things Internet' as San Jose convention, Feb. 12, 2000, San Jose Mercury News, ed.morning final, sec.front, p. 1A [Retrieved Jun. 24, 2005 (Cont.).
Jordan (Cont.) from DIALOG File 634:10543026] (2 pages).

* cited by examiner

APPARATUS AND METHOD FOR PROVIDING AND/OR FOR FACILITATING SECURED AND/OR ON-LINE CAMPAIGNS, ELECTIONS, AND/OR VOTING ACTIVITIES

RELATED APPLICATIONS

This application claims the benefit of the priority of U.S. Provisional Patent Application Ser. No. 63/064,046, filed Aug. 11, 2020, and entitled "APPARATUS AND METHOD FOR PROVIDING AND/OR FOR FACILITATING SECURED AND/OR ON-LINE CAMPAIGNS, ELECTIONS, AND/OR VOTING ACTIVITIES", the subject matter and teachings of which are hereby incorporated by reference herein in their entirety.

FIELD OF THE INVENTION

The present invention pertains to an apparatus and method for providing and/or for facilitating secured and/or on-line campaigns, elections, and/or voting activities and, in particular, the present invention pertains to an apparatus and method for providing and/or for facilitating secured and/or on-line campaigns, elections, and/or voting activities, which facilitates and/or provides for the administration, oversight, conducting and/or holding, of elections for public office, pubic elections, private elections, entity or organizational elections, voting activities regarding contests, tournaments, competitive events, or pageants, of any type or kind, voting and/or polling activities in marketing campaigns, and/or in conducting polling activities and/or in conducting surveys or any type or kind, which utilize distributed ledger and blockchain technologies so as to ensure the security and integrity in the activities regarding and surrounding the same and/or in order to provide for the security and/or integrity of the same and/or the results of the same.

BACKGROUND OF THE INVENTION

Elections and campaigns for elections are most important in the society in which we live. Elections for public office and their associated campaigns are an essential part of our lives. Elections for public office and their associated campaigns play a crucial role in allowing members of a political jurisdiction or subdivision to select those individuals and/or groups of individuals who govern them. Elections and/or campaigns regarding the same can also play key roles in private organizations, business organizations, academic organizations, and in other entities, as well as in marketing campaigns, in polling, in conducting surveys, and in judging certain competitions, tournaments, pageants, and other events and/or activities.

Since elections, and their associated campaigns, carry such importance in the many aspects of our lives, it is essential that the integrity of elections and the voting in the same be maintained to the highest standards possible. The same holds true for all types of kinds of elections as well as in conduction marketing campaigns, in polling, in conducting surveys, and in judging competitions, tournaments, pageants, and other events and/or activities.

There can be no doubt that there are many problems associated with the conducting of elections, and with voting systems, in today's day of age. These include, at the very least, in-person voting voter fraud and mail-in ballot voting fraud.

It is submitted that in-person voting voter fraud can occur when individual voters are not properly vetted and identified at a polling location, when voters vote more than once, when individuals cast a vote(s) under or using different names, and/or when voting ballots and/or vote counts are falsely manipulated or changed by poll workers. It is also not uncommon for voter rolls to include the names of voters who no longer live or vote in a political subdivision, who have moved away, or who are deceased. The presence of the names of these individuals also contributes to the potential for in-person voting voter fraud. Health and/or security concerns, such as experienced during, and in connection with, the Coronavirus Global Pandemic of 2020 (COVID-19) could also cause many individuals to refrain from in-person voting as they may fear for their individual health and/or individual safety. There is no doubt that many other forms of in-person voting fraud or voter fraud can also exist, thereby adversely affecting the integrity of an election or campaign.

It is also submitted that mail-in ballot voting voter fraud can occur when individuals do not receive their paper ballot in the mail, when someone else uses the paper ballot of another to cast a vote, when mail-in ballots are lost or delayed in or by the mail, and/or when counterfeit mail-in paper ballots are mailed in for an election. Mail-in voting also presents the problem that another individual in a household might vote for an individual voter and/or that another individual might coerce an individual to vote against his or her chosen candidate or platform. There is no doubt that many other forms of mail-in ballot voting fraud or mail-in voter fraud can also exist, thereby adversely affecting the integrity of an election or campaign.

Aside from the foregoing, many other problems are associated with elections and voting systems. Election practices which require that candidates obtain a number of minimum petition signatures in order to quality as a candidate in an election, or election issues or referendums that require a minimum number of petition signatures be obtained in order to be placed on an election ballot, can be further obstacles for a candidate or issue, as obtaining the required number of signatures can most often require the expenditure of time and expensed to obtain in-person signatures from registered or qualified voters. Many times, people are simply not home, do not want to sign their names on sometimes papers, offered by strangers, which they neither know about nor understand. Many times, people cannot be bothered and/or do not want to open their home doors to, or engage in in-person interactions, with strangers and/or with others.

Another problem with today's elections and/or voting systems lies with the fact that many individuals may not be acquainted with the candidates and/or issues that are voting on.

It is submitted that the above-described shortcomings of today's election systems and/or practices and/or today's voting systems and/or practices are just some of the examples of the many practices and things which can have a negative impact upon, and/or adversely affect, the integrity of any type or kind of election or voting system. In this regard, until rectified or alleviated, the many shortfalls which exist in current election systems and/or voting systems will continue to pose a threat to the integrity of elections or voting activities.

SUMMARY OF THE INVENTION

The present invention pertains to an apparatus and method for providing and/or for facilitating secured and/or on-line campaigns, elections, and/or voting activities and, in particular, the present invention pertains to an apparatus and method for providing and/or for facilitating secured and/or on-line campaigns, elections, and/or voting activities, which facilitates and/or provides for the administration, oversight, conducting and/or holding, of elections for public office, pubic elections, private elections, entity or organizational elections, voting activities regarding contests, tournaments, competitive events, or pageants, of any type or kind, voting and/or polling activities in marketing campaigns, and/or in conducting polling activities and/or in conducting surveys or any type or kind, which utilize distributed ledger and block-chain technologies so as to ensure the security and integrity in the activities regarding and surrounding the same and/or in order to provide for the security and/or integrity of the same and/or the results of the same, which overcomes the shortcomings of the prior art.

The present invention can be utilized in a variety of ways in order to allow public and/or private entities to organize, administer, conduct, and/or oversee, elections, campaigns, contests, tournaments, competitions, pageants, marketing campaigns, polling activities or polls, and/or survey activities or surveys, of all types or kinds in a secured and efficient manner and so as to provide for the protection of the integrity of the same.

The present invention can also be utilized in a variety of ways in order to allow public and/or private entities to organize, administer, conduct, and/or oversee, any and/or all of the aspects of, and/or activities regarding or relating to, elections, campaigns, contests, tournaments, competitions, pageants, marketing campaigns, polling activities or polls, and/or survey activities or surveys, including, but not limited to, the collection and submission of nominating petitions by a candidate, the submission of financial reports for a campaign or candidate, the dissemination of campaign and/or election materials and/or information, the dissemination of information relating to elections, campaigns, contests, tournaments, competitions, pageants, marketing campaigns, polling activities or polls, and/or survey activities or surveys, the conducting of elections online in a secured manner, the registering and the counting of votes and/or ballots in an election using a distributed ledger and/or blockchain technology system, the providing of on-line or virtual forums and/or town hall meetings in, during, or relating to, campaigns, and/or the providing of any number of a variety of activities and/or services relating to elections, campaigns, contests, tournaments, competitions, pageants, marketing campaigns, polling activities or polls, and/or survey activities or surveys.

The present invention can be utilized in connection with public elections, private elections, corporate governance elections, school, organization, club, or association, elections, and/or in any campaigns, contests, tournaments, competitions, pageants, marketing campaigns, polling activities or polls, and/or survey activities or surveys, which involve the need to maintain integrity in participation, information dissemination, and/or in the counting and/or tallying of votes, ballots, and/or election or other votes and/or ballots.

The apparatus of the present invention includes a central processing computer and distributed ledger and Blockchain technology system which includes a central processing computer or central processing computer system and a distributed ledger and Blockchain technology system. The central processing computer can be any computer or computer system or can be any server computer or any computer or computer system which can be used in a communication network. Any number of central processing computers, and any number of central processing computer/distributed ledger/Blockchain technology systems, can be utilized in conjunction with, or in connection, with the apparatus of the present invention. The central processing computer can provide control over the apparatus and can perform any of the various processing services and/or functions described herein as being performed by the present invention.

The apparatus of the present invention also includes a user communication device which is associated with, or which can be used by, any one or more of any of the herein-described users, individuals, persons, or entities, who or which utilize the present invention. Any number of user communication devices can be utilized in conjunction with, or in connection with, the apparatus of the present invention.

The apparatus of the present invention also includes a campaign/project manager computer which is associated with, or which can be used by, any one or more of any of the herein-described campaign managers or project managers and/or campaign or project managing entities who or which utilize the apparatus of the present invention. The campaign/project manager computer can be associated with a candidate, a campaign manager, a staff member, a coordinator, and/or any other individual and/or entity who or which is involved in the managing of, the coordinating or coordination of, the providing of support services for, and/or otherwise working for or on, a campaign or campaigns of a candidate and/or a group of candidates, a political cause, a private cause, or any other matter, for any type or kind of campaign(s) and/or election(s). Any number of campaign/project manager computers can be utilized in conjunction with, or in connection with, the apparatus of the present invention.

The apparatus of the present invention also includes one or more public election administrator/governmental entity computers, with each public election administrator/governmental entity computer being associated with a public election administrator or administrative entity, or a governmental entity, such as, for example, an board of elections of or for a political subdivision or geographic area, an elections officer, an elections commissioner, and/or any other individual and/or entity who or which oversees and/or administers public elections. The public election administrator/governmental entity computer can be associated with, and/or can be utilized by, any elections administrator, elections commission, elections administrator, elections commissioner and/or the commissioner's aides, administrative board, board of elections, and/or a federal government, department, bureau, or agency, a state or provincial government, department, bureau, or agency, or a local or municipal government, department, bureau, or agency, and/or and other individual and/or entity that oversees, administers, or monitors, elections for public offices and/or any other public elections or matters. Any number of public election administrator/governmental entity computers can be utilized in conjunction with, or in connection with, the apparatus of the present invention.

The apparatus also includes one or more private election administrator computers, with each private election administrator computer being associated with a private election administrator or administrative entity, such as, for example, a company, a business, a trade association, a professional association, a school, a union, a private organization, a quasi-private organization, a civic association, a subdivision or geographic area or a political subdivision or geographic area, an elections officer, an elections commissioner, and/or any other individual and/or entity who or which oversees and/or administers private elections. Any number of private election administrator computers can be utilized in conjunction with, or in connection with, the apparatus of the present invention.

The apparatus also includes one or more provider computers, with each provider computer being associated with a provider of any goods, products, and/or services, which can be utilized in any campaigns, campaigning, electioneering, promotional, and/or in any other related, activities. Any number of provider computers can be utilized in conjunction with, or in connection with, the apparatus of the present invention.

The apparatus also includes one or more media computers, with each media computer being associated with a media service, a news broadcaster, a television broadcaster, a radio broadcaster, an Internet streaming service or broadcaster, a podcaster service, a news service, and/or a print news service, such as, but not limited to, a television network or station, a radio station, an on-line news website, the press, a press media service, a newspaper, a magazine, a flier, a press service, a television news service, a radio news service, a broadcast service, and/or any other media service, journalistic service, news media service, news bureau, and/or any other service or entity which can provide media, content, or news, of any type or kind (hereinafter also referred to as a "media provider"), as well as receive and/or disseminate news, press releases, and/or any other information, from and/or to, respectively, any of the computers or communication devices described herein as well as any of the users or parties described herein. Any number of media computers can be utilized in conjunction with, or in connection with, the apparatus of the present invention.

The apparatus of the present invention also includes one or more external information source computers, with each external information source computer being associated an external information source. Each external information source computer can also be associated with any number of external information sources, depending upon the desired application. The external information source can be any third party information source, information provider, news service, third party individual, organization, association, civic organization, civic association, union, trade union, event planner, scheduling entity, and/or any other individual and/or entity which may provide information to any of the herein-described individuals and/or entities who or which utilize the apparatus of the present invention. Any number of external information source computers can be utilized in conjunction with, or in connection with, the apparatus of the present invention.

The apparatus of the present invention can also include one or more social network computers, each of which can be associated with a social networking company, a social networking website, or social networking entity, website, group, organization, or association. Any number of social network computers can be utilized in connection with, or in conjunction with, the apparatus of the present invention.

The apparatus of the present invention can also include one or more financial institution computers, with each financial institution computer being associated with a financial institution, a group of financial institutions, and/or any of the individuals and/or entities who or which utilize the present invention. Each financial institution computer can also be associated with any one or more, or any number of, any of the governmental entities, boards of elections, public entities, private entities, public election administrators, private election administrators, providers, media providers, external information sources, social networks, campaign/project managers, candidates, campaigns, elections, individuals and/or other entities, described herein. In a preferred embodiment, the financial institution computer(s) can be utilized in order to manage and/or to administer, and/or to maintain, a financial account or financial accounts for any of governmental entities, boards of elections, public entities, private entities, public election administrators, private election administrators, providers, media providers, external information sources, social networks, campaign/project managers, candidates, campaigns, elections, individuals and/or other entities, described herein. Any number of financial institution computers can be utilized in conjunction with, or in connection with, the apparatus of the present invention.

Each of the user communication devices, the campaign/project manager computers, the public election administrator/governmental entity computers, the private election administrator computers, the provider computers, the media computers, the external information source computers, the social network computers, and/or the financial institution computers, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any user, individual, person, or entity, who or which utilizes the present invention, or can be a server computer, a mainframe computer, a mini-computer, a microcomputer, or any other computer or device for suiting the needs of the particular user, or can be any device or computer, or a kiosk, which can be located at public places or locations or which can also be publicly available.

The apparatus of the present invention can also include any number of RFID tags/RFID reader system(s), each of which can include any number of RFID tags and RFID reader systems. The RFID tags/RFID reader system(s) can be utilized in or for any number of a variety ways as described herein and/or otherwise.

Any individual who is registered to vote in any jurisdiction, or who is registered to use the apparatus of the present invention in order to vote in, or to take part in voting in, any election, campaign, contest, competition, tournament, pageant, poll, and/or survey, can be assigned a voter account or any number of voter accounts. Any governmental entity, board of elections, public entity, private entity, public election administrator, private election administrator, provider, media provider, external information source, social network, campaign/project manager, candidate, campaign, election, individual and/or other entity, described herein, who or which utilizes the apparatus of the present invention, can also be assigned a user account or user accounts.

An RFID tag can be assigned to any individual who is registered to vote in any jurisdiction, or who is registered to use the apparatus of the present invention in order to vote in, or to take part in voting in, any election, campaign, contest, competition, tournament, pageant, poll, and/or survey. The RFID tag can also be assigned to, or associated with, the individual's voter account or voter accounts (or, in other words, the voter account or voter accounts of the individual). An RFID tag can also be assigned to any governmental entity, board of elections, public entity, private entity, public election administrator, private election administrator, provider, media provider, external information source, social network, campaign/project manager, candidate, campaign, election, individual and/or other entity, described herein, who or which utilizes the apparatus of the present invention. An RFID tag can also be assigned to, or associated with, the user account or user accounts of the governmental entity, board of elections, public entity, private entity, public election administrator, private election administrator, provider, media provider, external information source, social network, campaign/project manager, candidate, campaign, election, individual and/or other entity.

The RFID tag described herein can be provided in or as a physical identification card or other physical item or device, and/or can be attached to, or located within, an article of clothing, a watch, a necklace, a bracelet, an ankle bracelet, a ring, an article of jewelry, or any other wearable article or item. The RFID tag can also be implantable within an individual or patient. The RFID tag can also be provided in or as a physical identification card, attached to, or located on or within, a cellular telephone, a smart phone, a Smartphone, a personal digital assistant, or any other personal article or item.

An RFID reader system, or any RFID reader or RFID readers of same, can be located at any election polling site, election venue, election kiosk, voting site, voting venue, voting kiosk, voting machine, vote counting or vote submission machine or device, polling or survey site, polling or survey venue, polling or survey kiosk, and/or polling or survey machine or device. For example, an RFID reader system can located at, or assigned to, an in-person voting venue or location or an in-person polling venue or location. An RFID reader system, or any RFID reader or RFID readers of same, can also be located on or implemented with any communication device, computer, computer peripheral device, cellular telephone, smart phone, personal digital assistant, or any other device of or associated with, any individual, governmental entity, board of elections, public entity, private entity, public election administrator, private election administrator, provider, media provider, external information source, social network, campaign/project manager, candidate, campaign, election, and/or other entity, who or which utilizes the apparatus of the present invention. Each RFID reader system can include any number of RFID readers.

The RFID tag/RFID reader system(s), and any RFID tags and any RFID reader system(s) of same, can be utilized for identifying, verifying the identification of, and/or for accessing, any data and/or information, and/or any voter account(s) or any user account(s) of, associated with, corresponding to, or regarding, any individual, governmental entity, board of elections, public entity, private entity, public election administrator, private election administrator, provider, media provider, external information source, social network, campaign/project manager, candidate, campaign, election, and/or other entity, who or which utilizes the apparatus of the present invention. In this regard, the RFID tag/RFID reader system(s) can be utilized in order to ensure identity verification and use of respective the herein-described voter accounts and/or user accounts so as to better ensure integrity in the use of the herein-described voter accounts and/or user accounts and/or so as to better ensure the integrity of the election, voting, polling, and/or survey, activities, in or with which the apparatus of the present invention can be utilized.

Each of the herein-described user communication devices, campaign/project manager computers, public election administrator/governmental entity computers, private election administrator computers, provider computers, media computers, external information source computers, social network computers, financial institution computers, and/or RFID tags/RFID reader system(s), can be connected to, and/or linked with, the central processing computer/distributed ledger/Blockchain technology system and/or with each other using any suitable and/or appropriate wired connection, wireless connection, or any combination of same, on, via, or using, any suitable and/or appropriate communication network or any combination of communication networks.

Each of the central processing computer/distributed ledger/Blockchain technology system(s), and/or the central processing computer(s) of same, the user communication devices, the campaign/project manager computers, the public election administrator/governmental entity computers, the private election administrator computers, the provider computers, the media computers, the external information source computers, the social network computers, the financial institution computers, and/or the RFID tags/RFID reader system(s), can communicate with each other in a bi-directional manner, and can transmit data and/or information to, as well as receive data and/or information from, each other and/or any other central processing computer/distributed ledger/Blockchain technology system(s), and/or the central processing computer(s) of same, the user communication devices, the campaign/project manager computers, the public election administrator/governmental entity computers, the private election administrator computers, the provider computers, the media computers, the external information source computers, the social network computers, the financial institution computers, and the RFID tags/RFID reader systems.

The apparatus and methods of the present invention can be utilized on, and/or over, the Internet and/or the World Wide Web. The apparatus of the present invention can also utilize wireless Internet and/or World Wide Web services, equipment and/or devices. The central processing computer(s) can also have a website or websites associated therewith. Each of the user communication devices, the campaign/project manager computers, the public election administrator/governmental entity computers, the private election administrator computers, the provider computers, the media computers, the external information source computers, the social network computers, and/or the financial institution computers, can also have a website or websites associated with the same.

The present invention can be utilized with any appropriate communication network or system including, but not limited to, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, bluetooth communications network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks, systems, or technologies.

Each of the user communication devices, the campaign/project manager computers, the public election administrator/governmental entity computers, the private election administrator computers, the provider computers, the media computers, the external information source computers, the social network computers, and/or the financial institution computers, can include a central processing unit or CPU, which can be a microprocessor, or which can be a component of a microcomputer, a minicomputer, a macro-computer, and/or a mainframe computer, depending upon the application, a random access memory device(s) (RAM) and a read only memory device(s) (ROM), and a user input device for entering data and/or information and/or commands into the respective computer or communication device.

Each of the user communication devices, the campaign/project manager computers, the public election administrator/governmental entity computers, the private election administrator computers, the provider computers, the media computers, the external information source computers, the social network computers, and/or the financial institution computers, can also include a display device for displaying data and/or information to a user or operator, a transmitter(s), for transmitting signals and/or data and/or information to any one or more of the herein-described computers or communication devices, a receiver, for receiving signals and/or data and/or information from any one or more of the herein-described computers or communication devices, and a database for storing any data, information, software programs, and/or software applications ("apps"), needed or desired for enabling the respective computer to communication device to perform any and/or or all of the functions and/or functionalities described herein as being capable of being performed by the respective computer or communication device and/or the apparatus of the present invention.

Each of the user communication devices, the campaign/project manager computers, the public election administrator/governmental entity computers, the private election administrator computers, the provider computers, the media computers, the external information source computers, the social network computers, and/or the financial institution computers, can also include an output device, a video and/or audio recording device(s), and a global positioning device.

The apparatus of the present invention can be utilized in order to provide a vast array of services, functions, and/or functionalities, regarding and/or relating to elections and/or campaigns for public offices, pubic elections, private elections, entity or organizational elections, voting activities regarding contests, tournaments, competitive events, competitions, and/or pageants, of any type or kind, voting and/or polling activities in marketing campaigns, and/or in conducting polling activities and/or in conducting surveys or any type or kind.

The apparatus of the present invention can be utilized by any governmental, public, or private, entity or organization, in order to provide, to administer, to oversee, and/or to conduct, an election or elections of any type or kind in a secured environment. In another preferred embodiment, the apparatus 100 and methods of the present invention can also be utilized in order to allow members of a voter group or a voting electorate to nominate a candidate or prospective candidate for any elected position or office by electronically signing, in any appropriate manner, the candidate's nominating petition for that elected position or office. The apparatus of the present invention can also be utilized to allow a prospective candidate for an elected position or office to circulate a nominating position to members of a voting group or electorate, provide information about himself or herself, engage with any member or members of the voting group or electorate, electronically collect electronic or other signatures for his or her nominating petition, and/or submit his or her nominating petition via the apparatus 100 of the present invention to the appropriate entity, organization, or authority.

The apparatus of the present invention can also be utilized in order to provide an on-line election and/or campaign forum for allowing members of a voting group or electorate to attend and/or to engage in virtual and/or on-line campaign events, on-line campaigning events or activities, on-line candidate events and/or debates, and/or online town hall meetings. In another preferred embodiment, the apparatus 100 and methods of the present invention can also be utilized in order to provide or transmit electronic notifications or notification messages to members of a voting group or an electorate regarding the scheduling and/or occurrences of elections and/or campaigns for public offices, pubic elections, private elections, entity or organizational elections, voting activities regarding contests, tournaments, competitive events, competitions, and/or pageants, of any type or kind, voting and/or polling activities in marketing campaigns, and/or in conducting polling activities and/or in conducting surveys or any type or kind, and/or the scheduling and/or occurrences of any activities or events relating thereto. The apparatus of the present invention can also provide members of a voting group or electorate with the ability to schedule an appointment to vote in or for an election, contest, tournament, competitive event, competition, and/or pageant, and/or in or for any marketing campaign, polling activity, or survey.

The apparatus of the present invention can also be utilized in order to provide campaign information, campaign-related information, and/or election information, for, or relating to, political campaigns, political elections, public election campaigns, public elections, private elections campaigns, private elections, and/or any other campaigns and/or elections, and/or any types or kinds of contests, tournaments, competitive events, or pageants, of any type or kind, and/or any types of kinds of voting and/or polling activities in marketing campaigns, and/or in conducting polling activities and/or in conducting surveys or any type or kind.

The apparatus of the present invention can also provide various types or kinds of information, as well as provide various information processing routines, for providing information and/or services for and/or related to campaigns, political campaigns, political elections, public election campaigns, public elections, private elections campaigns, private elections, and/or any other campaigns and/or elections, and/or any types or kinds of contests, tournaments, competitive events, or pageants, of any type or kind, and/or any types of kinds of voting and/or polling activities in marketing campaigns, and/or in conducting polling activities and/or in conducting surveys or any type or kind.

The apparatus of the present invention can also be utilized in order to provide campaign management information and/or information for assisting in managing a campaign and/or any contest, tournament, competitive event, or pageant, of any type or kind, and/or any type of kind of voting and/or polling activity in any marketing campaign, and/or in conducting a polling activity and/or in conducting a survey of any type or kind.

The apparatus of the present invention can also be utilized in order to generate, produce, and/or disseminate, campaign materials, campaign literature, and/or press releases. The apparatus of the present invention can be utilized in order to perform polling and/or surveys and/or to make the results of the respective polls and/or surveys available to any respective users of the present invention.

The apparatus of the present invention can also be utilized in order to perform targeted information dissemination such as campaign information dissemination, marketing information dissemination, and/or campaign and/or marketing mailings and/or e-mailings, as well as in order to perform fundraising activities and/or targeted fundraising activities. The apparatus and methods of the present invention can also be utilized as a clearinghouse for buying and/or selling campaign goods, campaign products, campaign services, campaign-related goods, campaign-related products, and/or campaign-related services, as well as for buying and/or selling any goods, products, or services, relating to or regarding any contests, tournaments, competitive events, or pageants, polling activities, marketing campaigns, and/or surveys.

The apparatus of the present invention can also be utilized in order to provide notification to a provider of campaign goods, campaign products and/or campaign services, and/or any other campaign-related goods, products, and/or services, and/or any other goods, products, or services, relating to or regarding any contests, tournaments, competitive events, or pageants, polling activities, marketing campaigns, and/or surveys, of or regarding the existence of any individual, candidate, entity, and/or any other of the herein-described organizations, who or which may be in need of, and/or who or which may be interested in, the respective goods, products, and/or services, which are offered by the respective providers.

The apparatus of the present invention can also be utilized in order to provide notification to an individual, a candidate, and/or any of the herein-described organizations, of the existence of a provider of campaign goods, campaign products and/or campaign services, and/or a provider of any other campaign-related goods, products, and/or services, and/or any other goods, products, or services, relating to or regarding any contests, tournaments, competitive events, or pageants, polling activities, marketing campaigns, and/or surveys.

The apparatus of the present invention can be utilized in order to perform fundraising activities and/or for performing financial accounting services for or regarding a campaign, contest, tournament, competitive event, or pageant, polling activity, marketing campaign, and/or survey.

The apparatus of the present invention can also be utilized in order to provide notification and/or reminders to a candidate, a campaign manager and/or campaign staff member, or any other user, individual, or entity described herein, of required actions and/or filings which must be taken during a campaign contest, tournament, competitive event, or pageant, polling activity, marketing campaign, and/or survey. The apparatus of the present invention can also be utilized in order to maintain event schedules and/or calendars and/or to provide notification of an event or events to any of the users, individuals, candidates, campaigns, and/or any of the organizations, described herein.

The apparatus of the present invention can also be utilized in order to provide notification of news, polls, polling results, surveys, and/or survey results, to any of the users, individuals, candidates, campaigns, and/or any of the organizations, described herein.

The apparatus of the present invention can also be utilized in order to administer and/or to manage financial accounts, and/or to transmit and/or to receive payments and/or funds transfer, for, or on behalf of, any of the here-described candidates, campaigns, providers, organizations, contests, tournaments, competitive events, or pageants, polling activities, marketing campaigns, and/or surveys, and/or any other users of, or regarding any of the herein-described uses for, the apparatus 100 of the present invention.

The apparatus of the present invention can be utilized to conducts a poll, polls, a survey, or surveys, for any of the users, individuals, candidates, campaigns, political parties, contests, tournaments, competitive events, or pageants, and/or marketing campaigns, and/or organizations, described herein. The apparatus of the present invention also can be programmed to analyze the results of the respective poll, polls, a survey, or surveys, identify areas of weakness or vulnerability, and disseminate campaign and/or other materials to targeted voters, and/or participating, interested, or other, individuals or entities in order to attempt to overcome any such identified weakness or vulnerability.

The apparatus of the present invention can also be utilized in conjunction with, and/or to process information for and/or to provide information for or regarding, any type or kind of campaign, election, contest, tournament, competitive event, or pageant, and/or any polling activity, marketing campaign, and/or survey. The apparatus of the present invention can also be utilized to provide event scheduling information.

The apparatus of the present invention and/or any of the computers or communication devices utilized in connection therewith can also be programmed to be self-activating, self-operating, automatically activated, and/or automatically operated.

DESCRIPTION OF THE PREFERRED EMBODIMENTS

Figure 1:
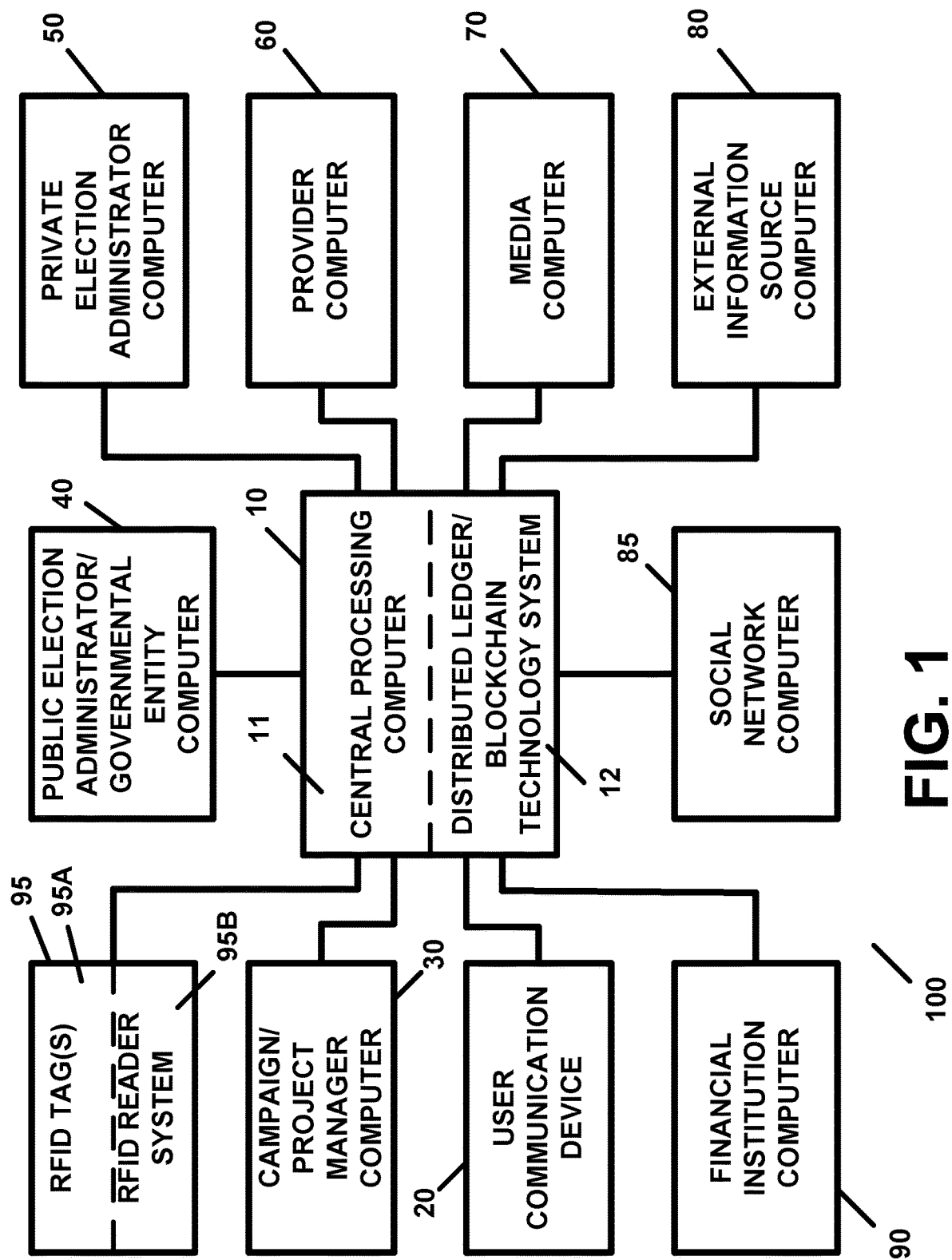
FIG. 1 illustrates a preferred embodiment of the apparatus of the present invention, in block diagram form.

The present invention pertains to an apparatus and method for providing and/or for facilitating secured and/or on-line campaigns, elections, and/or voting activities and, in particular, the present invention pertains to an apparatus and method for providing and/or for facilitating secured and/or on-line campaigns, elections, and/or voting activities, which facilitates and/or provides for the administration, oversight, conducting and/or holding, of elections for public office, pubic elections, private elections, entity or organizational elections, voting activities regarding contests, tournaments, competitive events, or pageants, of any type or kind, voting and/or polling activities in marketing campaigns, and/or in conducting polling activities and/or in conducting surveys or any type or kind, which utilize distributed ledger and blockchain technologies so as to ensure the security and integrity in the activities regarding and surrounding the same and/or in order to provide for the security and/or integrity of the same and/or the results of the same.

The present invention can be utilized in a variety of ways in order to allow public and/or private entities to organize, administer, conduct, and/or oversee, elections, campaigns, contests, tournaments, competitions, pageants, marketing campaigns, polling activities or polls, and/or survey activities or surveys, of all types or kinds in a secured and efficient manner and so as to provide for the protection of the integrity of the same.

The present invention can also be utilized in a variety of ways in order to allow public and/or private entities to organize, administer, conduct, and/or oversee, any and/or all of the aspects of, and/or activities regarding or relating to, elections, campaigns, contests, tournaments, competitions, pageants, marketing campaigns, polling activities or polls, and/or survey activities or surveys, including, but not limited to, the collection and submission of nominating petitions by a candidate, the submission of financial reports for a campaign or candidate, the dissemination of campaign and/or election materials and/or information, the dissemination of information relating to elections, campaigns, contests, tournaments, competitions, pageants, marketing campaigns, polling activities or polls, and/or survey activities or surveys, the conducting of elections online in a secured manner, the registering and the counting of votes and/or ballots in an election using a distributed ledger and/or blockchain technology system, the providing of on-line or virtual forums and/or town hall meetings in, during, or relating to, campaigns, and/or the providing of any number of a variety of activities and/or services relating to elections, campaigns, contests, tournaments, competitions, pageants, marketing campaigns, polling activities or polls, and/or survey activities or surveys.

The present invention can be utilized in connection with public elections, private elections, corporate governance elections, school, organization, club, or association, elections, and/or in any campaigns, contests, tournaments, competitions, pageants, marketing campaigns, polling activities or polls, and/or survey activities or surveys, which involve the need to maintain integrity in participation, information dissemination, and/or in the counting and/or tallying of votes, ballots, and/or election or other votes and/or ballots.

Applicant hereby incorporates by reference herein the subject matter and teachings of U.S. Provisional Patent Application Ser. No. 63/064,046, filed Aug. 11, 2020, and entitled "APPARATUS AND METHOD FOR PROVIDING AND/OR FOR FACILITATING SECURED AND/OR ON-LINE CAMPAIGNS, ELECTIONS, AND/OR VOTING ACTIVITIES", the subject matter and teachings of which are hereby incorporated by reference herein in their entirety.

Applicant hereby incorporates by reference herein the subject matter and teachings of U.S. Provisional Patent Application Ser. No. 60/229,979, filed Sep. 2, 2000, and entitled "APPARATUS AND METHOD FOR PROVIDING CAMPAIGN INFORMATION, CAMPAIGN-RELATED INFORMATION AND/OR ELECTION INFORMATION", the subject matter of which is hereby incorporated by reference herein in their entirety.

Applicant hereby incorporates by reference herein the subject matter and teachings of U.S. patent application Ser. No. 09/939,463, filed Aug. 25, 2001, and entitled "APPARATUS AND METHOD FOR PROVIDING CAMPAIGN INFORMATION, CAMPAIGN-RELATED INFORMATION AND/OR ELECTION INFORMATION", the subject matter of which is hereby incorporated by reference herein in their entirety.

FIG. 1 illustrates the apparatus of the present invention, in block diagram form. The apparatus of the present invention is denoted generally by the reference numeral 100. In the preferred embodiment, the apparatus 100 of the present invention includes a central processing computer and distributed ledger and Blockchain technology system 10 (hereinafter referred to as "central processing computer/distributed ledger/Blockchain technology system 10"). In a preferred embodiment, the central processing computer/distributed ledger/Blockchain technology system 10 includes a central processing computer or central processing computer system 11 (hereinafter referred to as "central processing computer 11" or "central processing computer 11 component") and a distributed ledger and Blockchain technology system 12 (hereinafter referred to as "distributed ledger/Blockchain technology system 12" or "distributed ledger/Blockchain technology system 12 component"). In the preferred embodiment, the central processing computer 11 can be any computer or computer system or can be any server computer or any computer or computer system which can be used in a communication network. Any number of central processing computers 11, and any number of central processing computer/distributed ledger/Blockchain technology systems 10, can be utilized in conjunction with, or in connection, with the apparatus 100 of the present invention.

In a preferred embodiment, the central processing computer 11 can provide control over the apparatus 100 and can perform any of the various processing services and/or functions described herein as being performed by the apparatus 100 of the present invention. In a preferred embodiment, the central processing computer 11 may be a single computer or system of computers and/or may include a plurality of computers or computer systems which are utilized in conjunction with one another. The central processing computer 11, in the preferred embodiment, can provide services for any of the other communications devices and/or computers and/or computer systems described herein as being associated with any of the users, individuals, persons, or entities, who or which utilize the apparatus 100 of the present invention.

As noted herein, in a preferred embodiment, the central processing computer and distributed ledger and Blockchain technology system 10 provides control over the apparatus 100 and performs various processing operations for providing the various services described herein. The central processing computer and distributed ledger and Blockchain technology system 10 can also, in a preferred embodiment, provide various services described herein for the various computers or communication devices associated with users, candidates, election administrators, consultants and/or advisors, polling individuals and/or entities, political parties, mailing products and services providers, email marketing and/or emailing products and/or services, advertising products and services providers, literature products and services providers, campaigning products and services providers, fundraisers, scheduling services, lobbyists, special interest groups, and/or financial institutions, who or which utilize the apparatus 100 and method of the present invention.

In a preferred embodiment, any given central processing computer and distributed ledger and Blockchain technology system 10 can also provide service for a particular geographic area, a particular political area or sub-division, a private organization or group of organizations, and/or any other individuals, groups of individuals, entity or group of entities. In a preferred embodiment, a central processing computer and distributed ledger and Blockchain technology system 10 can also be utilized by a political party, a union or other organization, and/or any other entity and/or group of individuals. In a preferred embodiment, any given central processing computer and distributed ledger and Blockchain technology system 10 can also be dedicated to service any one or group of the above described individuals and/or entities or any causes of, for, or relating to, the same.

With reference once again to FIG. 1, the apparatus 100 also includes a user communication device or computer 20 (hereinafter referred to as "user communication device 20" or "user computer 20") which is associated with, or which can be used by, any one or more of any of the herein-described users, individuals, persons, or entities, who or which utilize the apparatus 100 of the present invention. In a preferred embodiment, any user communication device 20 can also be associated with a number of users and/or individuals, depending upon the application. In a preferred embodiment, the user communication device 20 can also be utilized by any individual, candidate, candidate for elective office, campaign manager, campaign aide, constituent, and/or any other third party, desiring to utilize the apparatus 100.

In a preferred embodiment, any number of user communication devices 20 can be utilized by, or can be associated with, each of the users, individuals, persons, or entities, who or which utilize the apparatus 100 of the present invention. In a preferred embodiment, the user communication device 20 can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any user, individual, person, or entity, who or which utilizes the apparatus 100 and method of the present invention. In a preferred embodiment, the user communication device 20 can also be a server computer, a mainframe computer, a mini-computer, a microcomputer, or any other computer or device for suiting the needs of the particular user. In a preferred embodiment, the user communication device 20 can also be any device or computer, or a kiosk, which can be located at public places or locations or which can also be publicly available. Any number of user communication devices 20 can be utilized in conjunction with, or in connection with, the apparatus 100 of the present invention.

In a preferred embodiment, the user communication device(s) 20 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes a campaign/project manager computer or communication device 30 (hereinafter referred to as "campaign/project manager computer 30") which is associated with, or which can be used by, any one or more of any of the herein-described campaign managers or project managers and/or campaign or project managing entities who or which utilize the apparatus 100 of the present invention. In a preferred embodiment, campaign/project manager computer 30 can be associated with a candidate, a campaign manager, a staff member, a coordinator, and/or any other individual and/or entity who or which is involved in the managing of, the coordinating or coordination of, the providing of support services for, and/or otherwise working for or on, a campaign or campaigns of a candidate and/or a group of candidates, a political cause, a private cause, or any other matter, for any type or kind of campaign(s) and/or election(s).

In a preferred embodiment, campaign/project manager computer 30 can be associated with and/or can be utilized by any candidate, campaign manager, staff member, coordinator, and/or other individual and/or entities who or which is involved in the managing of, coordinating, providing support services for, and/or otherwise working for or on, the campaign or campaigns of a candidate and/or a group of candidates.

In a preferred embodiment, each campaign/project manager computer 30 can also be associated with any number of candidates, campaign managers, staff members, coordinators, and/or other individuals and/or entities who or which is involved in the managing of, coordinating, providing support services for, and/or otherwise working for or on, a campaign or campaigns of or a candidate and/or a group of candidates and/or for any matter, issue, or project.

In a preferred embodiment, any number of campaign/project manager computers 30 can be utilized by, or can be associated with, each of the campaign managers, or project managers, and/or campaign or project managing entities, who or which utilize the apparatus 100 of the present invention. In a preferred embodiment, the campaign/project manager computer 30 can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any campaign manager, or project manager, and/or campaign or project managing entity, who or which utilizes the apparatus 100 and method of the present invention. In a preferred embodiment, the campaign/project manager computer 30 can also be a server computer, a mainframe computer, a mini-computer, a microcomputer, or any other computer or device for suiting the needs of the particular user. In a preferred embodiment, the campaign/project manager computer 30 can also be any device or computer, or a kiosk, which can be located at public places or locations or which can also be publicly available. In a preferred embodiment, any number of campaign/project manager computers 30 can be utilized in conjunction with, or in connection with, the apparatus 100 of the present invention.

In a preferred embodiment, the campaign/project manager computer(s) 30 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes one or more public election administrator/governmental entity computers 40, with each public election administrator/governmental entity computer 40 being associated with a public election administrator or administrative entity, or a governmental entity, such as, for example, an board of elections of or for a political subdivision or geographic area, an elections officer, an elections commissioner, and/or any other individual and/or entity who or which oversees and/or administers public elections. In a preferred embodiment, the public election administrator/governmental entity computer 40 can be associated with, and/or can be utilized by, any elections administrator, elections commission, elections administrator, elections commissioner and/or the commissioner's aides, administrative board, board of elections, and/or a federal government, department, bureau, or agency, a state or provincial government, department, bureau, or agency, or a local or municipal government, department, bureau, or agency, and/or and other individual and/or entity that oversees, administers, or monitors, elections for public offices and/or any other public elections or matters. In a preferred embodiment, each public election administrator/governmental entity computer 40 can also be associated with a number of public elections boards, administrators, elections commissions, and/or any other elections administrators, depending upon the application.

In a preferred embodiment, any number of public election administrator/governmental entity computers 40 can be utilized by, or can be associated with, each of the users, individuals, officials, persons, or entities, who or which utilize the apparatus 100 of the present invention. In a preferred embodiment, the public election administrator/governmental entity computer 40 can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any user, individual, official, person, or entity, who or which utilizes the apparatus 100 and method of the present invention. In a preferred embodiment, the public election administrator/governmental entity computer 40 can also be a server computer, a mainframe computer, a mini-computer, a microcomputer, or any other computer or device for suiting the needs of the particular user. In a preferred embodiment, the public election administrator/governmental entity computer 40 can also be any device or computer, or a kiosk, which can be located at public places or locations or which can also be publicly available. In a preferred embodiment, any number of public election administrator/governmental entity computers 40 can be utilized in conjunction with, or in connection with, the apparatus 100 of the present invention.

In a preferred embodiment, the public election administrator/governmental entity computer(s) 40 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

In a preferred embodiment, any number of public election administrator/governmental entity computer 40 can be utilized. In a preferred embodiment of the present invention, each elections administrator, elections commission, elections administrator, elections commissioner and/or the commissioner's aides, administrative board, board of elections, and/or and other individual and/or entity that oversees, administers, or monitors, elections for public offices and/or any other public elections or matters, can also have one or more public election administrator/governmental entity computers 40 associated therewith.

With reference once again to FIG. 1, the apparatus 100 also includes one or more private election administrator computers 50, with each private election administrator computer 50 being associated with a private election administrator or administrative entity, such as, for example, a company, a business, a trade association, a professional association, a school, a union, a private organization, a quasi-private organization, a civic association, a subdivision or geographic area or a political subdivision or geographic area, an elections officer, an elections commissioner, and/or any other individual and/or entity who or which oversees and/or administers private elections.

In a preferred embodiment, a private election administrator computer 50 can be associated with and/or can be utilized by any elections administrator, elections commission, elections commissioner and/or the commissioner's aides, administrative board, board of elections, and/or and other individual and/or entity that oversees, administers, monitors, elections for private offices and/or any other private elections or matters. In a preferred embodiment, each private election administrator computer 50 can also be associated with any number of a companies, businesses, trade associations, political action committees, professional associations, political action committees, schools, unions, private organizations, contests, competitions, tournaments, pageants, campaigns, marketing campaigns, polls, surveys, quasi-private organizations, civic associations, subdivisions or geographic areas or political subdivisions or geographic areas, elections officers, elections commissioners, and/or any other individuals and/or entities who or which oversee and/or administer private elections or matters and/or private or quasi-private organization elections or matters.

In a preferred embodiment, any number of private election administrator computers 50 can be utilized by, or can be associated with, each of the users, individuals, officials, persons, or entities, who or which utilize the apparatus 100 of the present invention. In a preferred embodiment, the private election administrator computer 50 can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any user, individual, official, person, or entity, who or which utilizes the apparatus 100 and method of the present invention. In a preferred embodiment, the private election administrator computer 50 can also be a server computer, a mainframe computer, a mini-computer, a microcomputer, or any other computer or device for suiting the needs of the particular user. In a preferred embodiment, the private election administrator computer 50 can also be any device or computer, or a kiosk, which can be located at public places or locations or which can also be publicly available. In a preferred embodiment, any number of private election administrator computers 50 can be utilized in conjunction with, or in connection with, the apparatus 100 of the present invention.

In a preferred embodiment, the private election administrator computer 50 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

In the preferred embodiment, any number of private election administrator computers 50 can be utilized. In a preferred embodiment of the present invention, each elections administrator, elections commission, elections administrator, elections commissioner and/or the commissioner's aides, administrative board, board of elections, and/or and other individual and/or entity that oversees, administers, or monitors, elections for private offices and/or any other private matter or any private or quasi-private elections or matters, can have one or more private election administrator computers 50 associated therewith.

With reference once again to FIG. 1, the apparatus 100 also includes one or more provider computers 60, with each provider computer 60 being associated with a provider of any goods, products, and/or services, which can be utilized in any campaigns, campaigning, electioneering, promotional, and/or in any other related, activities. The providers can be any goods providers, products providers, services providers, campaign consultants, political consultants, campaign advisors, political advisors, and/or any other individual, individuals, entity, and/or entities, who or which provide campaign-related and/or election-related goods and/or or products, such as, but not limited to, campaign and campaign-related goods, such as, but not limited to, campaign buttons, bumper stickers, literature, palm cards, advertisements of all kinds or types, business cards, balloons, posters, signs, pens, pencils, and any other campaign-related goods and/or products, and/or election-related goods and/or products, and/or who or which provide campaign-related and/or election-related services, such as, but not limited to, campaign management services, campaign consulting services, campaign advisory services, campaigning services, petition gathering services, printing services, publicity services, promotional services, advertising services, campaign commercial production services, advertisement production services, fundraising services, accounting services, legal services, staffing services, and/or any other campaign-related services production, and/or election-related services.

In a preferred embodiment, a provider computer 60 can be associated with, and/or can be utilized by, any provider of any of the herein-described campaign, campaign-related, election, and/or election-related, goods, products, and/or services. In a preferred embodiment, a provider computer 60 can also be associated with any number of the herein-described providers.

In a preferred embodiment, the provider computer 60 can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any user, individual, official, person, or entity, who or which utilizes the apparatus 100 and method of the present invention. In a preferred embodiment, the provider computer 60 can also be a server computer, a mainframe computer, a mini-computer, a microcomputer, or any other computer or device for suiting the needs of the particular user. In a preferred embodiment, the provider computer 60 can also be any device or computer, or a kiosk, which can be located at public places or locations or which can also be publicly available. In a preferred embodiment, any number of provider computers 60 can be utilized in conjunction with, or in connection with, the apparatus 100 of the present invention.

In a preferred embodiment, the provider computer 60 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 also includes one or more media computers 70, with each media computer 70 being associated with a media service, a news broadcaster, a television broadcaster, a radio broadcaster, an Internet streaming service or broadcaster, a podcaster service, a news service, and/or a print news service, such as, but not limited to, a television network or station, a radio station, an on-line news website, the press, a press media service, a newspaper, a magazine, a flier, a press service, a television news service, a radio news service, a broadcast service, and/or any other media service, journalistic service, news media service, news bureau, and/or any other service or entity which can provide media, content, or news, of any type or kind (hereinafter also referred to as a "media provider"), as well as receive and/or disseminate news, press releases, and/or any other information, from and/or to, respectively, any of the computers or communication devices described herein as well as any of the users or parties described herein.

In a preferred embodiment, a media computer 70 can be associated with, and/or can be utilized by, any media provider described herein. In a preferred embodiment, a media computer 70 can also be associated with any number of the herein-described media providers.

In a preferred embodiment, a media computer 70 can provide news related information or media content to the central processing computer/distributed ledger/Blockchain technology system 10 as well as to any of the other computers or communication devices, described herein as well as any of the parties associated with any of the respective computers or communication devices. The media computer 70 can also receive news information or media content from any of the herein-described parties as well as from any other external sources and/or other third parties and/or third party sources, which news information or media content can be processed by the media computer 70 and/or by the central processing computer/distributed ledger/Blockchain technology system 10 for later dissemination to any of the respective computers or communication devices and/or any of the individuals and/or parties associated therewith.

In a preferred embodiment, the media computer 70 can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any user, individual, official, person, or entity, who or which utilizes the apparatus 100 and method of the present invention. In a preferred embodiment, the media computer 70 can also be a server computer, a mainframe computer, a mini-computer, a microcomputer, or any other computer or device for suiting the needs of the particular user. In a preferred embodiment, the media computer 70 can also be any device or computer, or a kiosk, which can be located at public places or locations or which can also be publicly available. In a preferred embodiment, any number of media computers 70 can be utilized in conjunction with, or in connection with, the apparatus 100 of the present invention.

In a preferred embodiment, the media computer 70 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

In a preferred embodiment, any number of media computers 70 can be utilized. In a preferred embodiment of the present invention, each media provider utilizing the apparatus 100 of the present invention can also have one or more media computers 70 associated therewith.

With reference once again to FIG. 1, the apparatus 100 also includes one or more external information source computers 80, with each external information source computer 80 being associated an external information source. In a preferred embodiment, each external information source computer 80 can also be associated with any number of external information sources, depending upon the desired application. In a preferred embodiment, the external information source can be any third party information source, information provider, news service, third party individual, organization, association, civic organization, civic association, union, trade union, event planner, scheduling entity, and/or any other individual and/or entity which may provide information to any of the herein-described individuals and/or entities who or which utilize the apparatus 100 of the present invention.

In a preferred embodiment, the external information source computer 80 can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any user, individual, official, person, or entity, who or which utilizes the apparatus 100 and method of the present invention. In a preferred embodiment, the external information source computer 80 can also be a server computer, a mainframe computer, a mini-computer, a microcomputer, or any other computer or device for suiting the needs of the particular user. In a preferred embodiment, the external information source computer 80 can also be any device or computer, or a kiosk, which can be located at public places or locations or which can also be publicly available. In a preferred embodiment, any number of external information source computers 80 can be utilized in conjunction with, or in connection with, the apparatus 100 of the present invention.

In a preferred embodiment, the external information source computer 80 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

In a preferred embodiment, any number of external information source computer 80 can be utilized. In a preferred embodiment of the present invention, each external information source utilizing the apparatus 100 of the present invention can also have one or more external information source computer 80 associated therewith.

With reference once again to FIG. 1, the apparatus 100 can also include one or more social network computers 85. The social network computer 85 can be linked with, and utilized in connection with, the apparatus 100 so as to allow and/or to facilitate integrating the apparatus 100 of the present invention with social networks and/or social media. In a preferred embodiment, for example, the social network computer 85 can be associated with a social networking company, a social networking website, or social networking entity, website, group, organization, or association. The social network computer 85 can be associated with any one or any number of social networking companies, social networking websites, or social networking entities, websites, groups, organizations, or associations. The social network computer 85 can also provide links to any computers associated with any one or any number of social networking companies, social networking websites, or social networking entities, websites, groups, organizations, or associations. In the preferred embodiment, the social network computer 85 can perform any and all of the functions performed by any social networking company, a social networking website, or social networking entity, website, group, organization, or association. In a preferred embodiment, any number of social network computers 85 can be utilized in connection with the apparatus 100 of the present invention. Any number of social network computers 85 can also be utilized by or in conjunction with any social network or social networking provider who or which utilizes the apparatus 100 of the present invention.

In a preferred embodiment, the social network computer 85 can be a server computer, a personal computer, a mainframe computer, a mini-computer, a microcomputer, or any other computer or device for suiting the needs of the particular social network or social networking provider. The social network computer 85 can also be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any social network or social networking provider who or which utilizes the apparatus 100 and method of the present invention. The social network computer 85 can also be any device or computer, or a kiosk, which can be located at public places or locations or which can also be publicly available. Any number of social network computers 85 can be utilized in conjunction with, or in connection with, the apparatus 100 of the present invention.

In a preferred embodiment, the social network computer(s) 85 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 can also include one or more financial institution computers 90 with each financial institution computer 90 being associated with a financial institution, a group of financial institutions, and/or any of the individuals and/or entities who or which utilize the present invention.

In a preferred embodiment, each financial institution computer 90 can also be associated with any one or more, or any number of, any of the governmental entities, boards of elections, public entities, private entities, public election administrators, private election administrators, providers, media providers, external information sources, social networks, campaign/project managers, candidates, campaigns, elections, individuals and/or other entities, described herein. In a preferred embodiment, the financial institution computer(s) 90 can be utilized in order to manage and/or to administer, and/or to maintain, a financial account or financial accounts for any of governmental entities, boards of elections, public entities, private entities, public election administrators, private election administrators, providers, media providers, external information sources, social networks, campaign/project managers, candidates, campaigns, elections, individuals and/or other entities, described herein. In a preferred embodiment, the financial institution computer(s) 90 can also perform financial transactions for, or on behalf of, any of the governmental entities, boards of elections, public entities, private entities, public election administrators, private election administrators, providers, media providers, external information sources, social networks, campaign/project managers, candidates, campaigns, elections, individuals and/or other entities, described herein who or which utilize the apparatus 100 and method of the present invention. In a preferred embodiment, the financial institution computer(s) 90 can also be utilized in order to make financial payments, and/or to receive financial payments, for or on behalf of any of the governmental entities, boards of elections, public entities, private entities, public election administrators, private election administrators, providers, media providers, external information sources, social networks, campaign/project managers, candidates, campaigns, elections, individuals and/or other entities, described herein who or which utilize the apparatus 100 and method of the present invention.

In a preferred embodiment, each financial institution computer 90 can be utilized to service one or more of any of the governmental entities, boards of elections, public entities, private entities, public election administrators, private election administrators, providers, media providers, external information sources, social networks, campaign/project managers, candidates, campaigns, elections, individuals and/or other entities, described herein. In a preferred embodiment, any number of financial institution computer 90 can be utilized in connection with the apparatus 100 of the present invention. Any number of financial institution computers 90 can also be utilized by, or in conjunction with, any governmental entity, board of elections, public entity, private entity, public election administrator, private election administrator, provider, media provider, external information source, social network, campaign/project manager, candidate, campaign, election, individual and/or other entity, described herein who or which utilizes the apparatus 100 of the present invention.

In a preferred embodiment, the financial institution computer 90 can be a server computer, a personal computer, a mainframe computer, a mini-computer, a microcomputer, or any other computer or device for suiting the needs of the particular financial institution, the group of financial institutions, and/or the individual and/or entity who or which utilizes the present invention. In a preferred embodiment, the financial institution computer 90 can also be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, which can be utilized by any financial institution, the group of financial institutions, and/or the individual and/or entity who or which utilizes the apparatus 100 and method of the present invention. In a preferred embodiment, the financial institution computer 90 can also be any device or computer, or a kiosk, which can be located at public places or locations or which can also be publicly available. Any number of financial institution computers 90 can be utilized in conjunction with, or in connection with, the apparatus 100 of the present invention.

In a preferred embodiment, the financial institution computer(s) 90 can communicate with, and/or can operate in conjunction with, the central processing computer/distributed ledger/Blockchain technology system 10 and/or any of the other communication devices, computers, and/or computer systems, described herein as being associated with, or used by, any of the users, individuals, persons, or entities, who or which utilize the apparatus 100 and method of the present invention.

With reference once again to FIG. 1, the apparatus 100 can also include any number of RFID tags/RFID reader system(s) 95, each of which can include any number of RFID tags 95A and RFID reader systems 95B. In a preferred embodiment, the RFID tags/RFID reader system(s) 95 can be utilized in or for any number of a variety ways as described herein and/or otherwise. In a preferred embodiment, the RFID tags/RFID reader system(s) 95 can be connected to, and/or linked with, the central processing computer/distributed ledger/Blockchain technology system 10, using any suitable and/or appropriate wired connection, wireless connection, or any combination of same, on, via, or using, any suitable and/or appropriate communication network or any combination of communication networks.

In a preferred embodiment, any individual who is registered to vote in any jurisdiction, or who is registered to use the apparatus 100 of the present invention in order to vote in, or to take part in voting in, any election, campaign, contest, competition, tournament, pageant, poll, and/or survey, can be assigned a voter account or any number of voter accounts. In a preferred embodiment, any governmental entity, board of elections, public entity, private entity, public election administrator, private election administrator, provider, media provider, external information source, social network, campaign/project manager, candidate, campaign, election, individual and/or other entity, described herein, who or which utilizes the apparatus 100 of the present invention, can also be assigned a user account or user accounts.

In a preferred embodiment, an RFID tag 95A can be assigned to any individual who is registered to vote in any jurisdiction, or who is registered to use the apparatus 100 of the present invention in order to vote in, or to take part in voting in, any election, campaign, contest, competition, tournament, pageant, poll, and/or survey. In a preferred embodiment, the RFID tag 95A can also be assigned to, or associated with, the individual's voter account or voter accounts (or, in other words, the voter account or voter accounts of the individual). In a preferred embodiment, an RFID tag 95A can also be assigned to any governmental entity, board of elections, public entity, private entity, public election administrator, private election administrator, provider, media provider, external information source, social network, campaign/project manager, candidate, campaign, election, individual and/or other entity, described herein, who or which utilizes the apparatus 100 of the present invention. In a preferred embodiment, the RFID tag 95A can also be assigned to, or associated with, the user account or user accounts of the governmental entity, board of elections, public entity, private entity, public election administrator, private election administrator, provider, media provider, external information source, social network, campaign/project manager, candidate, campaign, election, individual and/or other entity.

In a preferred embodiment, the RFID tag 95A can be provided in or as a physical identification card or other physical item or device, and/or can be attached to, or located within, an article of clothing, a watch, a necklace, a bracelet, an ankle bracelet, a ring, an article of jewelry, or any other wearable article or item. In a preferred embodiment, the RFID tag 95A can also be implantable within an individual or patient. In a preferred embodiment, the RFID tag 95A can also be provided in or as a physical identification card, attached to, or located on or within, a cellular telephone, a smart phone, a Smartphone, a personal digital assistant, or any other personal article or item. In a preferred embodiment, any number of RFID tags 95A can be assigned to, or associated with, any respective individual, governmental entity, board of elections, public entity, private entity, public election administrator, private election administrator, provider, media provider, external information source, social network, campaign/project manager, candidate, campaign, election, and/or other entity, and/or can be assigned to, or associated with, any respective voter account, voter accounts, user account, or user accounts, of the respective individual, governmental entity, board of elections, public entity, private entity, public election administrator, private election administrator, provider, media provider, external information source, social network, campaign/project manager, candidate, campaign, election, and/or other entity.

In a preferred embodiment, an RFID reader system 95B, or any RFID reader or RFID readers of same, can be located at any election polling site, election venue, election kiosk, voting site, voting venue, voting kiosk, voting machine, vote counting or vote submission machine or device, polling or survey site, polling or survey venue, polling or survey kiosk, and/or polling or survey machine or device. For example, an RFID reader system 95B can located at, or assigned to, an in-person voting venue or location or an in-person polling venue or location. In another preferred embodiment, an RFID reader system 95B, or any RFID reader or RFID readers of same, can also be located on or implemented with any communication device, computer, computer peripheral device, cellular telephone, smart phone, personal digital assistant, or any other device of or associated with, any individual, governmental entity, board of elections, public entity, private entity, public election administrator, private election administrator, provider, media provider, external information source, social network, campaign/project manager, candidate, campaign, election, and/or other entity, who or which utilizes the apparatus 100 of the present invention. In a preferred embodiment, each RFID reader system 95B can include any number of RFID readers.

In a preferred embodiment, the RFID tag/RFID reader system(s) 95, and any RFID tags 95A and any RFID reader system(s) 95B of same, can be utilized for identifying, verifying the identification of, and/or for accessing, any data and/or information, and/or any voter account(s) or any user account(s) of, associated with, corresponding to, or regarding, any individual, governmental entity, board of elections, public entity, private entity, public election administrator, private election administrator, provider, media provider, external information source, social network, campaign/project manager, candidate, campaign, election, and/or other entity, who or which utilizes the apparatus 100 of the present invention. In this regard, the RFID tag/RFID reader system(s) 95 can be utilized in order to ensure identity verification and use of respective the herein-described voter accounts and/or user accounts so as to better ensure integrity in the use of the herein-described voter accounts and/or user accounts and/or so as to better ensure the integrity of the election, voting, polling, and/or survey, activities, in or with which the apparatus 100 of the present invention can be utilized.

In a preferred embodiment, the RFID tags/RFID reader system(s) 95 can be utilized in or for any number of a variety ways as described herein and/or otherwise. In a preferred embodiment, the RFID tags/RFID reader system(s) 95 can be connected to, and/or linked with, the central processing computer/distributed ledger/Blockchain technology system 10, using any suitable and/or appropriate wired connection, wireless connection, or any combination of same, on, via, or using, any suitable and/or appropriate communication network or any combination of communication networks.

In a preferred embodiment, the RFID tags/RFID reader system(s) 95 can communicate with, and/or can operate in conjunction with, the central processing computer/distributed ledger/Blockchain technology system 10 and/or any of the other communication devices, computers, and/or computer systems, described herein as being associated with, or used by, any of the individuals, governmental entities, boards of elections, public entities, private entities, public election administrators, private election administrators, providers, media providers, external information sources, social networks, campaign/project managers, candidates, campaigns, elections, and/or other entities, described herein, who or which utilize the apparatus 100 and method of the present invention.

In a preferred embodiment, each of the herein-described user communication devices 20, campaign/project manager computers 30, public election administrator/governmental entity computers 40, private election administrator computers 50, provider computers 60, media computers 70, external information source computers 80, social network computers 85, financial institution computers 90, and/or RFID tags/RFID reader system(s) 95, can be connected to, and/or linked with, the central processing computer/distributed ledger/Blockchain technology system 10 using any suitable and/or appropriate wired connection, wireless connection, or any combination of same, on, via, or using, any suitable and/or appropriate communication network or any combination of communication networks.

In a preferred embodiment, the each of the herein-described user communication devices 20, campaign/project manager computers 30, public election administrator/governmental entity computers 40, private election administrator computers 50, provider computers 60, media computers 70, external information source computers 80, social network computers 85, financial institution computers 90, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, or any combination of same, or any equivalent of same, and/or can be a kiosk of any type or kind and/or which can be located at a public place or location or which can otherwise be publicly available.

In a preferred embodiment, each of the central processing computer/distributed ledger/Blockchain technology system(s) 10, and/or the central processing computer(s) 11 of same, the user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and the RFID tags/RFID reader system(s) 95, described herein, can communicate with each other in a bi-directional manner, and can transmit data and/or information to, as well as receive data and/or information from, each other and/or any other central processing computer/distributed ledger/Blockchain technology system(s) 10, and/or the central processing computer(s) 11 of same, the user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and the RFID tags/RFID reader systems 95.

In this regard, each of the respective computers, communication devices, and/or systems 11, 20, 30, 40, 50, 60, 70, 80, 85, 90, and/or 95 can communicate with, process information transmitted from or received from, and/or share data and/or information with, each other and/or any other respective computer(s), communication device(s), and/or system(s) 11, 20, 30, 40, 50, 60, 70, 80, 85, 90, and/or 95, described herein and/or utilized in conjunction with the apparatus 100 of the present invention. In this manner, data and/or information transfer, between any of the computer(s), communication device(s), and/or system(s) 11, 20, 30, 40, 50, 60, 70, 80, 85, 90, and/or 95, can communicate with any other respective computer(s), communication device(s), and/or system(s) 11, 20, 30, 40, 50, 60, 70, 80, 85, 90, and/or 95, in a bi-directional manner. In this manner, any of the computer(s), communication device(s), and/or system(s) 11, 20, 30, 40, 50, 60, 70, 80, 85, 90, and/or 95, can communicate with any other computer(s), communication device(s), and/or system(s) 11, 20, 30, 40, 50, 60, 70, 80, 85, 90, and/or 95, in a bi-directional manner.

In the preferred embodiment, the apparatus 100 and methods of the present invention can be utilized on, and/or over, the Internet and/or the World Wide Web. The apparatus 100 of the present invention, in the preferred embodiment, can also utilize wireless Internet and/or World Wide Web services, equipment and/or devices.

In a preferred embodiment, the central processing computer(s) 11 has a web site or web sites associated therewith. Each of the other computers or communication devices described herein can also have a web site or web sites associated with the same.

Although the Internet and/or the World Wide Web is a preferred communication system and/or medium utilized, the present invention, in any and/or all of the embodiments described herein, can also be utilized with any appropriate communication network or system including, but not limited to, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, bluetooth communications network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks, systems, or technologies.

In this regard, any of the central processing computer/distributed ledger/Blockchain technology system(s) 10, and/or the central processing computer(s) 11 of same, the user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and the RFID tags/RFID reader system(s) 95, described herein, can communicate with one another, and/or can be linked to one another, on, over, or via, any suitable communication network, telecommunication network, telephone network, a line-connected network, and/or a wireless communication network, and/or the Internet and/or the World Wide Web.

In a preferred embodiment, each of the central processing computer/distributed ledger/Blockchain technology system(s) 10, and/or the central processing computer(s) 11 of same, the user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and/or the RFID tags/RFID reader systems 95, described herein, can be linked with any other central processing computer/distributed ledger/Blockchain technology system(s) 10, and/or central processing computer(s) 11 of same, user communication device(s) 20, campaign/project manager computer(s) 30, public election administrator/governmental entity computer(s) 40, private election administrator computer(s) 50, provider computer(s) 60, media computer(s) 70, external information source computer(s) 80, social network computers 85, financial institution computer(s) 90, and/or RFID tags/RFID reader system(s) 95 directly or indirectly so as to facilitate a direct or indirect bi-directional communication between said respective computers, communication devices, or systems. Communications between each of the computers, communication devices, and/or systems 10, 11, 20, 30, 40, 50, 60, 70, 80, 85, 90, and/or 95 can also involve or utilize an e-mail server or e-mail servers in those instances when e-mails are described as being used to transmit, or to send, any of the information, signals, messages, reports, notification messages, or any other communications, described herein, by or between any of the respective computers, communication devices, and/or systems 10, 11, 20, 30, 40, 50, 60, 70, 80, 85, 90, and/or 95, or when any of the information, signals, messages, reports, notification messages, or any other communications, described herein, are transmitted by and/or between any of the parties described herein and/or by or between any of the computers, communication devices, and/or systems 10, 11, 20, 30, 40, 50, 60, 70, 80, 85, 90, and/or 95, or any other computers or communication devices, computer systems, communication network equipment, server computers, etc., or any other devices used or needed, in order to facilitate communications or the transmission of any of the herein-described information, signals, messages, reports, notification messages, or any other communications.

In a preferred embodiment, each of the central processing computer/distributed ledger/Blockchain technology system(s) 10, and/or the central processing computer(s) 11 of same, the user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and the RFID tags/RFID reader system(s) 95, can communicate in a bi-directional manner with, and/or can send and/or receive signals, messages, reports, notification messages, alerts, or any other communications or electronic communication transmissions, to, from, and/or between, any other, or any number of, other the central processing computer/distributed ledger/Blockchain technology system(s) 10, and/or the central processing computer(s) 11 of same, the user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and the RFID tags/RFID reader system(s) 95.

In a preferred embodiment, each of the central processing computer/distributed ledger/Blockchain technology system(s) 10, and/or the central processing computer(s) 11 of same, the user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and the RFID tags/RFID reader system(s) 95, can be linked to or with any other the central processing computer/distributed ledger/Blockchain technology system(s) 10, and/or the central processing computer(s) 11 of same, the user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and the RFID tags/RFID reader system(s) 95, via a wired link or line or a wireless link.

In a preferred embodiment, any and/or all of the signals, messages, reports, notification messages, or any other communications, described herein as being transmitted from one respective computer, communication device, or system, to another respective computer, communication device, or system, can be, or can be included in, or can be attached to, an e-mail message, an instant messaging message, an electronic transmission, or an electronic data transmission or electronic data interchange, or can be transmitted via any other data or information transmission, and/or can be transmitted via or using any appropriate or necessary computer(s) or device(s).

The apparatus 100 of the present invention can also utilize electronic commerce technologies and security methods, techniques and technologies, including any encryption or security technologies and/or techniques, in any and/or all of the instances of, or involving, data and/or information processing, and/or data and/or information transmission, described herein.

In a preferred embodiment, each of the herein-described central processing computer/distributed ledger/Blockchain technology system(s) 10, and/or central processing computer(s) 11 of same, user communication devices 20, campaign/project manager computers 30, public election administrator/governmental entity computers 40, private election administrator computers 50, provider computers 60, media computers 70, external information source computers 80, social network computers 85, financial institution computers 90, and/or RFID tags/RFID reader system(s) 95, can be equipped with any and/or all hardware and/or software necessary and/or desirable for facilitating the operation of the apparatus 100 as described herein.

Figure 2:
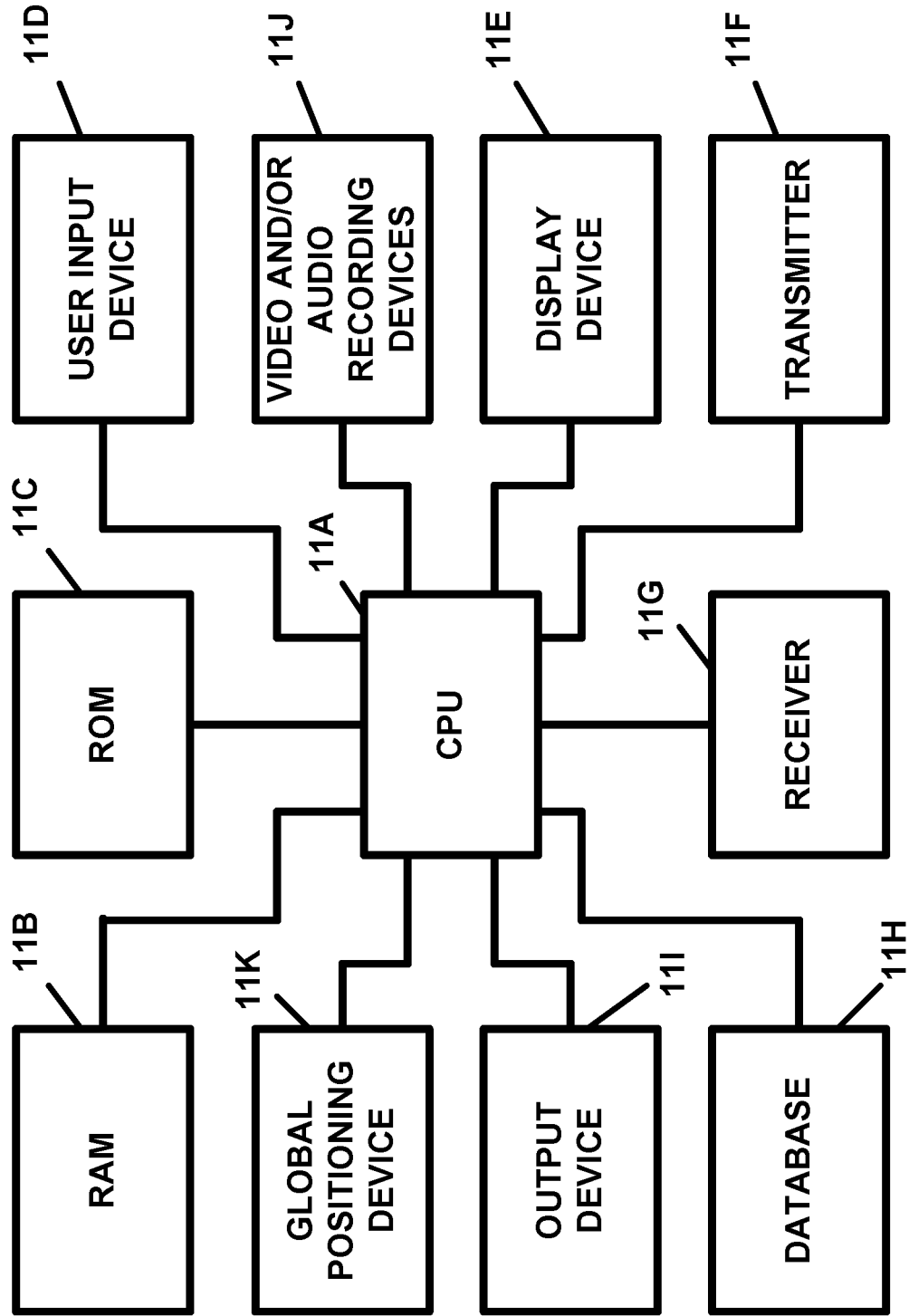
FIG. 2 illustrates the central processing computer component of the central processing computer and distributed ledger and Blockchain technology system of FIG. 1, in block diagram form.

FIG. 2 illustrates the central processing computer 11 component of the central processing computer/distributed ledger/Blockchain technology system 10, of the apparatus 100, in block diagram form. The central processing computer 11, in the preferred embodiment, can be a computer or computer system, a server computer, a network computer, or any other communication device, which can provide the functionality of, and which can be utilized as a central processing computer 11 such as an Internet server computer and/or a web site server computer. In the preferred embodiment, the central processing computer 11 includes a central processing unit or CPU 11A, which, in the preferred embodiment, is a microprocessor. The CPU 11A can also be a microcomputer, a minicomputer, a macro-computer, and/or a mainframe computer, depending upon the application.

The central processing computer 11 also includes a random access memory device(s) 11B (RAM) and a read only memory device(s) 11C (ROM), each of which is connected to, or linked with, the CPU 11A, and a user input device 11D, for entering data and/or information and/or commands into the central processing computer 11, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the central processing computer 11.

The user input device 11D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application The user input device(s) 11D is/are also connected to, or linked with, the CPU 11A. The central processing computer 11 also includes a display device 11E for displaying data and/or information to a user or operator. The display device 11E is also connected to, or linked with, the CPU 11A.

The central processing computer 11 also includes a transmitter(s) 11F, for transmitting signals and/or data and/or information to any one or more of the herein-described user communication devices 20, campaign/project manager computers 30, public election administrator/governmental entity computers 40, private election administrator computers 50, provider computers 60, media computers 70, external information source computers 80, social network computers 85, financial institution computers 90, and/or RFID tags/RFID reader system(s) 95, and/or to any other central processing computer(s) 11 and/or any other individual computer(s) or individual communication device(s) which may be utilized in conjunction with the apparatus 100 of the present invention. The transmitter 11F is also connected to, or linked with, the CPU 11A.

The central processing computer 11 also includes a receiver 11G, for receiving signals and/or data and/or information from any one or more of the herein-described user communication devices 20, campaign/project manager computers 30, public election administrator/governmental entity computers 40, private election administrator computers 50, provider computers 60, media computers 70, external information source computers 80, social network computers 85, financial institution computers 90, and/or RFID tags/RFID reader systems 95, and/or from any other central processing computers 11 and/or any other individual computer(s) or individual communication device(s) which may be utilized in conjunction with the apparatus 100 of the present invention. The receiver 11G is also connected to, or linked with, the CPU 11A.

The central processing computer 11 also includes a database(s) 11H which contains and/or includes any and/or all of the data and/or information required, needed, and/or desired, for allowing and/or enabling the central processing computer 11 and/or the apparatus 100 to perform any and/or all of the functions and functionalities described herein as being performed, and/or as capable of being performed, by the central processing computer 11 and/or the apparatus 100 of the present invention. In this regard, and notwithstanding any specific examples of data and/or information described herein as being stored in the database 11H, it is to be understood that the database 11H contains or includes any and/or all data and/or information required, needed, and/or desired, for allowing and/or enabling the central processing computer 11 and/or the apparatus 100 to perform any and/or all of the functions and functionalities described herein as being performed by the central processing computer 11 and/or the apparatus 100 of the present invention.

In a preferred embodiment, the database 11H also contains and/or includes any software programs, software algorithms, and/or software applications ("apps"), required, needed, and/or desired, for allowing and/or enabling the central processing computer 11 and/or the apparatus 100 to perform any and/or all of the functions and functionalities described herein as being performed, and/or as capable of being performed, by the central processing computer 11, the apparatus 100, and/or each of the herein-described user communication devices 20, the campaign/project manager computers 30, the public election administrator/governmental entity computers 40, the private election administrator computers 50, the provider computers 60, the media computers 70, the external information source computers 80, the social network computers 85, the financial institution computers 90, and/or the RFID tags/RFID reader system(s) 95.

In a preferred embodiment, the database 11H can also contain and/or include any data and/or information described herein as being contained and/or included in any of the databases 20H of any and/or all of the user communication devices 20, any data and/or information described herein as being contained and/or included in any of the databases 30H of any and/or all of the campaign/project manager computers 30, any data and/or information described herein as being contained and/or included in any of the databases 40H of any and/or all of the public election administrator/governmental entity computers 40, any data and/or information described herein as being contained and/or included in any of the databases 50H of any and/or all of the private election administrator computers 50, any data and/or information described herein as being contained and/or included in any of the databases 60H of any and/or all of the provider computers 60, any data and/or information described herein as being contained and/or included in any of the databases 70H of any and/or all of the media computers 70, any data and/or information described herein as being contained and/or included in any of the databases 80H of any and/or all of the external information source computers 80, any data and/or information described herein as being contained and/or included in any of the databases 85H of any and/or all of the social network computers 85, and/or any data and/or information described herein as being contained and/or included in any of the databases 90H of any and/or all of the financial institution computers 90. In this regard, in a preferred embodiment, any data and/or information described herein as being contained and/or included in each of the respective databases 20H, 30H, 40H, 50H, 60H, 70H, 80H, 85H, and/or 90H, can be also be contained and/or included in the database 11H.

In a preferred embodiment, the database 11H can contain and/or include data and/or information regarding the name(s), address or addresses, telephone number(s), facsimile number(s), e-mail address or e-mail addresses, text message numbers, uniform resource locator (url) or urls, contact information, and/or contact name(s), for any of the individuals, governmental entities, boards of elections, public entities, private entities, public election administrators, private election administrators, providers, media providers, external information sources, social networks, financial institutions, campaign/project managers, candidates, campaigns, elections, and/or other entities, described herein, who or which utilize the apparatus 100 and method of the present invention. In a preferred embodiment, the database 11H can contain and/or include data and/or information regarding the name(s), address or addresses, telephone number(s), facsimile number(s), e-mail address or e-mail addresses, text message numbers, uniform resource locator (url) or urls, contact information, and/or contact name(s), for any of the individuals, business entities, users, candidates, office holders, position holders, campaign managers, campaign administrators, campaign workers, registered voters, eligible voters, central processing computer administrators, public election administrators, public election boards or boards of elections, private election administrators, private election board of boards of election, providers of any goods, products and/or services, which can be utilized and/or employed in a campaign or an election, media organizations, press organizations, news organizations, polling organizations, external information sources, and/or financial institutions, and/or any of the respective computers or communication devices associated therewith.

The database 11H can also contain and/or include data and/or information regarding and and/or all voter accounts and user accounts associated with any and/or all of the herein-described individuals, governmental entities, boards of elections, public entities, private entities, public election administrators, private election administrators, providers, media providers, external information sources, social networks, financial institutions, campaign/project managers, candidates, campaigns, elections, and/or other entities, described herein, who or which utilize the apparatus 100 and method of the present invention, including, but not limited to, the name, address(es), telephone number(s), cellular telephone number(s), email address(s), text messaging number(s), SMS messaging number, and/or any other contact information for the individual, governmental entity, board of elections, public entity, private entity, public election administrator, private election administrator, provider, media provider, external information source, social network, financial institution, campaign/project manager, candidate, campaign, election, and/or other entity, associated with each respective voter account or user account.

In a preferred embodiment, the database 11H can also contain and/or include any and/or data and/or information regarding all registered voters, and their respective voter accounts, eligible to vote in any and/or all elections or campaigns which can be serviced, administered, monitored, or overseen, by the apparatus 100 of the present invention. In a preferred embodiment, the database 11H can also contain and/or include any and/or data and/or information regarding all registered users, and their respective user accounts, eligible to vote or participate in any and/or all elections, campaigns, marketing campaigns, contests, competitions, tournaments, pageants, polling activities, polls, marketing activities, surveys, and/or surveys, and/or any other activities, which can be serviced, administered, monitored, or overseen, by the apparatus 100 of the present invention.

In a preferred embodiment, the database 11H can also contain and/or include any and/or data and/or information regarding any and/or all elections, campaigns, marketing campaigns, contests, competitions, tournaments, pageants, polling activities, polls, marketing activities, surveys, and/or surveys, and/or any other activities, which can be serviced, administered, monitored, or overseen, by the apparatus 100 of the present invention.

The database 11H can also contain and/or include data and/or information, including any contact information or other information, regarding or for any of the individuals, governmental entities, boards of elections, public entities, private entities, public election administrators, private election administrators, providers, media providers, external information sources, social networks, financial institutions, campaign/project managers, candidates, central processing computer operators or administrators, campaign coordinators, public election administrators or their staff, private election administrators or their staff, campaign administrators, and/or by any other person, entity, or third party, described herein who or which utilizes the apparatus 100 of the present invention. In a preferred embodiment, the contact information can include the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information.

The database 11H can also contain and/or include voter registration data and/or information concerning the names, addresses, party affiliation, voting history, general election voting turnout information, primary election voting turnout information, past nominating petition signing information (i.e. whether an individual has signed nominating petitions and for whom or for what issue or cause). The database 11H can also contain and/or include data and/or information concerning preferred voters and/or voters with a high likelihood of voting in an election. The database 11H can also contain and/or include user data and/or information for or regarding any and/or users having user accounts which are serviced by the apparatus 100 of the present invention.

The database 11H can also contain data and/or information regarding each registered voter and/or eligible voter and the election district or political subdivision in which he or she resides, the elective offices or positions which represent and/or which pertain to each voter or voter's residence, such as, for example, but not limited to offices of president, governor, congressional representative, senator, and/or any elected federal, state, and/or local officials.

The database 11H can also contain and/or include data and/or information regarding each candidate for each elective office representing each registered voter. The database 11H can also contain and/or include any data and/or information for allowing any registered voter or other eligible voter to determine which election district or political subdivision he or she lives in as well as the identity and information regarding elective offices representing the voter's election district or political subdivision, candidates for any elective offices pertaining to the voter's election district or political subdivision, and/or information regarding incumbents.

The database 11H can also contain and/or include data and/or information concerning eligible voter information, organization membership information, eligible voters in an organization, eligible voters in a union, civic association, public organization, private organization, quasi-public organization, quasi-private organization, school, college, organization, student body, worker group, and/or any other entity or organization which may hold elections or have elective offices in their organization.

The database 11H can also contain and/or include any data and/or information regarding any voters and/or any electorate, for any types of positions such as, but not limited to, union elections civic association elections, corporate elections, private or public organization elections, student body elections, and/or any other elections or campaigns, contests, competitions, tournaments, pageants, polls, and/or surveys, which can be serviced by the apparatus 100 and methods of the present invention.

The database 11H can also contain and/or include data and/or information regarding any individual who can vote in any election, any offices and/or positions which are elective in nature, any issues pertaining to the electorate of any elective office, and/or any other information needed or desired for providing information to a voter, voters, and electorate, and/or any other individual or entity.

The database 11H can also contain and/or include data and/or information regarding any candidates for any of the elected offices described herein, including resumes, biographic information, credentials, positions on issues, voting records, commercials, infomercials, advertisements, literature, and/or any other information. The database 11H can also contain and/or include data and/or information regarding demographics for or regarding any of the voters, voting groups, electorates, and/or geographic regions, described herein.

The database 11H can also contain and/or include information regarding election dates and/or information regarding voting polling places and/or voting procedures, dates and times for any elections, on-line voting procedures, Internet voting procedures, absentee voting procedures, distance voting procedures, in-person voting procedures, and/or any other information regarding voting and/or voting procedures.

The database 11H can also contain and/or include the voting records and/or issue positions of or for any of the elected officials and/or candidates for elected office(s) and/or political office(s). The database 11H can also contain and/or include the voting results or election results, including information regarding a winner(s) and/or loser(s), for each election, campaign, contest, competition, tournament, pageant, poll, or survey, serviced by, administered by, and/or monitored or overseen by, the apparatus 100 of the present invention.

The database 11H can also contain and/or include data and/or information regarding various issues, campaign issues, election issues, social issues, and/or political issues or other issues, for or regarding any governmental territory, subdivision, geographic region, and/or interest group, which may be pertinent to and/or related to any elected office, elected position, and/or electorate.

The database 11H can also contain and/or include data and/or information regarding various polls or surveys for any issues which may be pertinent to any elected positions described herein and/or otherwise. The database 11H can also contain and/or include data and/or information, including, but not limited to, software or algorithms for conducting polling and/or surveys in order to obtain information from a voting electorate and/or other group of individuals and/or entities.

The database 11H can also contain and/or include software or algorithms for analyzing polls, surveys, opinion surveys, and/or information, for conducting surveys and/or polls automatically and/or manually. The database 11H can also contain and/or include data and/or information regarding polling information, voter sentiment information, changes in polls, changes in voter sentiment, and/or information for notifying candidates and/or campaigns regarding the existence of, and/or occurrence, of any polls and/or surveys.

The database 11H can also contain and/or include data and/or information regarding campaign literature and/or for designing, producing, generating, and/or disseminating, campaign literature and/or campaigning literature. The database 11H can also contain and/or include data and/or information regarding literature mailing lists, e-mailing lists, and/or test messaging lists. The database 11H can also contain and/or include data and/or information for disseminating campaign information to respective voters and/or a voting electorate, and/or for disseminating campaign information to targeted voters and/or targeted segments of an electorate or voter groups.

The database 11H can also contain and/or include data and/or information regarding campaign and/or election laws, rules, and/or regulations, for or regarding any public and/or private elections and/or election campaigns. The database 11H can also contain and/or include data and/or information for generating and/or for submitting campaign nominating petitions, campaign disclosure forms, financial disclosure forms, information dissemination forms, press release forms, and/or campaign related forms of any kind for any of the campaigns, public or private, described herein and/or otherwise.

The database 11H can also contain and/or include data and/or information regarding fundraising efforts, fundraising invitation information, fundraising planning information, fundraising efforts, fundraising issues, fundraising accounting, information for contacting individuals for fundraising donations, information for performing fundraising efforts, information for performing targeted and/or focused fundraising efforts, and/or any other information for and/or regarding fundraising by any candidates and/or organizations who or which may utilize the apparatus 100 of the present invention.

The database 11H can also contain data and/or information regarding schedules, scheduling information, and/or any other calendar information, which can or may be pertinent to an election campaign. The database 11H can also contain and/or include data and/or information regarding the scheduling of any and/or all political events, official events, public events, private events, civic events, charitable events, ethnic events, and/or any other events or scheduled events or occurrences which may be of interest to any users, individuals, candidates, campaigns, and/or organizations, who or which may utilize the apparatus 100 of the present invention. The database 11H can also contain and/or include data and/or information for providing notification to any interested user, individual, candidate, campaign, and/or organization, of any events and/or any information related thereto.

The database 11H can also contain and/or include information regarding, as well as, campaign advertisements, campaign literature, commercials, video commercials and/or video clips, audio commercials and/or audio clips, and/or audio and video commercials and/or segments for promoting a candidate, a slate of candidates, and/or an issue, a cause, a program, and/or any other campaign.

The database 11H can also contain and/or include data and/or information regarding reviews and/or comments regarding events, including, but not limited to, the value of attending the event, the exposure one may receive from an event, and/or any other information regarding any other events described herein.

The database 11H can also contain and/or include any data, information, software programs, and/or algorithm, for automatically and/or electronically carrying out a campaigns of any kind including information and/or literature dissemination, mailing, electronic mailing, e-mailing, group or bulk emailing, polling, fundraising, financial disclosure reporting, electioneering, and/or any other campaigning and/or campaign management functions and/or tasks.

The database 11H can also contain and/or include data and/or information for or regarding news, news updates, issues, campaign issues, and/or any other information which can or may be pertinent to a campaign.

The database 11H can also contain and/or include data and/or information for or regarding past elections, past campaigns, voter turnout, voter responsiveness to certain campaign efforts, campaigning activities, the use and/or effectiveness of campaign tactics, campaign strategy or strategies, and/or campaign products, goods, services, and/or consultants.

The database 11H can also contain and/or include statistical data and/or information for or regarding past elections, past campaigns, voter turnout, voter responsiveness to certain campaign efforts, campaigning activities, the use and/or effectiveness of campaign tactics, campaign strategy or strategies, and/or campaign products, goods, services, and/or consultants.

The database 11H can also contain data and/or include data and/or information for or regarding any of the various goods providers, campaign goods providers, products providers, campaign products providers, services providers, campaign services providers, campaign consultants, campaign workers, campaign managers, including, but not limited to, the their respective names, addresses, telephone and/or facsimile numbers, e-mail addresses, and/or any of the herein-described contact information, and/or the respective goods, products, and/or services, they provide and/or perform, the prices and/or charges for the respective goods, products, and/or services, reviews by past customers or clients, the effectiveness of the respective goods, products, and/or services, and/or any other information which may be pertinent to any of the providers and/or to any of the respective goods, products, and/or services, which they provide.

The database 11H can also contain and/or include data and/or information regarding lobbyists for any interests as well as the interests they represent. The database 11H can also contain and/or include data and/or information for or regarding any associations, civic groups, special interest groups, political action committees, unions, trade associations, and/or any other individuals, organizations, and/or entities, who or which may take an interest in, be a factor in, and/or issue endorsements for candidates in, any election or campaign. The information can also include membership information, demographic information, past endorsement information, past campaign contributions, endorsement effectiveness, and/or any other information regarding any of the herein-described associations, civic groups, special interest groups, unions, trade associations, political action committees, and/or any other individuals, organizations, and/or entities.

The information stored in the database 11H can also contain and/or include the name, address, telephone and facsimile numbers, e-mail address and individual contact(s) and/or any of the herein-described contact information for any of the herein-described associations, civic groups, special interest groups, unions, trade associations, political action committees, and/or any other individuals, organizations, and/or entities.

The database 11H can also contain and/or include data and/or information regarding press releases regarding candidates, elective offices, campaigns, and/or other related information. The database 11H can also contain and/or include data and/or information regarding when candidates, political parties, associations, civic groups, special interest groups, unions, trade associations, political action committees, and/or any other individuals, organizations, and/or entities, file documents and/or filings of any kind, such as, but not limited to, nominating petitions, nomination documents, financial disclosure forms, financial disclosure filing forms, any/or any other official and/or unofficial filings along with any information contained in any of these filings.

The database 11H can also contain and/or include data and/or information regarding current office holders, challengers, and/or candidates. The database 11H can also contain and/or include data and/or information regarding campaigns, elections, campaign management, election laws, elections regulations, election rules, and/or any other information, for any public and private elections for which the apparatus 100 can be utilized.

The database 11H can also contain and/or include data and/or information regarding the financial accounts or campaign accounts for any of the candidates or organizations who or which utilize the apparatus 100 of the present invention. The database 11H can also contain and/or include information for preparing and filing financial disclosure forms or documents for, or on behalf of, any of the candidates, political parties, political action committees, lobbyist groups, and/or any other individual(s) and/or organization(s), who or which utilizes the apparatus 100 of the present invention.

The database 11H can also contain and/or include data, information, software programs, and/or software algorithms, for generating and producing electronic catalogs contain candidate and/or campaign information, for bidding for, and/or for auctioning off, certain campaign and/or campaign-related goods, products, and/or services, for performing recruitment for campaign managers, campaign staff workers, consultants and advisors, and/or any other service provider, and/or for providing incentive-based campaign advertisements and/or polling.

The database 11H can also contain and/or include any data and/or information, including identifying information for or regarding each RFID tag 95A and each RFID reader system 95B which is utilized in conjunction with, or in connection with, the apparatus 100 of the present invention. The database 11H can also contain and/or include data and/or information regarding each or all RFID tags 95A which are assigned to, or associated with, each voter account or user account serviced by the apparatus 100 of the present invention. The database 11H can also contain and/or include data and/or information needed or utilized for tracking each RFID tag 95A, and/or for storing information regarding any thing, item, entity, or asset, to which each respective RFID tag 95A is attached, associated, or assigned.

The database 11H can also include language translation information or software so that any of the data or information described herein as being stored in the database 11H, and/or in any of the databases 20H, 30H, 40H, 50H, 60H, 70H, 90H, 85H, and/or 90H, or as being provided in any of the messages, reports, or other communications, described herein, can be translated into any language or any languages.

The database 11H can also contain and/or include any notes, comments, or messages, which can be provided in text, in audio recordings or audio clips, and/or in video recordings or video clips. The database 11H can also contain and/or include any data, information, and/or software programs, for translating audio information into text information and for translating text information into audio information. The database 11H can also contain and/or include any data, information, and/or software programs, for translating text information or audio information from one language to another so as to provide a multi-lingual communications platform and system.

In a preferred embodiment, any text or audio information described herein can be translated into or from text to audio or from audio into text, and any text or audio information can be translated from one language to any other language or languages.

The database 11H can also contain and/or include any of the reports, messages, alerts, alert messages, notification messages, or any other information, described herein as being generated by the apparatus 100 of the present invention and/or by any of the herein-described user communication devices 20, campaign/project manager computers 30, public election administrator/governmental entity computers 40, private election administrator computers 50, provider computers 60, media computers 70, external information source computers 80, social network computers 85, financial institution computers 90, and/or RFID tags/RFID reader systems 95.

In any and/or all of the embodiments described herein, any of the data and/or information which is, or which may be, stored in the database 11H, and/or in any of the other databases 20H, 30H, 40H, 50H, 60H, 70H, 80H, 85H, and/or 90H described herein, can be utilized in and/or can appear in any of the reports, messages, alerts, alert messages, notification messages, or any other information, described herein as being generated by the apparatus 100 of the present invention.

The database 11H can also contain and/or include, for each of the users, individuals, governmental entities, boards of elections, public entities, private entities, public election administrators, private election administrators, providers, media providers, external information sources, social networks, financial institutions, campaign/project managers, candidates, central processing computer operators or administrators, campaign coordinators, public election administrators or their staff, private election administrators or their staff, campaign administrators, described herein who or which utilize the apparatus 100 of the present invention, information regarding any search criteria or alert or notification criteria of or associated with the respective person or entity.

The database 11H can also contain and/or include, for each of the users, individuals, governmental entities, boards of elections, public entities, private entities, public election administrators, private election administrators, providers, media providers, external information sources, social networks, financial institutions, campaign/project managers, candidates, central processing computer operators or administrators, campaign coordinators, public election administrators or their staff, private election administrators or their staff, campaign administrators, described herein who or which utilize the apparatus 100 of the present invention, information regarding any alerts, alert messages, notifications, or notification messages, the subject matter or desired contents of same, and any other information regarding any requests to receive the same.

In a preferred embodiment, the database 11H can also contain and/or include any data and/or information which can be of any interest to any user or users of the central processing computer 11 and/or the apparatus 100.

The central processing computer 11 also includes an output device 111 for outputting any of the data, information, or reports, described herein or otherwise. In the preferred embodiment, the output device 111 can be a printer, a display, a transmitter, a modem, a speaker, and/or any other device, which can be used to output data or information.

The central processing computer 11 can also include a video and/or audio recording device(s) 11J which can include a camera and/or a video recording device, for recording pictures or video and/or video clips, and/or a microphone or an audio recording device, for recording audio or audio clips, which can be recorded by, and/or transmitted live, by or from the central processing computer 11, or which can be recorded by, and stored at or in, the central processing computer 11 for transmission by or from the central processing computer 11 at a later time. The video and/or audio recording device(s) 11J can also be utilized to facilitate one-way broadcasts from the central processing computer 11, and/or can be utilized to facilitate video conferencing, video chatting, and/or audio conferencing, and/or video and audio conferencing, between users of the central processing computer 11 and any of the herein-described users, individuals, persons, or entities, who or which utilize the apparatus 100 of the present invention.

The central processing computer 11 can also include a global positioning device 11K. In a preferred embodiment, the global positioning device 11K determines or can determine a position or location of the central processing computer 11.

In a preferred embodiment, the central processing computer 11 can also be equipped, and/or can be programmed, for voice activation operation and/or voice control operation of and/or regarding any and/or all of the herein-described operations and functions which are capable of being performed by the central processing computer 11.

Figure 3:
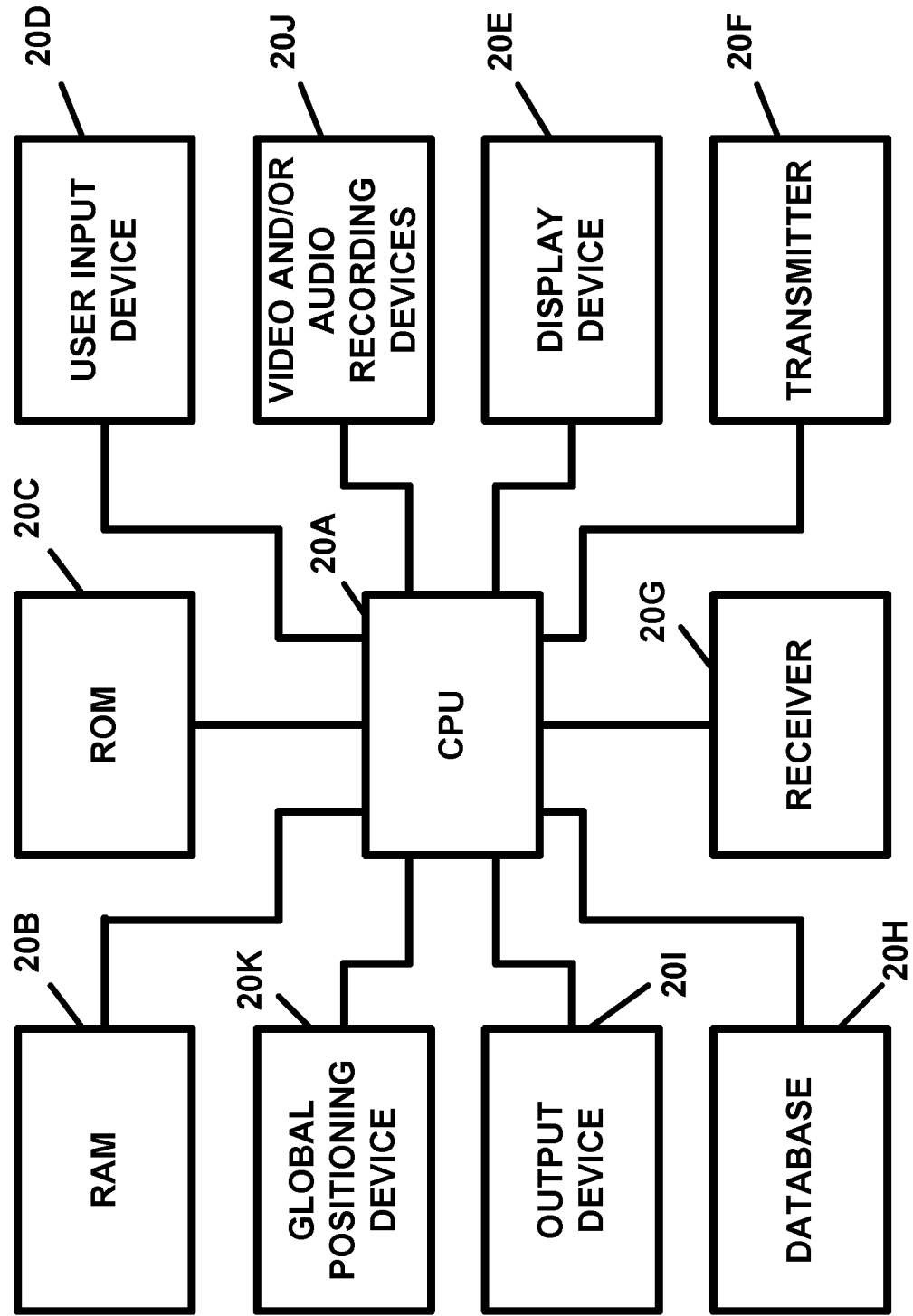
FIG. 3 illustrates the user communication device of FIG. 1, in block diagram form.

FIG. 3 illustrates the user communication device 20 of the apparatus 100, in block diagram form. The user communication device 20, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as a user communication device 20. In the preferred embodiment, the user communication device 20 includes a central processing unit or CPU 20A, which, in the preferred embodiment, is a microprocessor. The CPU 20A can also be a microcomputer, a minicomputer, a macro-computer, and/or a mainframe computer, depending upon the application.

The user communication device 20 also includes a random access memory device(s) 20B (RAM) and a read only memory device(s) 20C (ROM), each of which is connected to, or linked with, the CPU 20A, and a user input device 20D, for entering data and/or information and/or commands into the user communication device 20, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the user communication device 20.

The user input device 20D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 20D is/are also connected to, or linked with, the CPU 20A.

The user communication device 20 also includes a display device 20E for displaying data and/or information to a user or individual. The display device 20E is also connected to, or linked with, the CPU 20A.

The user communication device 20 also includes a transmitter(s) 20F, for transmitting signals and/or data and/or information to any one or more of the herein-described central processing computer(s) 11, campaign/project manager computers 30, public election administrator/governmental entity computers 40, private election administrator computers 50, provider computers 60, media computers 70, external information source computers 80, social network computers 85, financial institution computers 90, and/or RFID tags/RFID reader system(s) 95, and/or to any other user communication devices 20, and/or any other individual computer(s) or individual communication device(s) which may be utilized in conjunction with the apparatus 100 of the present invention. The transmitter 20F is also connected to, or linked with, the CPU 20A.

The user communication device 20 also includes a receiver 20G, for receiving signals and/or data and/or information from any one or more of the herein-described central processing computer(s) 11, campaign/project manager computers 30, public election administrator/governmental entity computers 40, private election administrator computers 50, provider computers 60, media computers 70, external information source computers 80, social network computers 85, financial institution computers 90, and/or RFID tags/RFID reader system(s) 95, and/or from any other user communication devices 20 and/or any other individual computer(s) or individual communication device(s) which may be utilized in conjunction with the apparatus 100 of the present invention. The receiver 20G is also connected to, or linked with, the CPU 20A.

The user communication device 20 also includes a database(s) 20H which contains and/or includes any and/or all of the data and/or information required, needed, and/or desired, for allowing and/or enabling the user communication device 20 and/or the apparatus 100 to perform any and/or all of the functions and functionalities described herein as being performed, and/or as capable of being performed, by the user communication device 20 and/or the apparatus 100 of the present invention. In this regard, and notwithstanding any specific examples of data and/or information described herein as being stored in the database 20H or in the database 11H, it is to be understood that the database 20H contains or includes any and/or all data and/or information required, needed, and/or desired, for allowing and/or enabling the user communication device 20 and/or the apparatus 100 to perform any and/or all of the functions and functionalities described herein as being performed by the user communication device 20 and/or the apparatus 100 of the present invention.

In a preferred embodiment, the database 20H also contains and/or includes any software programs, software algorithms, and/or software applications ("apps"), required, needed, and/or desired, for allowing and/or enabling the user communication device 20 and/or the apparatus 100 to perform any and/or all of the functions and functionalities described herein as being performed, and/or as capable of being performed, by the user communication device 20, the apparatus 100, and/or each of the herein-described campaign/project manager computers 30, the public election administrator/governmental entity computers 40, the private election administrator computers 50, the provider computers 60, the media computers 70, the external information source computers 80, the social network computers 85, the financial institution computers 90, and/or the RFID tags/RFID reader system(s) 95.

In a preferred embodiment, the database 20H can also contain and/or include any data and/or information described herein as being contained and/or included in any of the databases 11H of any and/or all of the central processing computers 11, any data and/or information described herein as being contained and/or included in any of the databases 30H of any and/or all of the campaign/project manager computers 30, any data and/or information described herein as being contained and/or included in any of the databases 40H of any and/or all of the public election administrator/governmental entity computers 40, any data and/or information described herein as being contained and/or included in any of the databases 50H of any and/or all of the private election administrator computers 50, any data and/or information described herein as being contained and/or included in any of the databases 60H of any and/or all of the provider computers 60, any data and/or information described herein as being contained and/or included in any of the databases 70H of any and/or all of the media computers 70, any data and/or information described herein as being contained and/or included in any of the databases 80H of any and/or all of the external information source computers 80, any data and/or information described herein as being contained and/or included in any of the databases 85H of any and/or all of the social network computers 85, and/or any data and/or information described herein as being contained and/or included in any of the databases 90H of any and/or all of the financial institution computers 90. In this regard, in a preferred embodiment, any data and/or information described herein as being contained and/or included in each of the respective databases 11H, 30H, 40H, 50H, 60H, 70H, 80H, 85H, and/or 90H, can be also be contained and/or included in the database 20H.

In a preferred embodiment, the database 20H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the user communication device 20.

In a preferred embodiment, the database 20H can also contain and/or include data and/or information regarding any voter account or voter accounts, or user account or user accounts, of or associated with the respective user of, or the individual or entity associated with, the user communication device 20. The database 20H can also contain and/or include any data and/or information, including identifying information for or regarding each RFID tag 95A assigned to, or associated with, the user communication device 20.

The database 20H can also contain and/or include any of the reports, messages, alerts, alert messages, notification messages, or any other information, described herein as being generated by the apparatus 100 of the present invention and/or by any of the herein-described central processing computers 11, campaign/project manager computers 30, public election administrator/governmental entity computers 40, private election administrator computers 50, provider computers 60, media computers 70, external information source computers 80, social network computers 85, financial institution computers 90, and/or RFID tags/RFID reader systems 95, and which are transmitted to the user communication device 20.

In a preferred embodiment, the database 20H can also contain and/or include any data and/or information which can be of any interest to any user or users of the user communication device 20 and/or the apparatus 100.

The user communication device 20 also includes an output device 201 for outputting any of the data, information, or reports, described herein or otherwise. In the preferred embodiment, the output device 201 can be a printer, a display, a transmitter, a modem, a speaker, and/or any other device, which can be used to output data or information.

The user communication device 20 can also include a video and/or audio recording device(s) 20J which can include a camera and/or a video recording device, for recording pictures or video and/or video clips, and/or a microphone or an audio recording device, for recording audio or audio clips, which can be recorded by, and/or transmitted live, by or from the user communication device 20, or which can be recorded by, and stored at or in, the user communication device 20 for transmission by or from the user communication device 20 at a later time. The video and/or audio recording device(s) 20J can also be utilized to facilitate one-way broadcasts from the user communication device 20, and/or can be utilized to facilitate video conferencing, video chatting, and/or audio conferencing, and/or video and audio conferencing, between users of the user communication device 20 and any of the herein-described users, individuals, persons, or entities, who or which utilize the apparatus 100 of the present invention.

The user communication device 20 can also include a global positioning device 20J. In a preferred embodiment, the global positioning device 20K determines or can determine a position or location of the user communication device 20.

In a preferred embodiment, the user communication device 20 can also be equipped, and/or can be programmed, for voice activation operation and/or voice control operation of and/or regarding any and/or all of the herein-described operations and functions which are capable of being performed by the user communication device 20.

Figure 4:
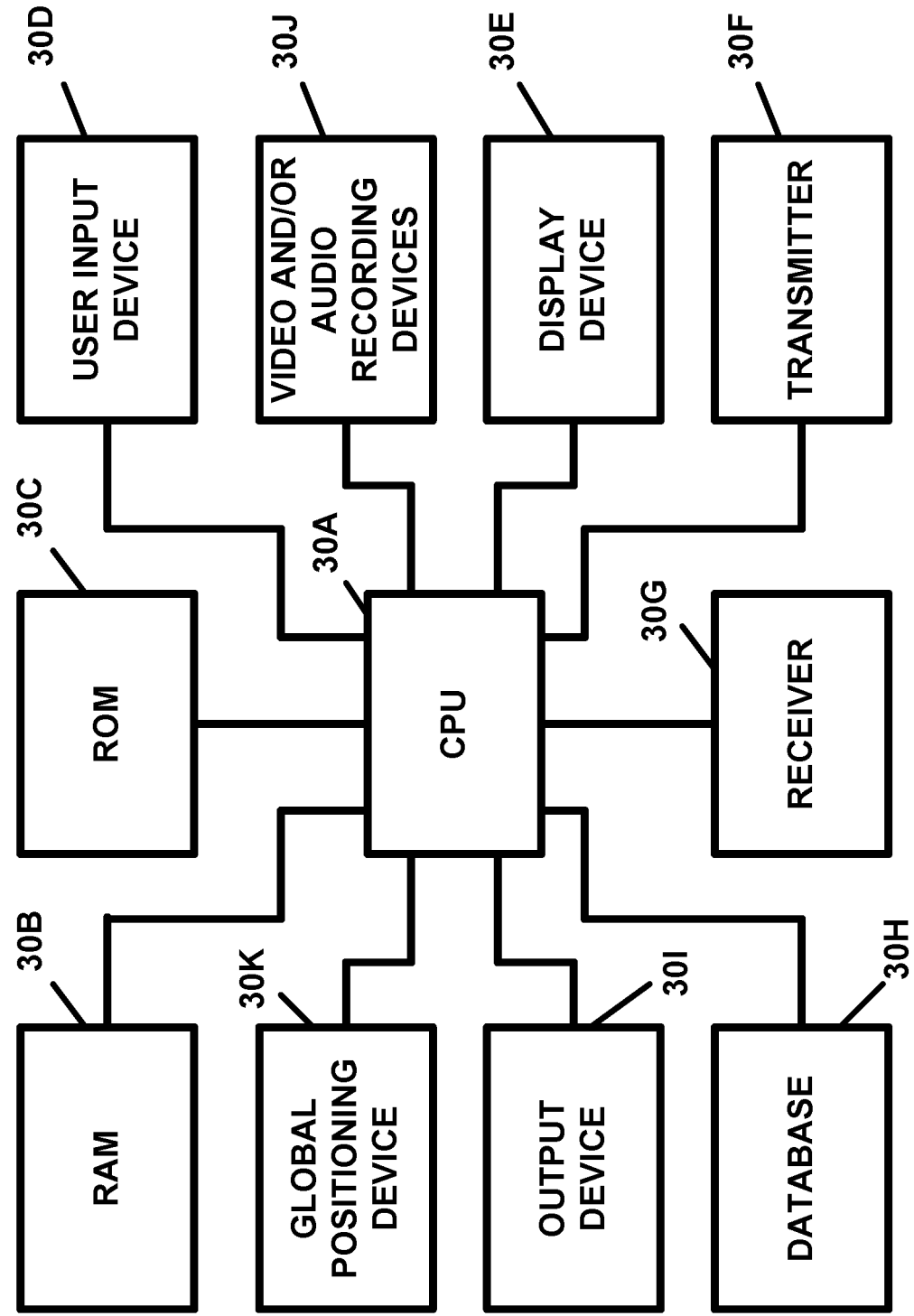
FIG. 4 illustrates the campaign/project manager computer of FIG. 1, in block diagram form.

FIG. 4 illustrates the campaign/project manager computer 30 of the apparatus 100, in block diagram form. The campaign/project manager computer 30, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as a campaign/project manager computer 30. In the preferred embodiment, the campaign/project manager computer 30 includes a central processing unit or CPU 30A, which, in the preferred embodiment, is a microprocessor. The CPU 30A can also be a microcomputer, a minicomputer, a macro-computer, and/or a mainframe computer, depending upon the application.

The campaign/project manager computer 30 also includes a random access memory device(s) 30B (RAM) and a read only memory device(s) 30C (ROM), each of which is connected to, or linked with, the CPU 30A, and a user input device 30D, for entering data and/or information and/or commands into the campaign/project manager computer 30, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the campaign/project manager computer 30.

The user input device 30D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 30D is/are also connected to, or linked with, the CPU 30A.

The campaign/project manager computer 30 also includes a display device 30E for displaying data and/or information to a user or individual. The display device 30E is also connected to, or linked with, the CPU 30A.

The campaign/project manager computer 30 also includes a transmitter(s) 30F, for transmitting signals and/or data and/or information to any one or more of the herein-described central processing computer(s) 11, user communication devices 20, public election administrator/governmental entity computers 40, private election administrator computers 50, provider computers 60, media computers 70, external information source computers 80, social network computers 85, financial institution computers 90, and/or RFID tags/RFID reader system(s) 95, and/or to any other campaign/project manager computers 30, and/or any other individual computer(s) or individual communication device(s) which may be utilized in conjunction with the apparatus 100 of the present invention. The transmitter 30F is also connected to, or linked with, the CPU 30A.

The campaign/project manager computer 30 also includes a receiver 30G, for receiving signals and/or data and/or information from any one or more of the herein-described central processing computer(s) 11, user communication devices 20, public election administrator/governmental entity computers 40, private election administrator computers 50, provider computers 60, media computers 70, external information source computers 80, social network computers 85, financial institution computers 90, and/or RFID tags/RFID reader system(s) 95, and/or from any other campaign/project manager computers 30 and/or any other individual computer(s) or individual communication device(s) which may be utilized in conjunction with the apparatus 100 of the present invention. The receiver 30G is also connected to, or linked with, the CPU 30A.

The campaign/project manager computer 30 also includes a database(s) 30H which contains and/or includes any and/or all of the data and/or information required, needed, and/or desired, for allowing and/or enabling the campaign/project manager computer 30 and/or the apparatus 100 to perform any and/or all of the functions and functionalities described herein as being performed, and/or as capable of being performed, by the campaign/project manager computer 30 and/or the apparatus 100 of the present invention. In this regard, and notwithstanding any specific examples of data and/or information described herein as being stored in the database 30H or in the database 11H, it is to be understood that the database 30H contains or includes any and/or all data and/or information required, needed, and/or desired, for allowing and/or enabling the campaign/project manager computer 30 and/or the apparatus 100 to perform any and/or all of the functions and functionalities described herein as being performed by the campaign/project manager computer 30 and/or the apparatus 100 of the present invention.

In a preferred embodiment, the database 30H also contains and/or includes any software programs, software algorithms, and/or software applications ("apps"), required, needed, and/or desired, for allowing and/or enabling the campaign/project manager computer 30 and/or the apparatus 100 to perform any and/or all of the functions and functionalities described herein as being performed, and/or as capable of being performed, by the campaign/project manager computer 30, the apparatus 100, and/or each of the herein-described user communication devices 20, the public election administrator/governmental entity computers 40, the private election administrator computers 50, the provider computers 60, the media computers 70, the external information source computers 80, the social network computers 85, the financial institution computers 90, and/or the RFID tags/RFID reader system(s) 95.

In a preferred embodiment, the database 30H can also contain and/or include any data and/or information described herein as being contained and/or included in any of the databases 11H of any and/or all of the central processing computers 11 utilized in connection with the apparatus 100, any data and/or information described herein as being contained and/or included in any of the databases 20H of any and/or all of the user communication devices 20, any data and/or information described herein as being contained and/or included in any of the databases 40H of any and/or all of the public election administrator/governmental entity computers 40, any data and/or information described herein as being contained and/or included in any of the databases 50H of any and/or all of the private election administrator computers 50, any data and/or information described herein as being contained and/or included in any of the databases 60H of any and/or all of the provider computers 60, any data and/or information described herein as being contained and/or included in any of the databases 70H of any and/or all of the media computers 70, any data and/or information described herein as being contained and/or included in any of the databases 80H of any and/or all of the external information source computers 80, any data and/or information described herein as being contained and/or included in any of the databases 85H of any and/or all of the social network computers 85, and/or any data and/or information described herein as being contained and/or included in any of the databases 90H of any and/or all of the financial institution computers 90. In this regard, in a preferred embodiment, any data and/or information described herein as being contained and/or included in each of the respective databases 11H, 20H, 40H, 50H, 60H, 70H, 80H, 85H, and/or 90H, can be also contained and/or included in the database 30H.

In a preferred embodiment, the database 30H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the campaign/project manager computer 30.

In a preferred embodiment, the database 30H can also contain and/or include data and/or information regarding any user account or user accounts of or associated with the respective user of, or the individual or entity associated with, the campaign/project manager computer 30. The database 30H can also contain and/or include any data and/or information, including identifying information for or regarding each RFID tag 95A assigned to, or associated with, the campaign/project manager computer 30.

The database 30H can also contain and/or include any of the reports, messages, alerts, alert messages, notification messages, or any other information, described herein as being generated by the apparatus 100 of the present invention and/or by any of the herein-described central processing computers 11, user communication devices 20, public election administrator/governmental entity computers 40, private election administrator computers 50, provider computers 60, media computers 70, external information source computers 80, social network computers 85, financial institution computers 90, and/or RFID tags/RFID reader systems 95, and which are transmitted to the campaign/project manager computer 30.

In a preferred embodiment, the database 30H can also contain and/or include any data and/or information which can be of any interest to any user or users of the campaign/project manager computer 30 and/or the apparatus 100.

The campaign/project manager computer 30 also includes an output device 301 for outputting any of the data, information, or reports, described herein or otherwise. In the preferred embodiment, the output device 301 can be a printer, a display, a transmitter, a modem, a speaker, and/or any other device, which can be used to output data or information.

The campaign/project manager computer 30 can also include a video and/or audio recording device(s) 30J which can include a camera and/or a video recording device, for recording pictures or video and/or video clips, and/or a microphone or an audio recording device, for recording audio or audio clips, which can be recorded by, and/or transmitted live, by or from the campaign/project manager computer 30, or which can be recorded by, and stored at or in, the campaign/project manager computer 30 for transmission by or from the campaign/project manager computer 30 at a later time. The video and/or audio recording device(s) 30J can also be utilized to facilitate one-way broadcasts from the campaign/project manager computer 30, and/or can be utilized to facilitate video conferencing, video chatting, and/or audio conferencing, and/or video and audio conferencing, between users of the campaign/project manager computer 30 and any of the herein-described users, individuals, persons, or entities, who or which utilize the apparatus 100 of the present invention.

The campaign/project manager computer 30 can also include a global positioning device 30K. In a preferred embodiment, the global positioning device 30K determines or can determine a position or location of the campaign/project manager computer 30.

In a preferred embodiment, the campaign/project manager computer 30 can also be equipped, and/or can be programmed, for voice activation operation and/or voice control operation of and/or regarding any and/or all of the herein-described operations and functions which are capable of being performed by the campaign/project manager computer 30.

Figure 5:
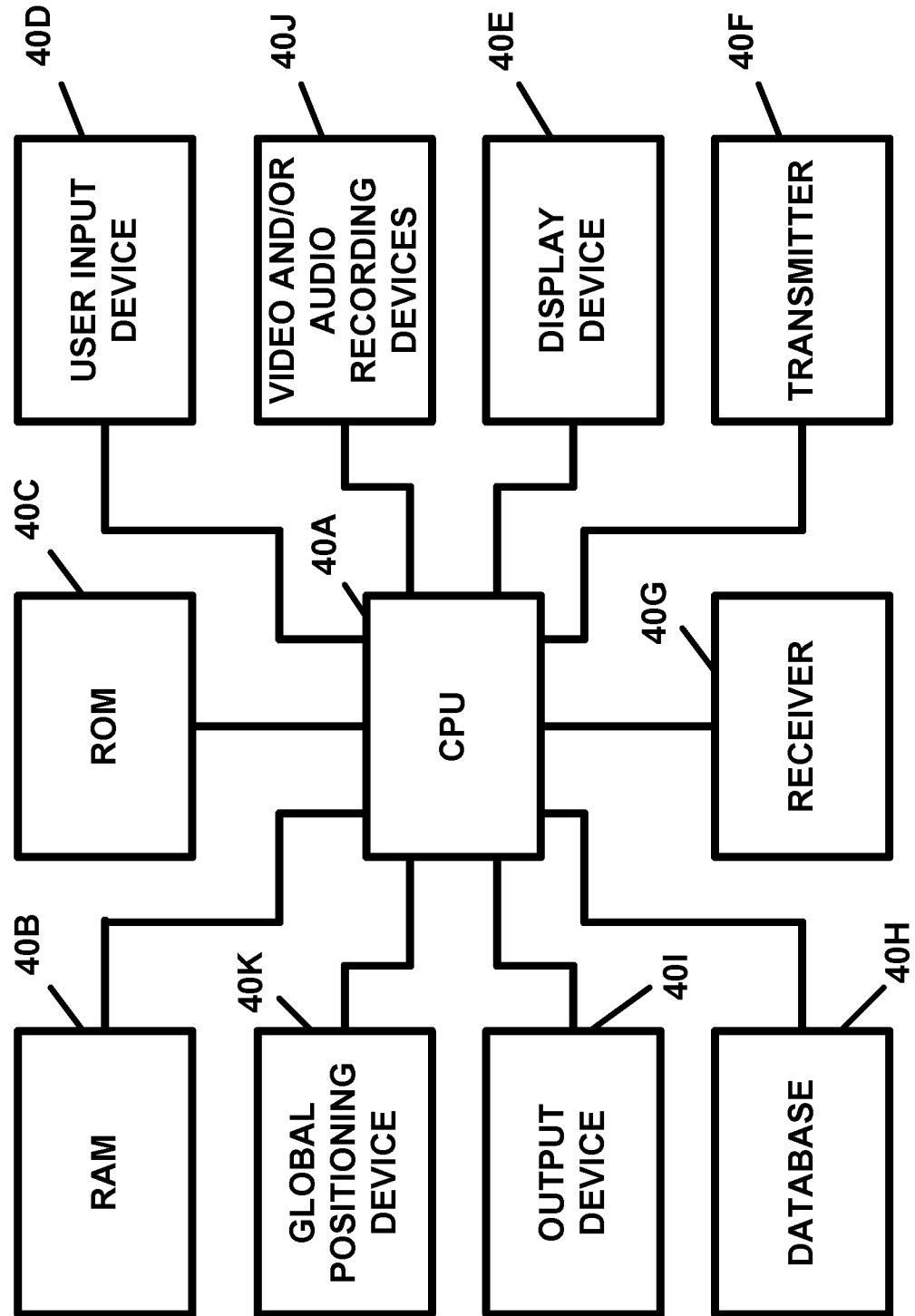
FIG. 5 illustrates the public election administrator/governmental entity computer of FIG. 1, in block diagram form.

FIG. 5 illustrates the public election administrator/governmental entity computer 40 of the apparatus 100, in block diagram form. The public election administrator/governmental entity computer 40, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as a public election administrator/governmental entity computer 40. In the preferred embodiment, the public election administrator/governmental entity computer 40 includes a central processing unit or CPU 40A, which, in the preferred embodiment, is a microprocessor. The CPU 40A can also be a microcomputer, a minicomputer, a macro-computer, and/or a mainframe computer, depending upon the application.

The public election administrator/governmental entity computer 40 also includes a random access memory device(s) 40B (RAM) and a read only memory device(s) 40C (ROM), each of which is connected to, or linked with, the CPU 40A, and a user input device 40D, for entering data and/or information and/or commands into the public election administrator/governmental entity computer 40, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the public election administrator/governmental entity computer 40.

The user input device 40D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 40D is/are also connected to, or linked with, the CPU 40A.

The public election administrator/governmental entity computer 40 also includes a display device 40E for displaying data and/or information to a user or individual. The display device 40E is also connected to, or linked with, the CPU 40A.

The public election administrator/governmental entity computer 40 also includes a transmitter(s) 40F, for transmitting signals and/or data and/or information to any one or more of the herein-described central processing computer(s) 11, user communication devices 20, campaign/project manager computers 30, private election administrator computers 50, provider computers 60, media computers 70, external information source computers 80, social network computers 85, financial institution computers 90, and/or RFID tags/RFID reader system(s) 95, and/or to any other public election administrator/governmental entity computers 40 and/or any other individual computer(s) or individual communication device(s) which may be utilized in conjunction with the apparatus 100 of the present invention. The transmitter 40F is also connected to, or linked with, the CPU 40A.

The public election administrator/governmental entity computer 40 also includes a receiver 40G, for receiving signals and/or data and/or information from any one or more of the herein-described central processing computer(s) 11, user communication devices 20, campaign/project manager computers 30, private election administrator computers 50, provider computers 60, media computers 70, external information source computers 80, social network computers 85, financial institution computers 90, and/or RFID tags/RFID reader system(s) 95, and/or from any other public election administrator/governmental entity computers 40 and/or any other individual computer(s) or individual communication device(s) which may be utilized in conjunction with the apparatus 100 of the present invention. The receiver 40G is also connected to, or linked with, the CPU 40A.

The public election administrator/governmental entity computer 40 also includes a database(s) 40H which contains and/or includes any and/or all of the data and/or information required, needed, and/or desired, for allowing and/or enabling the public election administrator/governmental entity computer 40 and/or the apparatus 100 to perform any and/or all of the functions and functionalities described herein as being performed, and/or as capable of being performed, by the public election administrator/governmental entity computer 40 and/or the apparatus 100 of the present invention. In this regard, and notwithstanding any specific examples of data and/or information described herein as being stored in the database 40H or in the database 11H, it is to be understood that the database 40H contains or includes any and/or all data and/or information required, needed, and/or desired, for allowing and/or enabling the public election administrator/governmental entity computer 40 and/or the apparatus 100 to perform any and/or all of the functions and functionalities described herein as being performed by the public election administrator/governmental entity computer 40 and/or the apparatus 100 of the present invention.

In a preferred embodiment, the database 40H also contains and/or includes any software programs, software algorithms, and/or software applications ("apps"), required, needed, and/or desired, for allowing and/or enabling the public election administrator/governmental entity computer 40 and/or the apparatus 100 to perform any and/or all of the functions and functionalities described herein as being performed, and/or as capable of being performed, by the public election administrator/governmental entity computer 40, the apparatus 100, and/or each of the herein-described user communication devices 20, campaign/project manager computers 30, private election administrator computers 50, provider computers 60, media computers 70, external information source computers 80, social network computers 85, financial institution computers 90, and/or RFID tags/RFID reader system(s) 95.

In a preferred embodiment, the database 40H can also contain and/or include any data and/or information described herein as being contained and/or included in any of the databases 11H of any and/or all of the central processing computers 11, any data and/or information described herein as being contained and/or included in any of the databases 20H of any and/or all of the user communication devices 20, any data and/or information described herein as being contained and/or included in any of the databases 30H of any and/or all of the campaign/project manager computers 30, any data and/or information described herein as being contained and/or included in any of the databases 50H of any and/or all of the private election administrator computers 50, any data and/or information described herein as being contained and/or included in any of the databases 60H of any and/or all of the provider computers 60, any data and/or information described herein as being contained and/or included in any of the databases 70H of any and/or all of the media computers 70, any data and/or information described herein as being contained and/or included in any of the databases 80H of any and/or all of the external information source computers 80, any data and/or information described herein as being contained and/or included in any of the databases 85H of any and/or all of the social network computers 85, and/or any data and/or information described herein as being contained and/or included in any of the databases 90H of any and/or all of the financial institution computers 90. In this regard, in a preferred embodiment, any data and/or information described herein as being contained and/or included in each of the respective databases 11H, 20H, 30H, 50H, 60H, 70H, 80H, 85H, and/or 90H, can be also be contained and/or included in the database 40H.

In a preferred embodiment, the database 40H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the public election administrator/governmental entity computer 40.

In a preferred embodiment, the database 40H can also contain and/or include data and/or information regarding any user account or user accounts of or associated with the respective user of, or the individual or entity associated with, the public election administrator/governmental entity computer 40. The database 40H can also contain and/or include any data and/or information, including identifying information for or regarding each RFID tag 95A assigned to, or associated with, the public election administrator/governmental entity computer 40.

The database 40H can also contain and/or include any of the reports, messages, alerts, alert messages, notification messages, or any other information, described herein as being generated by the apparatus 100 of the present invention and/or by any of the herein-described central processing computers 11, user communication devices 20, campaign/project manager computers 30, private election administrator computers 50, provider computers 60, media computers 70, external information source computers 80, social network computers 85, financial institution computers 90, and/or RFID tags/RFID reader systems 95, and which are transmitted to the public election administrator/governmental entity computer 40.

In a preferred embodiment, the database 40H can also contain and/or include any data and/or information which can be of any interest to any user or users of the public election administrator/governmental entity computer 40 and/or the apparatus 100.

The public election administrator/governmental entity computer 40 also includes an output device 40I for outputting any of the data, information, or reports, described herein or otherwise. In the preferred embodiment, the output device 40I can be a printer, a display, a transmitter, a modem, a speaker, and/or any other device, which can be used to output data or information.

The public election administrator/governmental entity computer 40 can also include a video and/or audio recording device(s) 40J which can include a camera and/or a video recording device, for recording pictures or video and/or video clips, and/or a microphone or an audio recording device, for recording audio or audio clips, which can be recorded by, and/or transmitted live, by or from the public election administrator/governmental entity computer 40, or which can be recorded by, and stored at or in, the public election administrator/governmental entity computer 40 for transmission by or from the public election administrator/governmental entity computer 40 at a later time. The video and/or audio recording device(s) 40J can also be utilized to facilitate one-way broadcasts from the public election administrator/governmental entity computer 40, and/or can be utilized to facilitate video conferencing, video chatting, and/or audio conferencing, and/or video and audio conferencing, between users of the public election administrator/governmental entity computer 40 and any of the herein-described users, individuals, persons, or entities, who or which utilize the apparatus 100 of the present invention.

The public election administrator/governmental entity computer 40 can also include a global positioning device 40K. In a preferred embodiment, the global positioning device 40K determines or can determine a position or location of the public election administrator/governmental entity computer 40.

In a preferred embodiment, the public election administrator/governmental entity computer 40 can also be equipped, and/or can be programmed, for voice activation operation and/or voice control operation of and/or regarding any and/or all of the herein-described operations and functions which are capable of being performed by the public election administrator/governmental entity computer 40.

Figure 6:
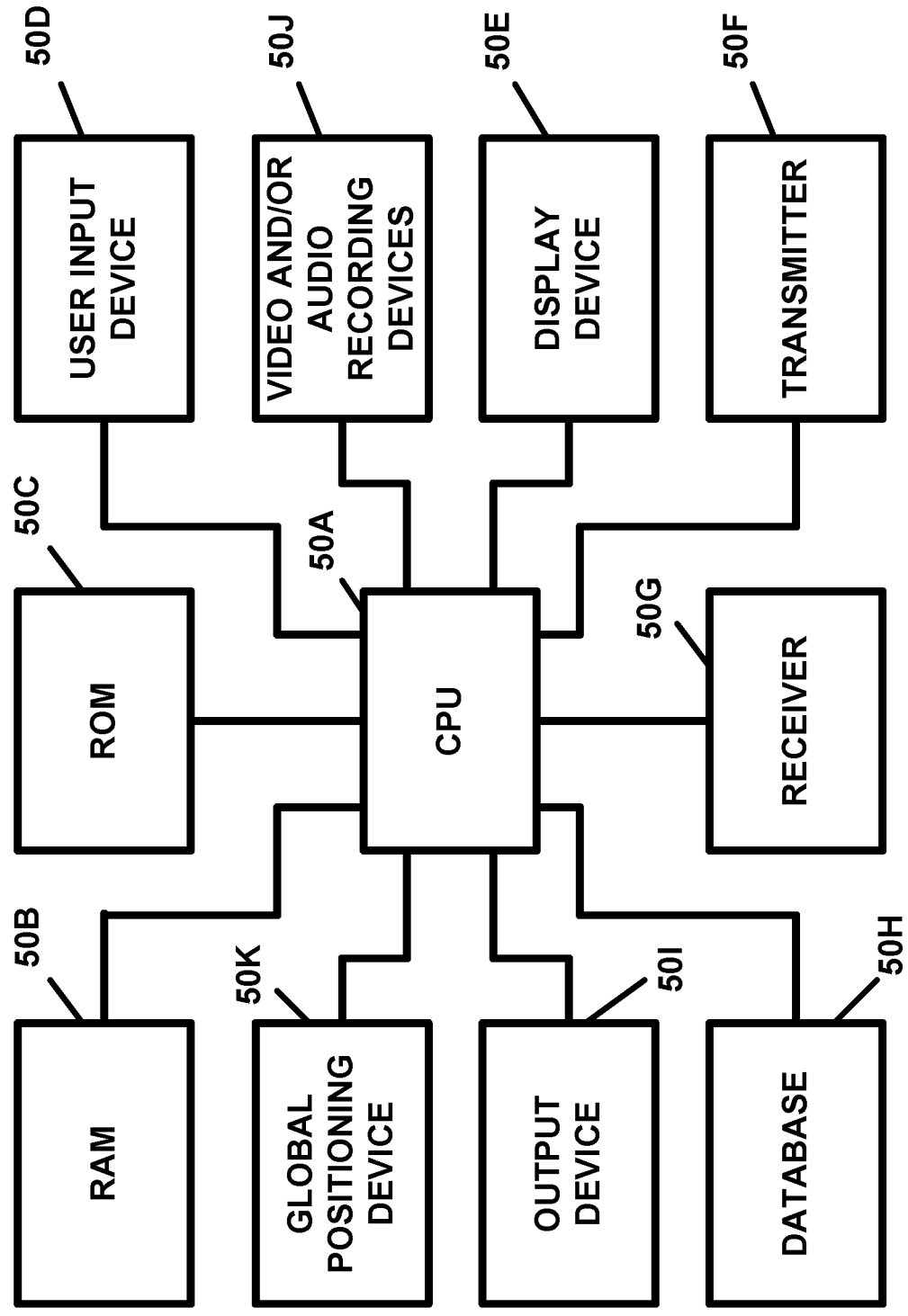
FIG. 6 illustrates the private election administrator computer of FIG. 1, in block diagram form.

FIG. 6 illustrates the private election administrator computer 50 of the apparatus 100, in block diagram form. The private election administrator computer 50, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as a private election administrator computer 50. In the preferred embodiment, private election administrator computer 50 includes a central processing unit or CPU 50A, which, in the preferred embodiment, is a microprocessor. The CPU 50A can also be a microcomputer, a minicomputer, a macro-computer, and/or a mainframe computer, depending upon the application.

The private election administrator computer 50 also includes a random access memory device(s) 50B (RAM) and a read only memory device(s) 50C (ROM), each of which is connected to, or linked with, the CPU 50A, and a user input device 50D, for entering data and/or information and/or commands into the private election administrator computer 50, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the private election administrator computer 50.

The user input device 50D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 50D is/are also connected to, or linked with, the CPU 50A.

The private election administrator computer 50 also includes a display device 50E for displaying data and/or information to a user or individual. The display device 50E is also connected to, or linked with, the CPU 50A.

The private election administrator computer 50 also includes a transmitter(s) 50F, for transmitting signals and/or data and/or information to any one or more of the herein-described central processing computer(s) 11, user communication devices 20, campaign/project manager computers 30, public election administrator/governmental entity computers 40, provider computers 60, media computers 70, external information source computers 80, social network computers 85, financial institution computers 90, and/or RFID tags/RFID reader system(s) 95, and/or to any other private election administrator computers 50 and/or any other individual computer(s) or individual communication device(s) which may be utilized in conjunction with the apparatus 100 of the present invention. The transmitter 50F is also connected to, or linked with, the CPU 50A.

The private election administrator computer 50 also includes a receiver 50G, for receiving signals and/or data and/or information from any one or more of the herein-described central processing computer(s) 11, user communication devices 20, campaign/project manager computers 30, public election administrator/governmental entity computers 40, provider computers 60, media computers 70, external information source computers 80, social network computers 85, financial institution computers 90, and/or RFID tags/RFID reader system(s) 95, and/or from any other private election administrator computers 50 and/or any other individual computer(s) or individual communication device(s) which may be utilized in conjunction with the apparatus 100 of the present invention. The receiver 50G is also connected to, or linked with, the CPU 50A.

The private election administrator computer 50 also includes a database(s) 50H which contains and/or includes any and/or all of the data and/or information required, needed, and/or desired, for allowing and/or enabling the private election administrator computer 50 and/or the apparatus 100 to perform any and/or all of the functions and functionalities described herein as being performed, and/or as capable of being performed, by the private election administrator computer 50 and/or the apparatus 100 of the present invention. In this regard, and notwithstanding any specific examples of data and/or information described herein as being stored in the database 50H or in the database 11H, it is to be understood that the database 50H contains or includes any and/or all data and/or information required, needed, and/or desired, for allowing and/or enabling the private election administrator computer 50 and/or the apparatus 100 to perform any and/or all of the functions and functionalities described herein as being performed by the private election administrator computer 50 and/or the apparatus 100 of the present invention.

In a preferred embodiment, the database 50H also contains and/or includes any software programs, software algorithms, and/or software applications ("apps") required, needed, and/or desired, for allowing and/or enabling the private election administrator computer 50 and/or the apparatus 100 to perform any and/or all of the functions and functionalities described herein as being performed, and/or as capable of being performed, by the private election administrator computer 50, the apparatus 100, and/or each of the herein-described user communication devices 20, campaign/project manager computers 30, public election administrator/governmental entity computers 40, provider computers 60, media computers 70, external information source computers 80, social network computers 85, financial institution computers 90, and/or RFID tags/RFID reader system(s) 95, of the apparatus 100.

In a preferred embodiment, the database 50H can also contain and/or include any data and/or information described herein as being contained and/or included in any of the databases 11H of any and/or all of the central processing computers 11 utilized in connection with the apparatus 100, any data and/or information described herein as being contained and/or included in any of the databases 20H of any and/or all of the user communication devices 20, any data and/or information described herein as being contained and/or included in any of the databases 30H of any and/or all of the campaign/project manager computers 30, any data and/or information described herein as being contained and/or included in any of the databases 40H of any and/or all of the public election administrator/governmental entity computers 40, any data and/or information described herein as being contained and/or included in any of the databases 60H of any and/or all of the provider computers 60, any data and/or information described herein as being contained and/or included in any of the databases 70H of any and/or all of the media computers 70, any data and/or information described herein as being contained and/or included in any of the databases 80H of any and/or all of the external information source computers 80, any data and/or information described herein as being contained and/or included in any of the databases 85H of any and/or all of the social network computers 85, and/or any data and/or information described herein as being contained and/or included in any of the databases 90H of any and/or all of the financial institution computers 90. In this regard, in a preferred embodiment, any data and/or information described herein as being contained and/or included in each of the respective databases 11H, 20H, 30H, 40H, 60H, 70H, 80H, 85H, and/or 90H, can be also be contained and/or included in the database 50H.

In a preferred embodiment, the database 50H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the private election administrator computer 50.

In a preferred embodiment, the database 50H can also contain and/or include data and/or information regarding any user account or user accounts of or associated with the respective user of, or the individual or entity associated with, the private election administrator computer 50. The database 50H can also contain and/or include any data and/or information, including identifying information for or regarding each RFID tag 95A assigned to, or associated with, the private election administrator computer 50.

The database 50H can also contain and/or include any of the reports, messages, alerts, alert messages, notification messages, or any other information, described herein as being generated by the apparatus 100 of the present invention and/or by any of the herein-described central processing computers 11, user communication devices 20, campaign/project manager computers 30, public election administrator/governmental entity computers 40, provider computers 60, media computers 70, external information source computers 80, social network computers 85, financial institution computers 90, and/or RFID tags/RFID reader systems 95, and which are transmitted to the private election administrator computer 50.

In a preferred embodiment, the database 50H can also contain and/or include any data and/or information which can be of any interest to any user or users of the private election administrator computer 50 and/or the apparatus 100.

The private election administrator computer 50 also includes an output device 50I for outputting any of the data, information, or reports, described herein or otherwise. In the preferred embodiment, the output device 50I can be a printer, a display, a transmitter, a modem, a speaker, and/or any other device, which can be used to output data or information.

The private election administrator computer 50 can also include a video and/or audio recording device(s) 50J which can include a camera and/or a video recording device, for recording pictures or video and/or video clips, and/or a microphone or an audio recording device, for recording audio or audio clips, which can be recorded by, and/or transmitted live, by or from the private election administrator computer 50, or which can be recorded by, and stored at or in, the private election administrator computer 50 for transmission by or from the private election administrator computer 50 at a later time. The video and/or audio recording device(s) 50J can also be utilized to facilitate one-way broadcasts from the private election administrator computer 50, and/or can be utilized to facilitate video conferencing, video chatting, and/or audio conferencing, and/or video and audio conferencing, between users of the private election administrator computer 50 and any of the herein-described users, individuals, persons, or entities, who or which utilize the apparatus 100 of the present invention.

The private election administrator computer 50 can also include a global positioning device 50K. In a preferred embodiment, the global positioning device 50K determines or can determine a position or location of the private election administrator computer 50.

In a preferred embodiment, the private election administrator computer 50 can also be equipped, and/or can be programmed, for voice activation operation and/or voice control operation of and/or regarding any and/or all of the herein-described operations and functions which are capable of being performed by the private election administrator computer 50.

Figure 7:
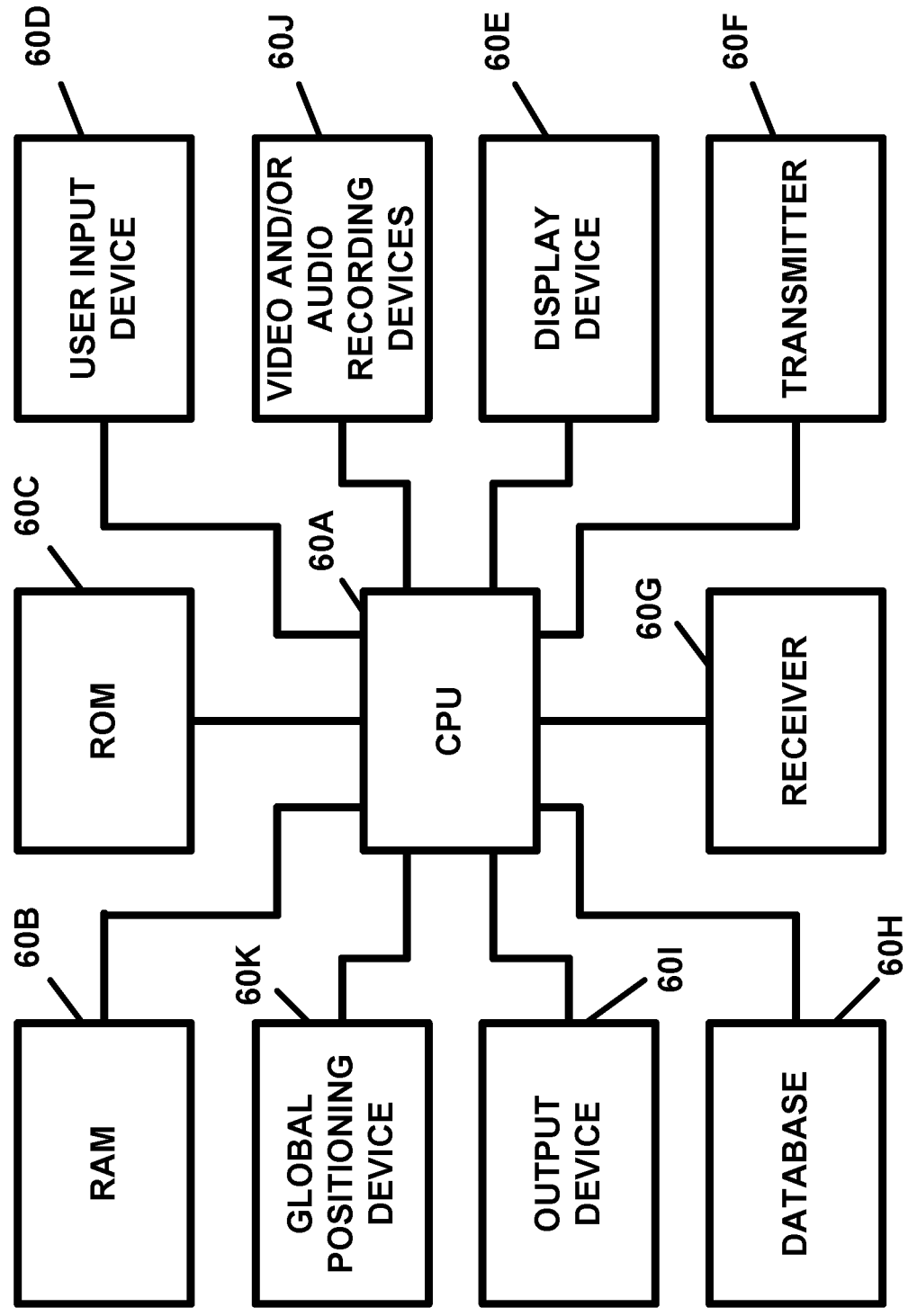
FIG. 7 illustrates the provider computer of FIG. 1, in block diagram form.

FIG. 7 illustrates the provider computer 60 of the apparatus 100, in block diagram form. The provider computer 60, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as a provider computer 60. In the preferred embodiment, provider computer 60 includes a central processing unit or CPU 60A, which, in the preferred embodiment, is a microprocessor. The CPU 60A can also be a microcomputer, a minicomputer, a macro-computer, and/or a mainframe computer, depending upon the application.

The provider computer 60 also includes a random access memory device(s) 60B (RAM) and a read only memory device(s) 60C (ROM), each of which is connected to, or linked with, the CPU 60A, and a user input device 60D, for entering data and/or information and/or commands into the provider computer 60, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the provider computer 60.

The user input device 60D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 60D is/are also connected to, or linked with, the CPU 60A.

The provider computer 60 also includes a display device 60E for displaying data and/or information to a user or individual. The display device 60E is also connected to, or linked with, the CPU 60A.

The provider computer 60 also includes a transmitter(s) 60F, for transmitting signals and/or data and/or information to any one or more of the herein-described central processing computer(s) 11, user communication devices 20, campaign/project manager computers 30, public election administrator/governmental entity computers 40, private election administrator computers 50, media computers 70, external information source computers 80, social network computers 85, financial institution computers 90, and/or RFID tags/RFID reader system(s) 95, and/or to any other provider computers 60 and/or any other individual computer(s) or individual communication device(s) which may be utilized in conjunction with the apparatus 100 of the present invention. The transmitter 60F is also connected to, or linked with, the CPU 60A.

The provider computer 60, also includes a receiver 60G, for receiving signals and/or data and/or information from any one or more of the herein-described central processing computer(s) 11, user communication devices 20, campaign/project manager computers 30, public election administrator/governmental entity computers 40, private election administrator computers 50, media computers 70, external information source computers 80, social network computers 85, financial institution computers 90, and/or RFID tags/RFID reader system(s) 95, and/or from any other provider computers 60 and/or any other individual computer(s) or individual communication device(s) which may be utilized in conjunction with the apparatus 100 of the present invention. The receiver 60G is also connected to, or linked with, the CPU 60A.

The provider computer 60 also includes a database(s) 60H which contains and/or includes any and/or all of the data and/or information required, needed, and/or desired, for allowing and/or enabling the provider computer 60 and/or the apparatus 100 to perform any and/or all of the functions and functionalities described herein as being performed, and/or as capable of being performed, by the provider computer 60 and/or the apparatus 100 of the present invention. In this regard, and notwithstanding any specific examples of data and/or information described herein as being stored in the database 60H or in the database 11H, it is to be understood that the database 60H contains or includes any and/or all data and/or information required, needed, and/or desired, for allowing and/or enabling the provider computer 60 and/or the apparatus 100 to perform any and/or all of the functions and functionalities described herein as being performed by the provider computer 60 and/or the apparatus 100 of the present invention.

In a preferred embodiment, the database 60H also contains and/or includes any software programs, software algorithms, and/or software applications ("apps"), required, needed, and/or desired, for allowing and/or enabling the provider computer 60 and/or the apparatus 100 to perform any and/or all of the functions and functionalities described herein as being performed, and/or as capable of being performed, by the provider computer 60, the apparatus 100, and/or each of the herein-described user communication devices 20, campaign/project manager computers 30, public election administrator/governmental entity computers 40, private election administrator computers 50, media computers 70, external information source computers 80, social network computers 85, financial institution computers 90, and/or RFID tags/RFID reader system(s) 95.

In a preferred embodiment, the database 60H can also contain and/or include any data and/or information described herein as being contained and/or included in any of the databases 11H of any and/or all of the central processing computers 11, any data and/or information described herein as being contained and/or included in any of the databases 20H of any and/or all of the user communication devices 20, any data and/or information described herein as being contained and/or included in any of the databases 30H of any and/or all of the campaign/project manager computers 30, any data and/or information described herein as being contained and/or included in any of the databases 40H of any and/or all of the public election administrator/governmental entity computers 40, any data and/or information described herein as being contained and/or included in any of the databases 50H of any and/or all of the private election administrator computers 50, any data and/or information described herein as being contained and/or included in any of the databases 70H of any and/or all of the media computers 70, any data and/or information described herein as being contained and/or included in any of the databases 80H of any and/or all of the external information source computers 80, any data and/or information described herein as being contained and/or included in any of the databases 85H of any and/or all of the social network computers 85, and/or any data and/or information described herein as being contained and/or included in any of the databases 90H of any and/or all of the financial institution computers 90. In this regard, in a preferred embodiment, any data and/or information described herein as being contained and/or included in each of the respective databases 11H, 20H, 30H, 40H, 50H, 70H, 80H, 85H, and/or 90H, can be also be contained and/or included in the database 60H.

In a preferred embodiment, the database 60H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the provider computer 60.

In a preferred embodiment, the database 60H can also contain and/or include data and/or information regarding any user account or user accounts of or associated with the respective user of, or the individual or entity associated with, the provider computer 60. The database 60H can also contain and/or include any data and/or information, including identifying information for or regarding each RFID tag 95A assigned to, or associated with, the provider computer 60.

The database 60H can also contain and/or include any of the reports, messages, alerts, alert messages, notification messages, or any other information, described herein as being generated by the apparatus 100 of the present invention and/or by any of the herein-described central processing computers 11, user communication devices 20, campaign/project manager computers 30, public election administrator/governmental entity computers 40, private election administrator computers 50, media computers 70, external information source computers 80, social network computers 85, financial institution computers 90, and/or RFID tags/RFID reader systems 95, and which are transmitted to the provider computer 60.

In a preferred embodiment, the database 60H can also contain and/or include any data and/or information which can be of any interest to any user or users of the provider computer 60 and/or the apparatus 100.

The provider computer 60 also includes an output device 60I for outputting any of the data, information, or reports, described herein or otherwise. In the preferred embodiment, the output device 601 can be a printer, a display, a transmitter, a modem, a speaker, and/or any other device, which can be used to output data or information.

The provider computer 60 can also include a video and/or audio recording device(s) 60J which can include a camera and/or a video recording device, for recording pictures or video and/or video clips, and/or a microphone or an audio recording device, for recording audio or audio clips, which can be recorded by, and/or transmitted live, by or from the provider computer 60, or which can be recorded by, and stored at or in, the provider computer 60 for transmission by or from the provider computer 60 at a later time. The video and/or audio recording device(s) 60J can also be utilized to facilitate one-way broadcasts from the provider computer 60, and/or can be utilized to facilitate video conferencing, video chatting, and/or audio conferencing, and/or video and audio conferencing, between users of the provider computer 60 and any of the herein-described users, individuals, persons, or entities, who or which utilize the apparatus 100 of the present invention.

The provider computer 60 can also include a global positioning device 60K. In a preferred embodiment, the global positioning device 60K determines or can determine a position or location of the provider computer 60.

In a preferred embodiment, the provider computer 60 can also be equipped, and/or can be programmed, for voice activation operation and/or voice control operation of and/or regarding any and/or all of the herein-described operations and functions which are capable of being performed by the provider computer 60.

Figure 8:
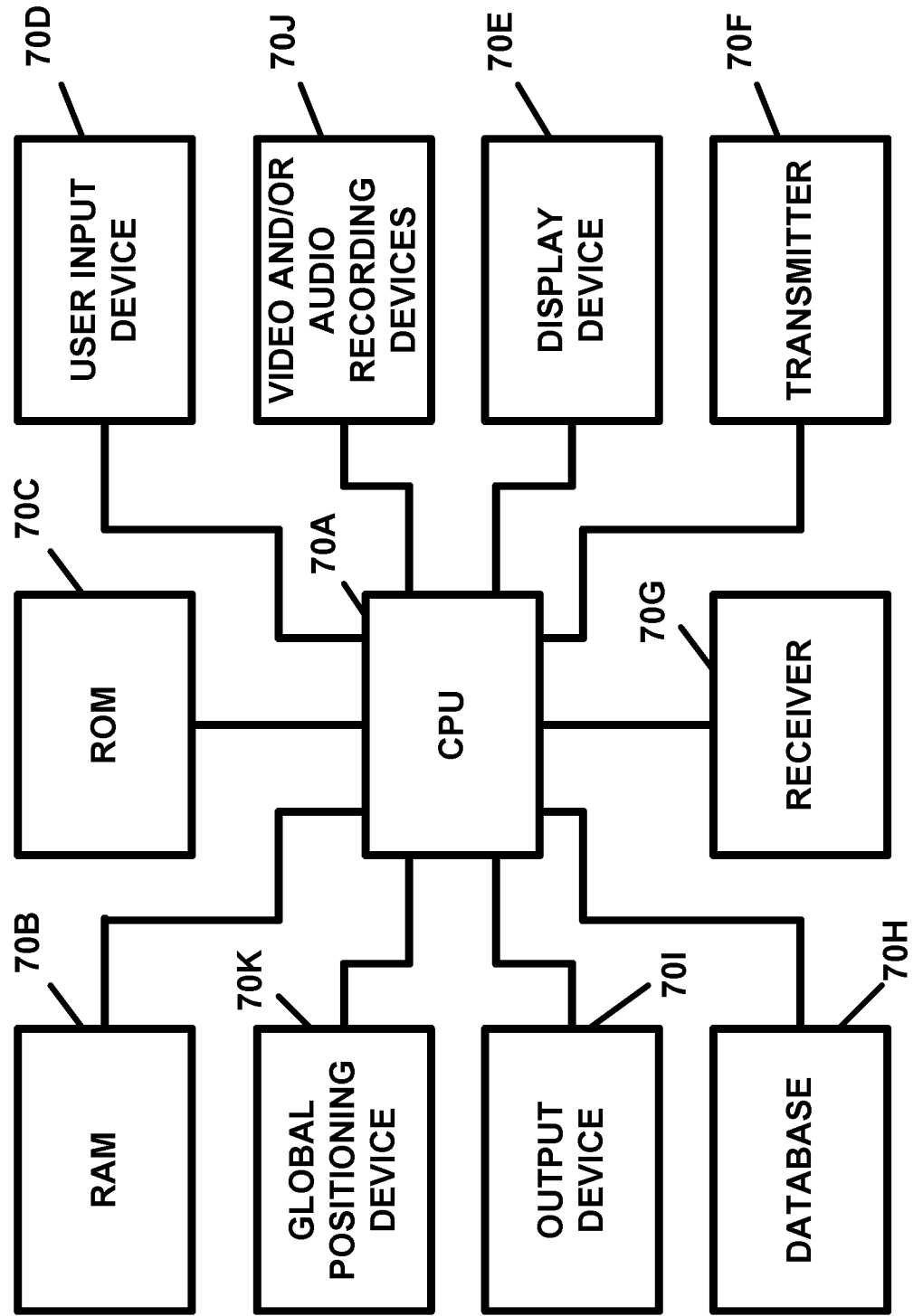
FIG. 8 illustrates the media computer of FIG. 1, in block diagram form.

FIG. 8 illustrates the media computer 70 of the apparatus 100, in block diagram form. The media computer 70, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as a media computer 70. In the preferred embodiment, media computer 70 includes a central processing unit or CPU 70A, which, in the preferred embodiment, is a microprocessor. The CPU 70A can also be a microcomputer, a minicomputer, a macro-computer, and/or a mainframe computer, depending upon the application.

The media computer 70 also includes a random access memory device(s) 70B (RAM) and a read only memory device(s) 70C (ROM), each of which is connected to, or linked with, the CPU 70A, and a user input device 70D, for entering data and/or information and/or commands into the media computer 70, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the media computer 70.

The user input device 70D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 70D is/are also connected to, or linked with, the CPU 70A.

The media computer 70 also includes a display device 70E for displaying data and/or information to a user or individual. The display device 70E is also connected to, or linked with, the CPU 70A.

The media computer 70 also includes a transmitter(s) 70F, for transmitting signals and/or data and/or information to any one or more of the herein-described central processing computer(s) 11, user communication devices 20, campaign/project manager computers 30, public election administrator/governmental entity computers 40, private election administrator computers 50, provider computers 60, external information source computers 80, social network computers 85, financial institution computers 90, and/or RFID tags/RFID reader system(s) 95, and/or to any other media computers 70 and/or any other individual computer(s) or individual communication device(s) which may be utilized in conjunction with the apparatus 100 of the present invention. The transmitter 70F is also connected to, or linked with, the CPU 70A.

The media computer 70 also includes a receiver 70G, for receiving signals and/or data and/or information from any one or more of the herein-described central processing computer(s) 11, user communication devices 20, campaign/project manager computers 30, public election administrator/governmental entity computers 40, private election administrator computers 50, provider computers 60, external information source computers 80, social network computers 85, financial institution computers 90, and/or RFID tags/RFID reader system(s) 95, and/or from any other media computers 70 and/or any other individual computer(s) or individual communication device(s) which may be utilized in conjunction with the apparatus 100 of the present invention. The receiver 70G is also connected to, or linked with, the CPU 70A.

The media computer 70 also includes a database(s) 70H which contains and/or includes any and/or all of the data and/or information required, needed, and/or desired, for allowing and/or enabling the media computer 70 and/or the apparatus 100 to perform any and/or all of the functions and functionalities described herein as being performed, and/or as capable of being performed, by the media computer 70 and/or the apparatus 100 of the present invention. In this regard, and notwithstanding any specific examples of data and/or information described herein as being stored in the database 70H or in the database 11H, it is to be understood that the database 70H contains or includes any and/or all data and/or information required, needed, and/or desired, for allowing and/or enabling the media computer 70 and/or the apparatus 100 to perform any and/or all of the functions and functionalities described herein as being performed by the media computer 70 and/or the apparatus 100 of the present invention.

In a preferred embodiment, the database 70H also contains and/or includes any software programs, software algorithms, and/or software applications ("apps"), required, needed, and/or desired, for allowing and/or enabling the media computer 70 and/or the apparatus 100 to perform any and/or all of the functions and functionalities described herein as being performed, and/or as capable of being performed, by the media computer 70, the apparatus 100 of the present invention, and/or each of the herein-described user communication devices 20, campaign/project manager computers 30, public election administrator/governmental entity computers 40, private election administrator computers 50, provider computers 60, external information source computers 80, social network computers 85, financial institution computers 90, and/or RFID tags/RFID reader system(s) 95.

In a preferred embodiment, the database 70H can also contain and/or include any data and/or information described herein as being contained and/or included in any of the databases 11H of any and/or all of the central processing computers 11, any data and/or information described herein as being contained and/or included in any of the databases 20H of any and/or all of the user communication devices 20, any data and/or information described herein as being contained and/or included in any of the databases 30H of any and/or all of the campaign/project manager computers 30, any data and/or information described herein as being contained and/or included in any of the databases 40H of any and/or all of the public election administrator/governmental entity computers 40, any data and/or information described herein as being contained and/or included in any of the databases 50H of any and/or all of the private election administrator computers 50, any data and/or information described herein as being contained and/or included in any of the databases 60H of any and/or all of the provider computers 60, any data and/or information described herein as being contained and/or included in any of the databases 80H of any and/or all of the external information source computers 80, any data and/or information described herein as being contained and/or included in any of the databases 85H of any and/or all of the social network computers 85, and/or any data and/or information described herein as being contained and/or included in any of the databases 90H of any and/or all of the financial institution computers 90. In this regard, in a preferred embodiment, any data and/or information described herein as being contained and/or included in each of the respective databases 11H, 20H, 30H, 40H, 50H, 60H, 80H, 85H, and/or 90H, can be also contained and/or included in the database 70H.

In a preferred embodiment, the database 70H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the media computer 70. In a preferred embodiment, the database 70H can also contain and/or include data and/or information regarding any user account or user accounts of or associated with the respective user of, or the individual or entity associated with, the media computer 70. The database 70H can also contain and/or include any data and/or information, including identifying information for or regarding each RFID tag 95A assigned to, or associated with, the media computer 70.

The database 70H can also contain and/or include any of the reports, messages, alerts, alert messages, notification messages, or any other information, described herein as being generated by the apparatus 100 of the present invention and/or by any of the herein-described central processing computers 11, user communication devices 20, campaign/project manager computers 30, public election administrator/governmental entity computers 40, private election administrator computers 50, provider computers 60, external information source computers 80, social network computers 85, financial institution computers 90, and/or RFID tags/ RFID reader systems 95, and which are transmitted to the media computer 70.

In a preferred embodiment, the database 70H can also contain and/or include any data and/or information which can be of any interest to any user or users of the media computer 70 and/or the apparatus 100.

The media computer 70 also includes an output device 701 for outputting any of the data, information, or reports, described herein or otherwise. In the preferred embodiment, the output device 701 can be a printer, a display, a transmitter, a modem, a speaker, and/or any other device, which can be used to output data or information.

The media computer 70 can also include a video and/or audio recording device(s) 70J which can include a camera and/or a video recording device, for recording pictures or video and/or video clips, and/or a microphone or an audio recording device, for recording audio or audio clips, which can be recorded by, and/or transmitted live, by or from the media computer 70, or which can be recorded by, and stored at or in, the media computer 70 for transmission by or from the media computer 70 at a later time. The video and/or audio recording device(s) 70J can also be utilized to facilitate one-way broadcasts from the media computer 70, and/or can be utilized to facilitate video conferencing, video chatting, and/or audio conferencing, and/or video and audio conferencing, between users of the media computer 70 and any of the herein-described users, individuals, persons, or entities, who or which utilize the apparatus 100 of the present invention.

The media computer 70 can also include a global positioning device 70K. In a preferred embodiment, the global positioning device 70K determines or can determine a position or location of the media computer 70.

In a preferred embodiment, the media computer 70 can also be equipped, and/or can be programmed, for voice activation operation and/or voice control operation of and/or regarding any and/or all of the herein-described operations and functions which are capable of being performed by the media computer 70.

Figure 9:
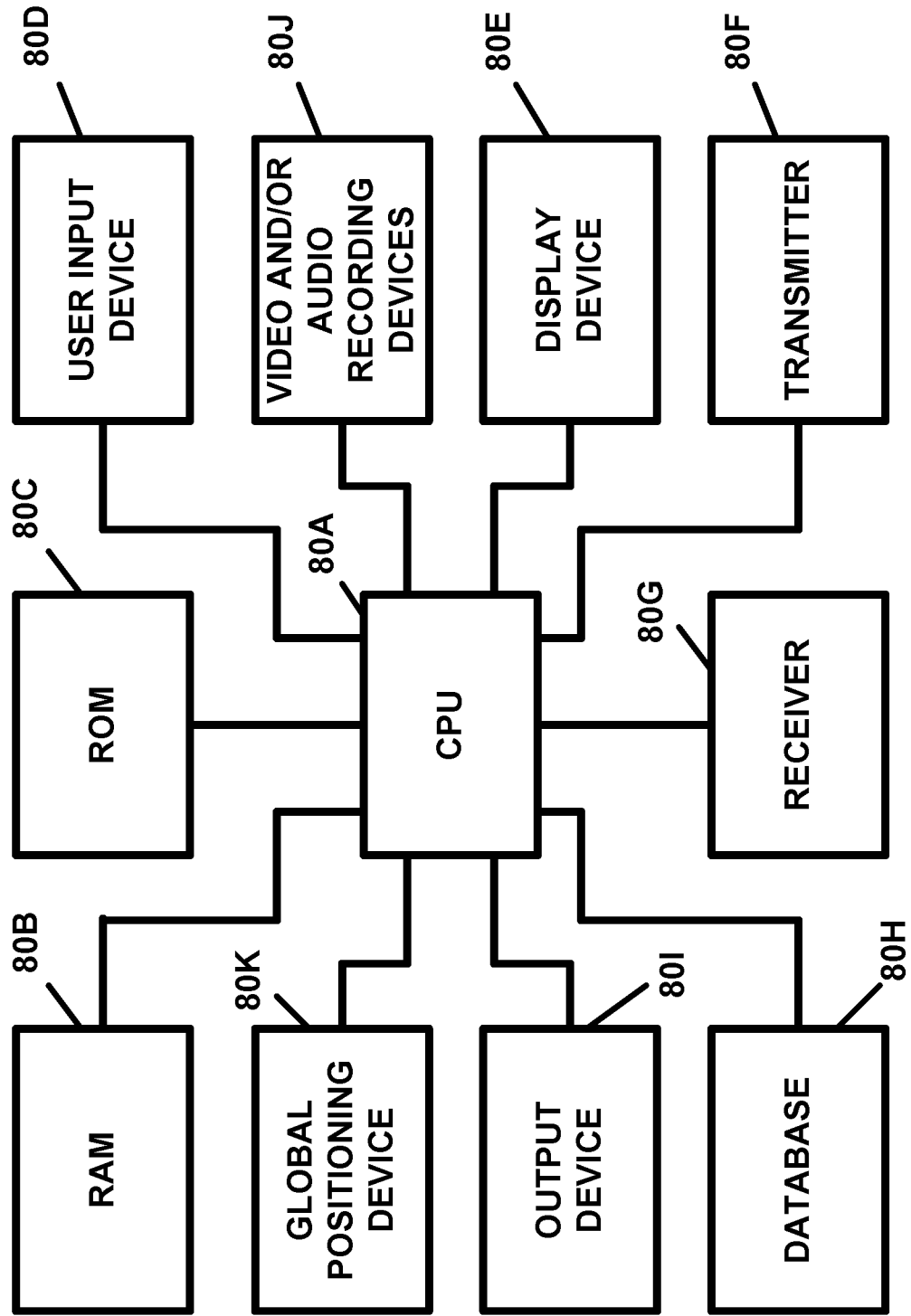
FIG. 9 illustrates the external information source computer of FIG. 1, in block diagram form.

FIG. 9 illustrates the external information source computer 80 of the apparatus 100, in block diagram form. The external information source computer 80, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as an external information source computer 80. In the preferred embodiment, the external information source computer 80 includes a central processing unit or CPU 80A, which, in the preferred embodiment, is a microprocessor. The CPU 80A can also be a microcomputer, a minicomputer, a macro-computer, and/or a mainframe computer, depending upon the application.

The external information source computer 80 also includes a random access memory device(s) 80B (RAM) and a read only memory device(s) 80C (ROM), each of which is connected to, or linked with, the CPU 80A, and a user input device 80D, for entering data and/or information and/or commands into the external information source computer 80, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the external information source computer 80.

The user input device 80D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 80D is/are also connected to, or linked with, the CPU 80A.

The external information source computer 80 also includes a display device 80E for displaying data and/or information to a user or individual. The display device 80E is also connected to, or linked with, the CPU 80A.

The external information source computer 80 also includes a transmitter(s) 80F, for transmitting signals and/or data and/or information to any one or more of the herein-described central processing computer(s) 11, user communication devices 20, campaign/project manager computers 30, public election administrator/governmental entity computers 40, private election administrator computers 50, provider computers 60, media computers 70, social network computers 85, financial institution computers 90, and/or RFID tags/RFID reader system(s) 95, and/or to any other external information source computers 80, and/or any other individual computer(s) or individual communication device(s) which may be utilized in conjunction with the apparatus 100 of the present invention. The transmitter 80F is also connected to, or linked with, the CPU 80A.

The external information source computer 80 also includes a receiver 80G, for receiving signals and/or data and/or information from any one or more of the herein-described central processing computer(s) 11, user communication devices 20, campaign/project manager computers 30, public election administrator/governmental entity computers 40, private election administrator computers 50, provider computers 60, media computers 70, social network computers 85, financial institution computers 90, and/or RFID tags/RFID reader system(s) 95, and/or from any other external information source computers 80, and/or any other individual computer(s) or individual communication device(s) which may be utilized in conjunction with the apparatus 100 of the present invention. The receiver 80G is also connected to, or linked with, the CPU 80A.

The external information source computer 80, also includes a database(s) 80H which contains and/or includes any and/or all of the data and/or information required, needed, and/or desired, for allowing and/or enabling the external information source computer 80 and/or the apparatus 100 to perform any and/or all of the functions and functionalities described herein as being performed, and/or as capable of being performed, by the external information source computer 80, and/or the apparatus 100 of the present invention. In this regard, and notwithstanding any specific examples of data and/or information described herein as being stored in the database 80H or in the database 11H, it is to be understood that the database 80H contains or includes any and/or all data and/or information required, needed, and/or desired, for allowing and/or enabling the external information source computer 80 and/or the apparatus 100 to perform any and/or all of the functions and functionalities described herein as being performed by the external information source computer 80 and/or the apparatus 100 of the present invention.

In a preferred embodiment, the database 80H also contains and/or includes any software programs, software algorithms, and/or software applications ("apps"), required, needed, and/or desired, for allowing and/or enabling the external information source computer 80 and/or the apparatus 100 to perform any and/or all of the functions and functionalities described herein as being performed, and/or as capable of being performed, by the external information source computer 80, the apparatus 100, and/or each of the herein-described user communication devices 20, campaign/project manager computers 30, public election administrator/governmental entity computers 40, private election administrator computers 50, provider computers 60, media computers 70, social network computers 85, financial institution computers 90, and/or RFID tags/RFID reader system(s) 95.

In a preferred embodiment, the database 80H can also contain and/or include any data and/or information described herein as being contained and/or included in any of the databases 11H of any and/or all of the central processing computers 11, any data and/or information described herein as being contained and/or included in any of the databases 20H of any and/or all of the user communication devices 20, any data and/or information described herein as being contained and/or included in any of the databases 30H of any and/or all of the campaign/project manager computers 30, any data and/or information described herein as being contained and/or included in any of the databases 40H of any and/or all of the public election administrator/governmental entity computers 40, any data and/or information described herein as being contained and/or included in any of the databases 50H of any and/or all of the private election administrator computers 50, any data and/or information described herein as being contained and/or included in any of the databases 60H of any and/or all of the provider computers 60, any data and/or information described herein as being contained and/or included in any of the databases 70H of any and/or all of the media computers 70, any data and/or information described herein as being contained and/or included in any of the databases 85H of any and/or all of the social network computers 85, and/or any data and/or information described herein as being contained and/or included in any of the databases 90H of any and/or all of the financial institution computers 90. In this regard, in a preferred embodiment, any data and/or information described herein as being contained and/or included in each of the respective databases 11H, 20H, 30H, 40H, 50H, 60H, 70H, 85H, and/or 90H, can be also be contained and/or included in the database 80H.

In a preferred embodiment, the database 80H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the external information source computer 80.

In a preferred embodiment, the database 80H can also contain and/or include data and/or information regarding any user account or user accounts of or associated with the respective user of, or the individual or entity associated with, the external information source computer 80. The database 80H can also contain and/or include any data and/or information, including identifying information for or regarding each RFID tag 95A assigned to, or associated with, the external information source computer 80.

The database 80H can also contain and/or include any of the reports, messages, alerts, alert messages, notification messages, or any other information, described herein as being generated by the apparatus 100 of the present invention and/or by any of the herein-described central processing computers 11, user communication devices 20, campaign/project manager computers 30, public election administrator/governmental entity computers 40, private election administrator computers 50, provider computers 60, media computers 70, social network computers 85, financial institution computers 90, and/or RFID tags/RFID reader systems 95, and which are transmitted to the external information source computer 80.

In a preferred embodiment, the database 80H can also contain and/or include any data and/or information which can be of any interest to any user or users of the external information source computer 80 and/or the apparatus 100.

The external information source computer 80 also includes an output device 80I for outputting any of the data, information, or reports, described herein or otherwise. In the preferred embodiment, the output device 80I can be a printer, a display, a transmitter, a modem, a speaker, and/or any other device, which can be used to output data or information.

The external information source computer 80 can also include a video and/or audio recording device(s) 80J which can include a camera and/or a video recording device, for recording pictures or video and/or video clips, and/or a microphone or an audio recording device, for recording audio or audio clips, which can be recorded by, and/or transmitted live, by or from the external information source computer 80, or which can be recorded by, and stored at or in, the external information source computer 80 for transmission by or from the external information source computer 80 at a later time. The video and/or audio recording device(s) 80J can also be utilized to facilitate one-way broadcasts from the external information source computer 80, and/or can be utilized to facilitate video conferencing, video chatting, and/or audio conferencing, and/or video and audio conferencing, between users of the external information source computer 80 and any of the herein-described users, individuals, persons, or entities, who or which utilize the apparatus 100 of the present invention.

The external information source computer 80 can also include a global positioning device 80K. In a preferred embodiment, the global positioning device 80K determines or can determine a position or location of the external information source computer 80.

In a preferred embodiment, the external information source computer 80 can also be equipped, and/or can be programmed, for voice activation operation and/or voice control operation of and/or regarding any and/or all of the herein-described operations and functions which are capable of being performed by the external information source computer 80.

Figure 10:
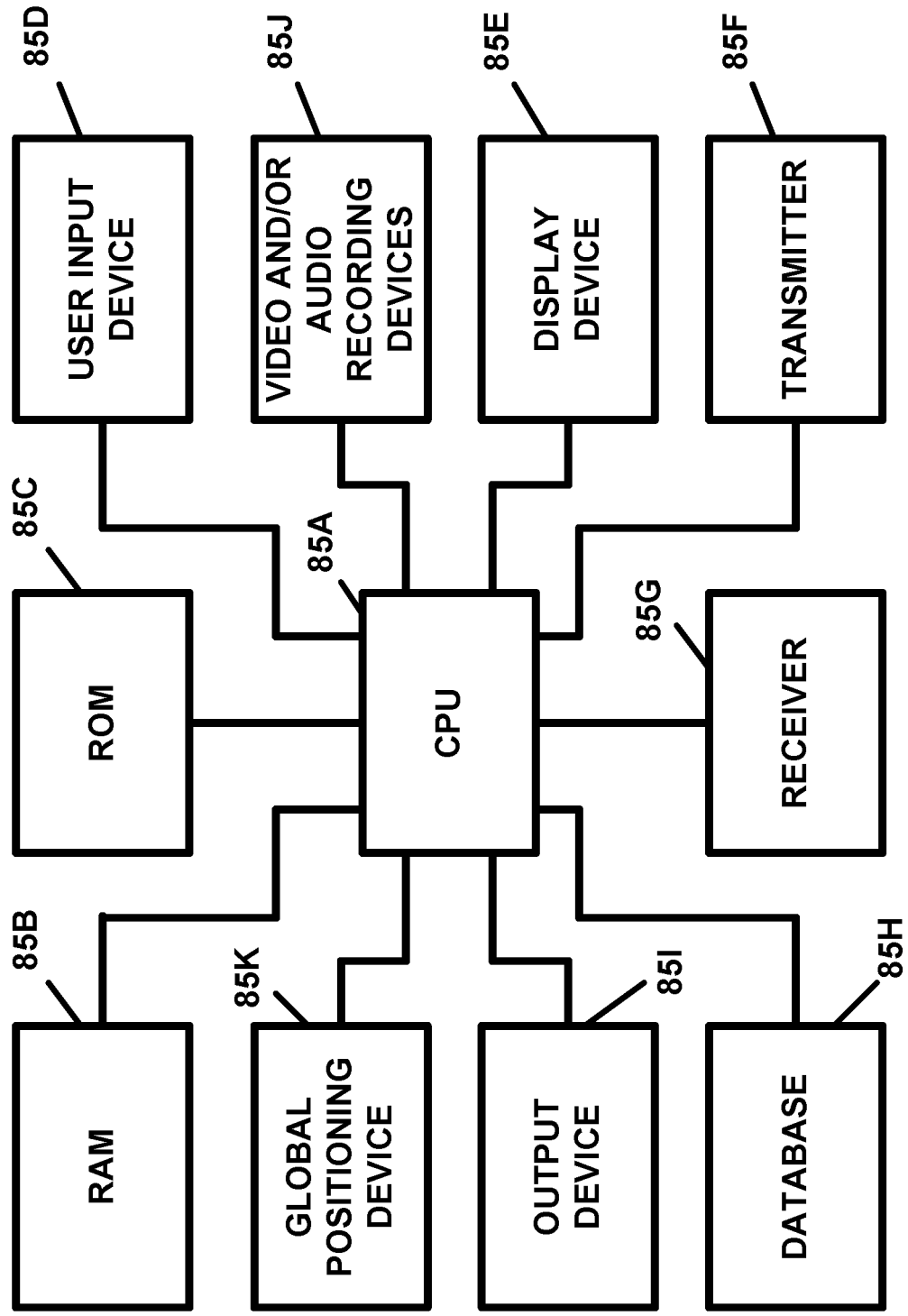
FIG. 10 illustrates the social network computer of FIG. 1, in block diagram form.
Figure 11:
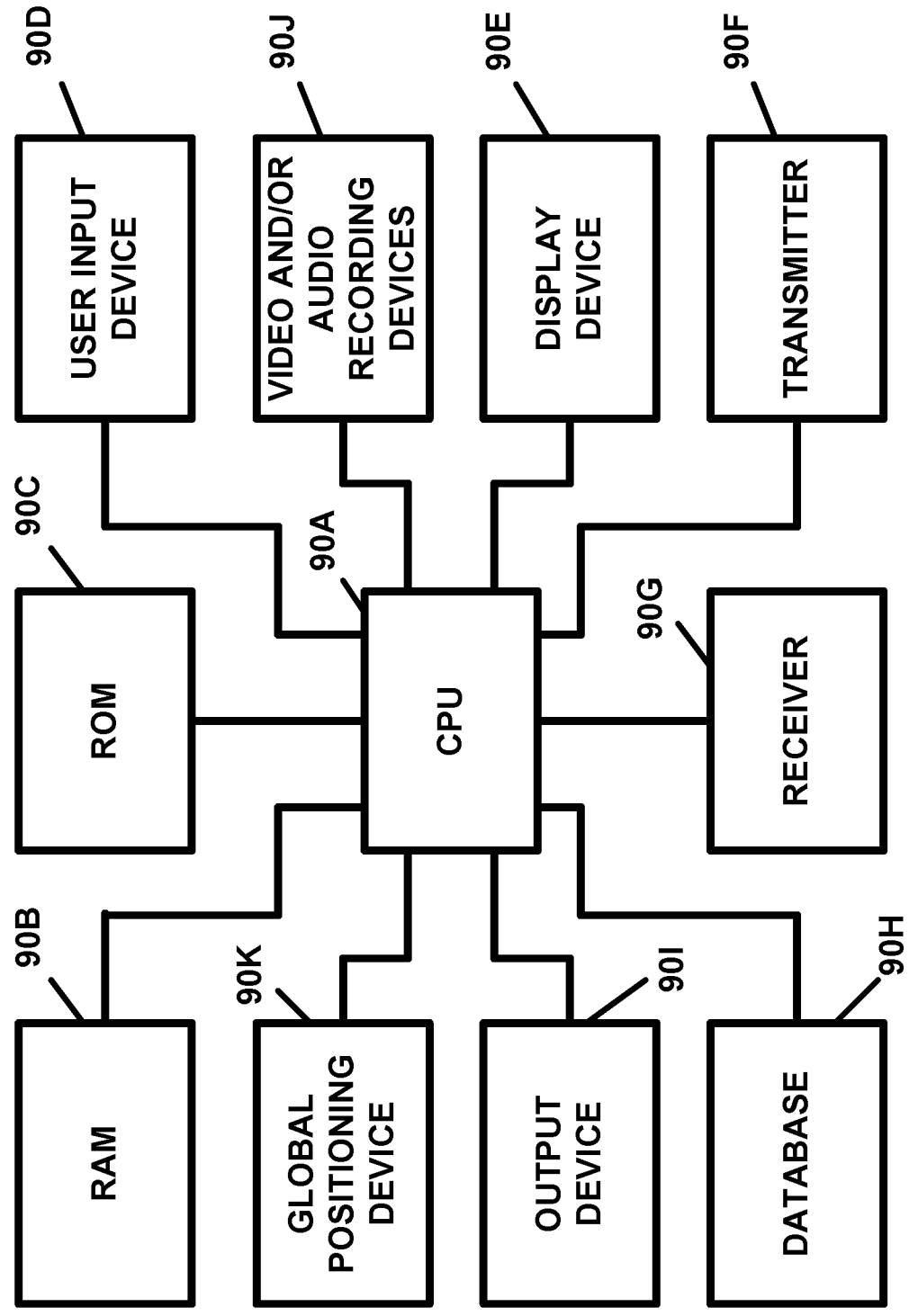
FIG. 11 illustrates the financial institution computer of FIG. 1, in block diagram form.

FIG. 10 illustrates the social network computer 85 of the apparatus 100, in block diagram form. The social network computer 85, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as a social network computer 85. In the preferred embodiment, the social network computer 85 includes a central processing unit or CPU 85A, which, in the preferred embodiment, is a microprocessor. The CPU 85A can also be a microcomputer, a minicomputer, a macro-computer, and/or a mainframe computer, depending upon the application.

The social network computer 85 also includes a random access memory device(s) 85B (RAM) and a read only memory device(s) 85C (ROM), each of which is connected to, or linked with, the CPU 85A, and a user input device 85D, for entering data and/or information and/or commands into the social network computer 85, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the social network computer 85.

The user input device 85D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 85D is/are also connected to, or linked with, the CPU 85A.

The social network computer 85 also includes a display device 85E for displaying data and/or information to a user or individual. The display device 85E is also connected to, or linked with, the CPU 85A.

The social network computer 85 also includes a transmitter(s) 85F, for transmitting signals and/or data and/or information to any one or more of the herein-described central processing computer(s) 11, user communication devices 20, campaign/project manager computers 30, public election administrator/governmental entity computers 40, private election administrator computers 50, provider computers 60, media computers 70, external information source computers 80, financial institution computers 90, and/or RFID tags/RFID reader system(s) 95, and/or to any other social network computers 85, and/or any other individual computer(s) or individual communication device(s) which may be utilized in conjunction with the apparatus 100 of the present invention. The transmitter 85F is also connected to, or linked with, the CPU 85A.

The social network computer 85 also includes a receiver 85G, for receiving signals and/or data and/or information from any one or more of the herein-described central processing computer(s) 11, user communication devices 20, campaign/project manager computers 30, public election administrator/governmental entity computers 40, private election administrator computers 50, provider computers 60, media computers 70, external information source computers 80, financial institution computers 90, and/or RFID tags/RFID reader system(s) 95, and/or from any other social network computers 85 and/or any other individual computer(s) or individual communication device(s) which may be utilized in conjunction with the apparatus 100 of the present invention. The receiver 85G is also connected to, or linked with, the CPU 85A.

The social network computer 85, also includes a database(s) 85H which contains and/or includes any and/or all of the data and/or information required, needed, and/or desired, for allowing and/or enabling the social network computer 85 and/or the apparatus 100 to perform any and/or all of the functions and functionalities described herein as being performed, and/or as capable of being performed, by the social network computer 85 and/or the apparatus 100 of the present invention. In this regard, and notwithstanding any specific examples of data and/or information described herein as being stored in the database 85H or in the database 11H, it is to be understood that the database 85H contains or includes any and/or all data and/or information required, needed, and/or desired, for allowing and/or enabling the social network computer 85 and/or the apparatus 100 to perform any and/or all of the functions and functionalities described herein as being performed by the social network computer 85 and/or the apparatus 100 of the present invention.

In a preferred embodiment, the database 85H also contains and/or includes any software programs, software algorithms, and/or software applications ("apps"), required, needed, and/or desired, for allowing and/or enabling the social network computer 85 and/or the apparatus 100 to perform any and/or all of the functions and functionalities described herein as being performed, and/or as capable of being performed, by the social network computer 85, the apparatus 100, and/or each of the herein-described user communication devices 20, campaign/project manager computers 30, public election administrator/governmental entity computers 40, private election administrator computers 50, provider computers 60, media computers 70, external information source computers 80, financial institution computers 90, and/or RFID tags/RFID reader system(s) 95, of the apparatus 100 of the present invention.

In a preferred embodiment, the database 85H can also contain and/or include any data and/or information described herein as being contained and/or included in any of the databases 11H of any and/or all of the central processing computers 11, any data and/or information described herein as being contained and/or included in any of the databases 20H of any and/or all of the user communication devices 20, any data and/or information described herein as being contained and/or included in any of the databases 30H of any and/or all of the campaign/project manager computers 30, any data and/or information described herein as being contained and/or included in any of the databases 40H of any and/or all of the public election administrator/governmental entity computers 40, any data and/or information described herein as being contained and/or included in any of the databases 50H of any and/or all of the private election administrator computers 50, any data and/or information described herein as being contained and/or included in any of the databases 60H of any and/or all of the provider computers 60, any data and/or information described herein as being contained and/or included in any of the databases 70H of any and/or all of the media computers 70, any data and/or information described herein as being contained and/or included in any of the databases 80H of any and/or all of the external information source computers 80, and/or any data and/or information described herein as being contained and/or included in any of the databases 90H of any and/or all of the financial institution computers 90. In this regard, in a preferred embodiment, any data and/or information described herein as being contained and/or included in each of the respective databases 11H, 20H, 30H, 40H, 50H, 60H, 70H, 80H, and/or 90H, can be also be contained and/or included in the database 85H.

In a preferred embodiment, the database 85H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the social network computer 85.

In a preferred embodiment, the database 85H can also contain and/or include data and/or information regarding any user account or user accounts of or associated with the respective user of, or the individual or entity associated with, the social network computer 85.

In a preferred embodiment, the database 85H can also contain and/or include any data and/or information regarding all members and/or social networking members of the social networking company which utilizes, or is associated with, the social network computer 85, including, but not limited to, any and/or all profiles, profile pages, home pages, photographs, video recordings or video clips, audio clips, messages, posts, comments, contact information of any type or kind, and/or any other data and/or information regarding all of the members and/or social networking members of the social networking company which utilizes, or is associated with, the social network computer 85, as well as any and/or all data and/or information regarding the social networking company itself.

The database 85H can also contain and/or include any data and/or information, including identifying information for or regarding each RFID tag 95A assigned to, or associated with, the social network computer 85.

The database 85H can also contain and/or include any of the reports, messages, alerts, alert messages, notification messages, or any other information, described herein as being generated by the apparatus 100 of the present invention and/or by any of the herein-described central processing computers 11, user communication devices 20, campaign/project manager computers 30, public election administrator/governmental entity computers 40, private election administrator computers 50, provider computers 60, media computers 70, external information source computers 80, financial institution computers 90, and/or RFID tags/RFID reader systems 95, and which are transmitted to the social network computer 85.

In a preferred embodiment, the database 85H can also contain and/or include any data and/or information which can be of any interest to any user or users of the social network computer 85 and/or the apparatus 100.

The social network computer 85 also includes an output device 851 for outputting any of the data, information, or reports, described herein or otherwise. In the preferred embodiment, the output device 851 can be a printer, a display, a transmitter, a modem, a speaker, and/or any other device, which can be used to output data or information.

The social network computer 85 can also include a video and/or audio recording device(s) 85J which can include a camera and/or a video recording device, for recording pictures or video and/or video clips, and/or a microphone or an audio recording device, for recording audio or audio clips, which can be recorded by, and/or transmitted live, by or from the social network computer 85, or which can be recorded by, and stored at or in, the social network computer 85 for transmission by or from the social network computer 85 at a later time. The video and/or audio recording device(s) 85J can also be utilized to facilitate one-way broadcasts from the social network computer 85, and/or can be utilized to facilitate video conferencing, video chatting, and/or audio conferencing, and/or video and audio conferencing, between users of the social network computer 85 and any of the herein-described users, individuals, persons, or entities, who or which utilize the apparatus 100 of the present invention.

The social network computer 85 can also include a global positioning device 85K. In a preferred embodiment, the global positioning device 85K determines or can determine a position or location of the social network computer 85.

In a preferred embodiment, the social network computer 85 can also be equipped, and/or can be programmed, for voice activation operation and/or voice control operation of and/or regarding any and/or all of the herein-described operations and functions which are capable of being performed by the social network computer 85.

FIG. 10 illustrates the financial institution computer 90 of the apparatus 100, in block diagram form. The financial institution computer 90, in the preferred embodiment, can be any communication device, computer, personal computer, laptop computer, notebook computer, Smart phone or smartphone, smart telephone, cellular telephone, personal digital assistant, wireless telephone, wireless communication device, tablet, tablet computer, television, interactive television, digital television, watch, smart watch, or wearable device or computer, a server computer, a mainframe computer, a mini-computer, a microcomputer, or a kiosk, or any combination of same, or any equivalent of same, or any other computer or communication device, which can provide the functionality of, and which can be utilized as a financial institution computer 90. In the preferred embodiment, the financial institution computer 90 includes a central processing unit or CPU 90A, which, in the preferred embodiment, is a microprocessor. The CPU 90A can also be a microcomputer, a minicomputer, a macro-computer, and/or a mainframe computer, depending upon the application.

The financial institution computer 90 also includes a random access memory device(s) 90B (RAM) and a read only memory device(s) 90C (ROM), each of which is connected to, or linked with, the CPU 90A, and a user input device 90D, for entering data and/or information and/or commands into the financial institution computer 90, which can include any one or more of a keyboard, a scanner, a user pointing device, such as, for example, a mouse, a touch pad, and/or an audio input device and/or a video input device, a microphone or audio recording device, a camera or a video recording device, and/or any device, electronic and/or otherwise, which can be utilized for inputting and/or entering data and/or information and/or commands into the financial institution computer 90.

The user input device 90D can also include a card swiping device, a retinal scanning device, a fingerprint recognition device, a voice recognition device, a retinal scanner, a fingerprint device, a voice recognition device, a handprint recognition device, a handprint geometry recognition device, a facial feature recognition device, and/or any one or more of the biometric devices used to control access to a computer or a computer network which are known to those skilled in the art at the time of the filing of this patent application. The user input device(s) 90D is/are also connected to, or linked with, the CPU 90A.

The financial institution computer 90 also includes a display device 90E for displaying data and/or information to a user or individual. The display device 90E is also connected to, or linked with, the CPU 90A.

The financial institution computer 90 also includes a transmitter(s) 90F, for transmitting signals and/or data and/or information to any one or more of the herein-described central processing computer(s) 11, user communication devices 20, campaign/project manager computers 30, public election administrator/governmental entity computers 40, private election administrator computers 50, provider computers 60, media computers 70, external information source computers 80, social network computers 85, and/or RFID tags/RFID reader system(s) 95, and/or to any other financial institution computers 90, and/or any other individual computer(s) or individual communication device(s) which may be utilized in conjunction with the apparatus 100 of the present invention. The transmitter 90F is also connected to, or linked with, the CPU 90A.

The financial institution computer 90 also includes a receiver 90G, for receiving signals and/or data and/or information from any one or more of the herein-described central processing computer(s) 11, user communication devices 20, campaign/project manager computers 30, public election administrator/governmental entity computers 40, private election administrator computers 50, provider computers 60, media computers 70, external information source computers 80, social network computers 85, and/or RFID tags/RFID reader system(s) 95, and/or from any other financial institution computers 90 and/or any other individual computer(s) or individual communication device(s) which may be utilized in conjunction with the apparatus 100 of the present invention. The receiver 90G is also connected to, or linked with, the CPU 90A.

The financial institution computer 90, also includes a database(s) 90H which contains and/or includes any and/or all of the data and/or information required, needed, and/or desired, for allowing and/or enabling the financial institution computer 90 and/or the apparatus 100 to perform any and/or all of the functions and functionalities described herein as being performed, and/or as capable of being performed, by the financial institution computer 90 and/or the apparatus 100 of the present invention. In this regard, and notwithstanding any specific examples of data and/or information described herein as being stored in the database 90H or in the database 11H, it is to be understood that the database 90H contains or includes any and/or all data and/or information required, needed, and/or desired, for allowing and/or enabling the financial institution computer 90 and/or the apparatus 100 to perform any and/or all of the functions and functionalities described herein as being performed by the financial institution computer 90 and/or the apparatus 100 of the present invention.

In a preferred embodiment, the database 90H also contains and/or includes any software programs, software algorithms, and/or software applications ("apps") required, needed, and/or desired, for allowing and/or enabling the financial institution computer 90 and/or the apparatus 100 to perform any and/or all of the functions and functionalities described herein as being performed, and/or as capable of being performed, by the financial institution computer 90, the apparatus 100, and/or each of the herein-described user communication devices 20, campaign/project manager computers 30, public election administrator/governmental entity computers 40, private election administrator computers 50, provider computers 60, media computers 70, external information source computers 80, social network computers 85, and/or RFID tags/RFID reader system(s) 95.

In a preferred embodiment, the database 90H can also contain and/or include any data and/or information described herein as being contained and/or included in any of the databases 11H of any and/or all of the central processing computers 11, any data and/or information described herein as being contained and/or included in any of the databases 20H of any and/or all of the user communication devices 20, any data and/or information described herein as being contained and/or included in any of the databases 30H of any and/or all of the campaign/project manager computers 30, any data and/or information described herein as being contained and/or included in any of the databases 40H of any and/or all of the public election administrator/governmental entity computers 40, any data and/or information described herein as being contained and/or included in any of the databases 50H of any and/or all of the private election administrator computers 50, any data and/or information described herein as being contained and/or included in any of the databases 60H of any and/or all of the provider computers 60, any data and/or information described herein as being contained and/or included in any of the databases 70H of any and/or all of the media computers 70, any data and/or information described herein as being contained and/or included in any of the databases 80H of any and/or all of the external information source computers 80, and/or any data and/or information described herein as being contained and/or included in any of the databases 85H of any and/or all of the social network computers 85. In this regard, in a preferred embodiment, any data and/or information described herein as being contained and/or included in each of the respective databases 11H, 20H, 30H, 40H, 50H, 60H, 70H, 80H, and/or 85H, can be also be contained and/or included in the database 90H.

In a preferred embodiment, the database 90H can also contain and/or include data and/or information regarding the name, address, telephone number(s), fax number(s), text message number, instant message number, SMS message number, or MMS message number, or any other messaging number, videoconferencing or video chat identification (ID) name or number, e-mail address, website(s) information, domain name(s), uniform resource locator(s) (url(s)), and/or IP address(es), and/or any other contact information for or regarding the respective user of, or the individual or entity associated with, the financial institution computer 90.

In a preferred embodiment, the database 90H can also contain and/or include data and/or information regarding any user account or user accounts of or associated with the respective user of, or the individual or entity associated with, the financial institution computer 90.

In a preferred embodiment, the database 90H can also contain and/or include any data and/or information regarding any of the financial accounts of or for, and/or any other data and/or information regarding, any of the individuals, governmental entities, boards of elections, public entities, private entities, public election administrators, private election administrators, providers, media providers, external information sources, social networks, campaign/project managers, candidates, campaigns, elections, and/or other entities, described herein, who or which utilize the apparatus 100 and method of the present invention, as well as any information and/or contact information regarding the financial institution which utilizes, or which is associated with, the financial institution computer 90. The database 90H can also contain and/or include any data and/or information, including identifying information for or regarding each RFID tag 95A assigned to, or associated with, the financial institution computer 90.

The database 90H can also contain and/or include any of the reports, messages, alerts, alert messages, notification messages, or any other information, described herein as being generated by the apparatus 100 of the present invention and/or by any of the herein-described central processing computers 11, user communication devices 20, campaign/project manager computers 30, public election administrator/governmental entity computers 40, private election administrator computers 50, provider computers 60, media computers 70, external information source computers 80, social network computers 85, and/or RFID tags/RFID reader systems 95, and which are transmitted to the financial institution computer 90.

In a preferred embodiment, the database 90H can also contain and/or include any data and/or information which can be of any interest to any user or users of the financial institution computer 90 and/or the apparatus 100.

The financial institution computer 90 also includes an output device 901 for outputting any of the data, information, or reports, described herein or otherwise. In the preferred embodiment, the output device 901 can be a printer, a display, a transmitter, a modem, a speaker, and/or any other device, which can be used to output data or information.

The financial institution computer 90 can also include a video and/or audio recording device(s) 90J which can include a camera and/or a video recording device, for recording pictures or video and/or video clips, and/or a microphone or an audio recording device, for recording audio or audio clips, which can be recorded by, and/or transmitted live, by or from the financial institution computer 90, or which can be recorded by, and stored at or in, the financial institution computer 90 for transmission by or from the financial institution computer 90 at a later time. The video and/or audio recording device(s) 90J can also be utilized to facilitate one-way broadcasts from the financial institution computer 90, and/or can be utilized to facilitate video conferencing, video chatting, and/or audio conferencing, and/or video and audio conferencing, between users of the financial institution computer 90 and any of the herein-described users, individuals, persons, or entities, who or which utilize the apparatus 100 of the present invention.

The financial institution computer 90 can also include a global positioning device 90K. In a preferred embodiment, the global positioning device 90K determines or can determine a position or location of the financial institution computer 90.

In a preferred embodiment, the financial institution computer 90 can also be equipped, and/or can be programmed, for voice activation operation and/or voice control operation of and/or regarding any and/or all of the herein-described operations and functions which are capable of being performed by the financial institution computer 90.

The apparatus 100 and methods of the present invention can be utilized in numerous preferred embodiments in order to provide a vast array of services, functions, and/or functionalities, regarding and/or relating to elections and/or campaigns for public offices, pubic elections, private elections, entity or organizational elections, voting activities regarding contests, tournaments, competitive events, competitions, and/or pageants, of any type or kind, voting and/or polling activities in marketing campaigns, and/or in conducting polling activities and/or in conducting surveys or any type or kind.

The apparatus 100 and methods of the present invention can be utilized by any governmental, public, or private, entity or organization, in order to provide, to administer, to oversee, and/or to conduct, elections of any type or kind in a secured environment. The apparatus 100 and methods of the present invention can also be utilized in order to allow members of a voting group or electorate to nominate a candidate or prospective candidate for any elected position or office by electronically signing, in an appropriate manner, the candidates nominating petition for that elected position or office. The apparatus 100 and methods of the present invention can also be utilized to allow a prospective candidate for an elected position or office to circulate a nominating position to members of a voting group or electorate, provide information about himself or herself, engage with any member or members of the voting group or electorate, electronically collect electronic or other signatures for his or her nominating petition, and/or submit his or her nominating petition via the apparatus 100 of the present invention to the appropriate entity, organization, or authority.

The apparatus 100 and methods of the present invention can also be utilized in order to provide an on-line election and/or campaign forum for allowing members of a voting group or electorate to attend and/or to engage in virtual and/or on-line campaign events, on-line campaigning events or activities, on-line candidates events and/or debates, and/or online town hall meetings. The apparatus 100 and methods of the present invention can also be utilized in order to provide electronic notifications to members of voting group or electorate regarding the scheduling and/or occurrences of elections and/or campaigns for public offices, pubic elections, private elections, entity or organizational elections, voting activities regarding contests, tournaments, competitive events, competitions, and/or pageants, of any type or kind, voting and/or polling activities in marketing campaigns, and/or in conducting polling activities and/or in conducting surveys or any type or kind, and/or the scheduling and/or occurrences of any activities or events relating thereto. The apparatus 100 and methods of the present invention can also provide members of a voting group or electorate with the ability to schedule an appointment to vote in or for an election, contest, tournament, competitive event, competition, and/or pageant, and/or in or for any marketing campaign, polling activity, or survey.

The apparatus 100 and methods of the present invention can also be utilized in order to provide a number or other and additional services, functions, and/or functionalities, regarding and/or relating to elections and/or campaigns of any type or kind as described herein.

It is important to note that, in a preferred embodiment, as well as in any and/or all of the preferred embodiments and/or other embodiments described herein, in addition to any of the herein-described data and/or information described herein as being stored, contained, and/or included, in each of the respective databases 11H, 20H, 30H, 40H, 50H, 60H, 70H, 80H, 85H, and/or 90H, of the respective computers or communication devices 11, 20, 30, 40, 50, 60, 70, 80, 85, and/or 90, the respective databases 11H, 20H, 30H, 40H, 50H, 60H, 70H, 80H, 85H, and/or 90H, can also store, contain, and/or include, any and/or all data and/or information which is needed, required, and/or desired, for allowing and/or for enabling or equipping each of the apparatus 100, the central processing computer 11, and/or each of the respective computers or communication devices 20, 30, 40, 50, 60, 70, 80, 85, and/or 90, to perform any and/or all of the processing routines, functions, and/or functionalities, described herein as being performed by, or as being capable of being performed by, the apparatus 100 of the present invention, the central processing computer 11, and/or any of the respective computers or communication devices 20, 30, 40, 50, 60, 70, 80, 85, and/or 90, in any and/or all of the preferred embodiments of FIGS. 12A and 12B, 13A and 13B, 14, 15, 16, 17, 18A and 18B, 19A and 19B, 20A and 20B, 21, 22A and 22B, 23, 24, and 25A and 25B, and/or in any and/or all of the other embodiments described herein.

The apparatus 100 and methods of the present invention can be utilized by any governmental, public, or private, entity or organization, in order to provide, to administer, to oversee, and/or to conduct, an election or elections of any type or kind in a secured environment.

Figure 12A:
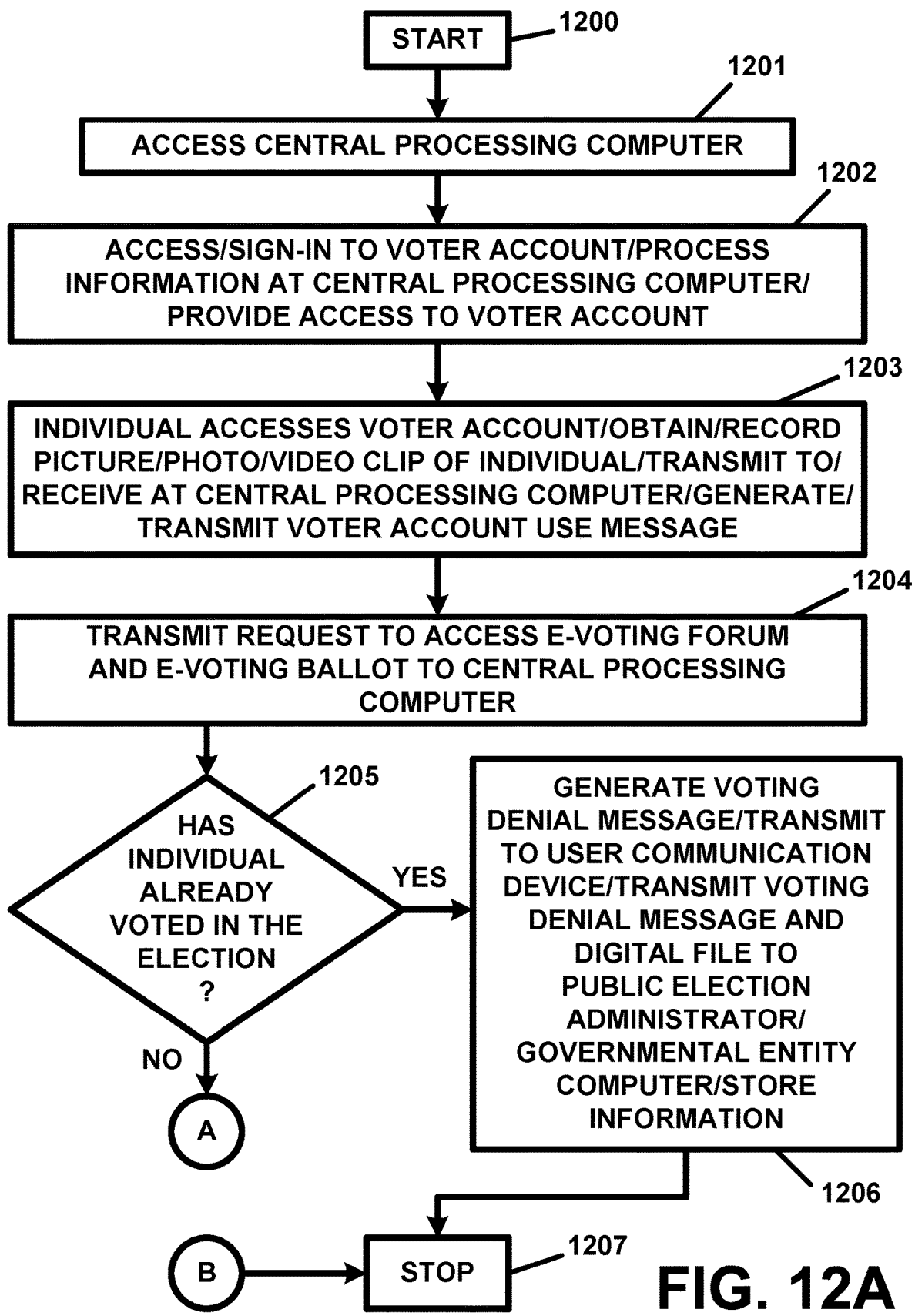
FIGS. 12A and 12B illustrate a preferred embodiment method for utilizing the apparatus of the present invention, in flow diagram form.
Figure 12B:
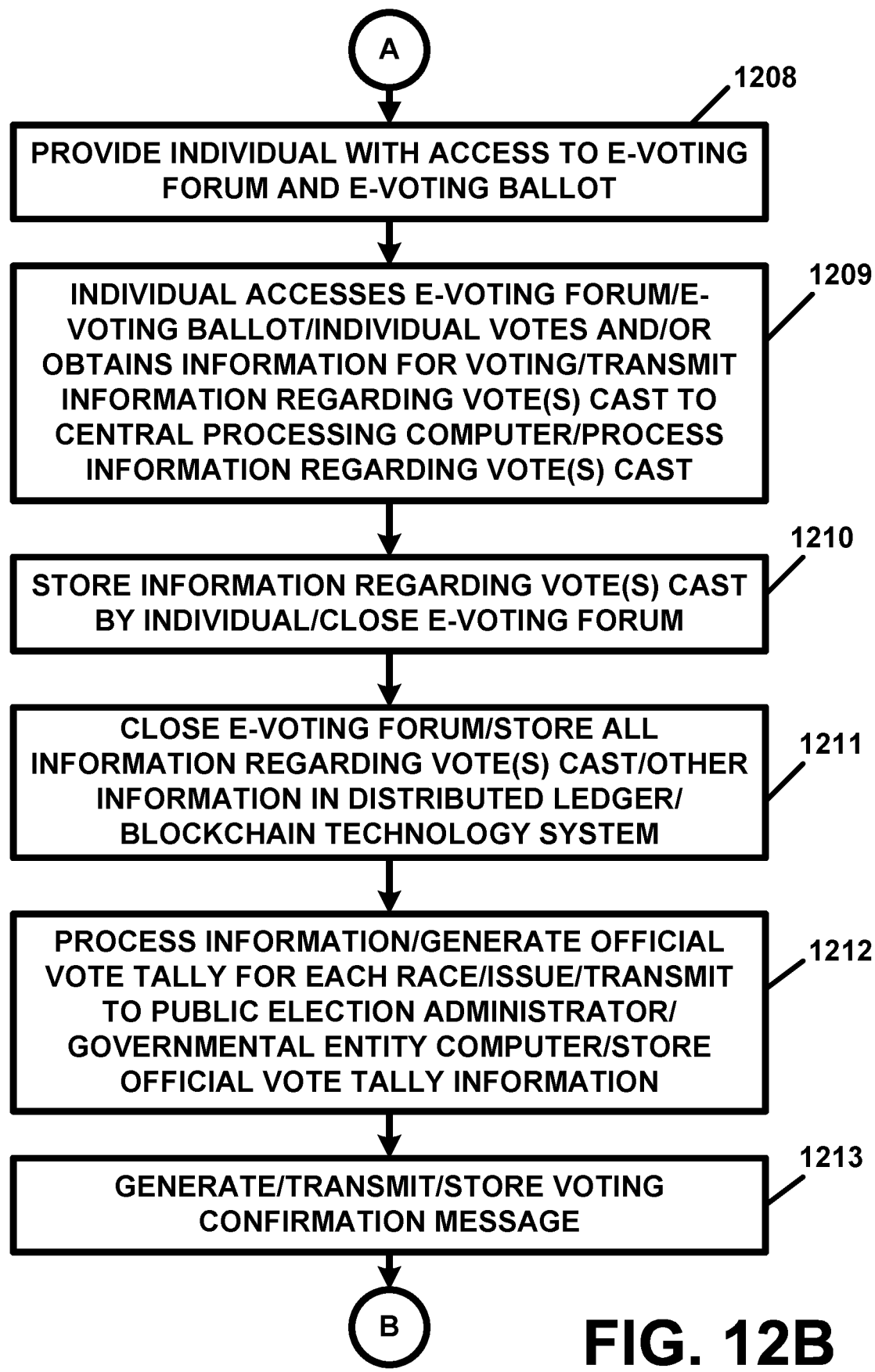

FIGS. 12A and 12B illustrate a preferred embodiment method for utilizing the apparatus 100 of the present invention, in flow diagram form. Although the preferred embodiment of FIGS. 12A and 12B are described and illustrated in connection with the conducting and/or the holding of a government administered public election or an election for public offices, the apparatus 100 of FIGS. 12A and 12B can also be utilized in a same, a similar, and/or an analogous, manner in connection with, and/or for conduction, any type or kind of public elections, private elections, campaigns, contests, tournaments, competitive events, competitions, and/or pageants, marketing campaigns, polling activities, and/or survey activities.

With reference to FIGS. 12A and 12B, the operation of the apparatus 100 commences at step 1200. At step 1201, the individual, who seeking to vote in a government administered public election and/or in an election for public offices, can access the central processing computer 11 with or using his or her user communication device 20, and/or with or using a kiosk as the user communication device 20. In a preferred embodiment, the kiosk can be located at a place or location of an election polling place, center, or site, and/or the kiosk can be located at any suitable public location or place. At step 1202, the individual can enter sign-in information regarding his or her voter account into the communication device 20 and can transmit the sign-in information from the user communication device 20 to the central processing computer 11. In a preferred embodiment, if the individual is utilizing a kiosk, the individual can utilize the RFID tag 95A which is associated with, or assigned to, his or her account, to enter some or all of the information regarding his or her voter account into the kiosk. In such a preferred embodiment, the kiosk can be equipped with, or can have located thereon or thereat, an RFID reader system 95B which can be equipped with an RFID reader or any number of RFID readers which are suitable for reading RFID tags 95 which are associated with, or assigned to, voter accounts. At step 1202, any and/or all voter account sign-in information can be transmitted from the user communication device 20, or from kiosk, which is also a user communication device 20, to, can be received by, and can be processed by, the central processing computer 11. At step 1202, the central processing computer 11 can process any needed information, identify the voter account, and provide the individual with access to his or her voter account.

At step 1203, the individual can access his or her voter account via and using the user communication device 20. At step 1203, upon the individual accessing his or her voter account, the video and/or audio recording device(s) 20J of the user communication device 20 can obtain or record a picture, a photograph, or a video clip, of the individual and can store the information regarding the same in a digital file. Thereafter, at step 1203, the user communication device 20 can transmit the digital file, containing the information regarding the picture, the photograph, or the video clip, of the individual, to the central processing computer 11. At step 1203, the central processing computer 11 can receive the digital file, can generate a voter account use message, and can transmit the voter account use message the user communication device 20 as well as to any and/or all user communication devices of, or associated with, the individual. In this regard, the individual can be informed of the use of his or her voter account in the event the voter account has been accessed in an unauthorized manner.

At step 1204, the individual can transmit, from the user communication device 20, to the central processing computer 11, a request to access an election voting forum ("e-voting forum") for, and to obtain an electronic voting ballot ("e-voting ballot") in order to allow the individual to vote in or to cast a ballot in, the election. At step 1204, the central processing computer 11 can process information regarding the individual's request, for access to the e-voting forum and to obtain an e-voting ballot, in conjunction with information regarding the individual which is stored in the database 11H. In a preferred embodiment, the central processing computer 11 can determine, from or using information regarding the individual's voting history or voting activity, which can be stored in the database 11H, whether or not the individual has already voted in, or cast a ballot in the election.

At step 1205, if the central processing computer 11 determines that the individual has already voted in, or has already cast a ballot in, the election, then the operation of the apparatus 100 will proceed to step 1206. At step 1206, the central processing computer 11 can generate a voting denial message and can transmit the same to the user communication device 20. At step 1206, the information contained in the voting denial message can be displayed on or via the display device 20E of the user communication device 20. In a preferred embodiment, the central processing computer 11 can also, at step 1206, transmit the voting denial message and the digital file containing the information regarding the picture, the photograph, or the video clip, of the individual, to the public election administrator/governmental entity computer 40.

Thereafter, at step 1206, the central processing computer 11 can store any and/or all information regarding the individual's attempt to vote or to cast a ballot in the election, including the date and time of the attempt, information regarding and/or identifying the user communication device 20 used in the attempt, the voting denial message or information regarding the same, the digital file containing the information regarding the picture, the photograph, or the video clip, of the individual, and/or any other information, in the database 11H of the central processing computer 11 and in the distributed ledger/Blockchain technology system 12 of the central processing computer/distributed ledger/Blockchain technology system 10. In another preferred embodiment, the central processing computer 11 can store any and/or all information regarding the individual's attempt to vote or to cast a ballot in the election, including the date and time of the attempt, information regarding and/or identifying the user communication device 20 used in the attempt, the voting denial message or information regarding the same, the digital file containing the information regarding the picture, the photograph, or the video clip, of the individual, and/or any other information, in the database 11H of the central processing computer 11 and/or in the distributed ledger/Blockchain technology system 12 of the central processing computer/distributed ledger/Blockchain technology system 10. Thereafter, the operation of the apparatus 100 will cease at step 1207.

If, however, at step 1205, the central processing computer 11 determines that the individual has not already voted in, or has not already cast a ballot in, the election, then the operation of the apparatus 100 will proceed to step 1208. In a preferred embodiment, the central processing computer 11, at step 1208, can allow or provide the individual with access to the e-voting forum via the user communication device 20 and can provide the individual with an e-voting ballot in order to allow the individual to vote in, or to cast a ballot in, the election in and via the e-voting form.

At step 1209, the individual can access the e-voting forum and obtain the e-voting ballot in order to use the same to cast his or her votes in the election while in the e-voting forum. In a preferred embodiment, the e-voting forum and the e-voting ballot can be displayed and/or can be viewed via the display device 20E of the user communication device 20. In a preferred embodiment, the e-voting ballot can be displayed within a portion of the e-voting forum. In a preferred embodiment, at step 1209, the individual can then proceed to look and/or go through the e-voting ballot and to cast his or her vote in any and/or all of races or contests for each of the public office races on the e-voting ballot for the election, and/or to cast his or vote for any and/or all of the referendum issues on the e-voting ballot for the election.

In a preferred embodiment, the e-voting ballot contains information regarding each public office race in the election and each referendum issue in the election. In a preferred embodiment, for each public office race, the e-voting ballot contains the names and party affiliations of and for each of the candidates for each public office. In a preferred embodiment, for each referendum issue, the e-voting allot contains the full text of the referendum language. In a preferred embodiment, the e-voting ballot contains a link(s) or hyperlink(s) for each candidate in each public office race, and a link(s) or hyperlink(s) for each referendum issue.

In a preferred embodiment, the link(s) or hyperlink(s) for each candidate can provide a link to information regarding the candidate. The information regarding the candidate can include, but not be limited to, the candidate's name, the candidate's age, the candidate's place of residence, the elected office or position the candidate is seeking, the full text of the nominating petition, a signature line for allowing the individual to sign the nominating petition, information, and/or a link(s) or hyperlink(s) to information, regarding the candidate, including, but not limited to, the candidate's name, the candidate's campaign contact information, the candidate's party affiliation, the candidate's campaign platform, the candidate's position or certain or various issues, the candidate's education and/or work experience, the candidate's past voting history, if he or she previously or currently holds public office, the candidate's campaign commercials, campaign literature, a campaign video, a video clip of the candidate, the candidate's website or the candidate's campaign website, and/or any other information regarding the candidate (hereinafter also referred to as "candidate information"). In a preferred embodiment, a link or hyperlink can be provided adjacent the candidate's name or as the candidate's name.

In a preferred embodiment, the link(s) or hyperlink(s) for each referendum issue can provide a link to information regarding the referendum issue. The information regarding the referendum issue can include, but not be limited to, information on or regarding positions in favor of the referendum issue, information on or regarding positions against the referendum issue, people or organizations in favor of the referendum issue, people or organizations against the referendum issue, and/or any other information regarding the referendum issue that the individual may be interested in when deciding how to vote on the referendum issue. In a preferred embodiment, a link or hyperlink can be provided adjacent the referendum number or title or as the referendum number or title.

In a preferred embodiment, and while in the e-voting forum, at step 1209, the individual, for each public office race, can cast his or her vote for the candidate of his or choice and/or the individual, for each referendum issue, can cast his or her vote for or against the referendum issue, or in any other manner deemed necessary for deciding the referendum issue.

In a preferred embodiment, at step 1209, the individual, prior to voting for any candidate or candidates in any public office race or races, can also utilize the link or hyperlink associated with the respective candidate in order to request and/or to be provided, for display in or via the e-voting forum on and/or via the display device 20E, with information and/or any additional or more information regarding the candidate and/or any of the candidate information described herein. After reviewing the information regarding the candidate and/or any of the candidate information described herein, the individual can, at step 1208, then cast his or her vote for the candidate of his or her choice, with such vote being a more informed vote.

In a preferred embodiment, at step 1209, the individual, prior to voting for any referendum issue, can also utilize the link or hyperlink associated with the respective referendum issue in order to request and/or to be provided, for display in or via the e-voting forum on and/or via the display device 20E, with information and/or any additional or more information regarding the referendum issue and/or any referendum issue described herein. After reviewing the information regarding the referendum issue and/or any of the referendum issues described herein, the individual can then, at step 1209, cast his or her vote regarding the referendum issue, with such vote being a more informed vote. In this regard, the apparatus 100 of the present invention and/or the e-voting ballot and/or the e-voting forum of the same, can provide the individual with information and/or with additional or more information regarding a candidate(s) and/or a referendum issue(s) during his or her voting activity in order to, and/or so as to, allow the individual to make a more informed voting decision and/or vote.

At step 1209, the individual can work his or her way through the e-voting ballot, voting for the candidate or candidate's or his or her choice, and/or voting for the referendum issue(s) as he or she desires, and/or declining to cast a vote in any one or public office races, and/or declining to cast a vote for any referendum issue(s), until the individual has completed cast all of his or her votes relating to the e-voting ballot.

In a preferred embodiment, at step 1209, each time a vote on the e-voting ballot is cast by the individual for a candidate for a public office race, or for a referendum issue, information regarding the vote which is cast can be transmitted to, and can be received by and processed by, the central processing computer 11. In this regard, in a preferred embodiment, each vote which is cast can be transmitted to and received and processed by the central processing computer 11, one at a time. In another preferred embodiment, all information regarding all of the votes which were cast by the individual on the e-voting ballot can be stored at, or in an appropriate memory inside, the user communication device 20, and can be transmitted all at once to the central processing computer 11 upon the individual signaling the end to his or voting on the e-voting ballot at the end of step 1209 as provided herein. At step 1209, once the individual has completed his or her voting on the e-voting ballot, the individual can signal this end to his or her voting activity by entering an exit e-voting ballot command on or via the user communication device 20. Thereafter, at step 1209, any and/or all data and/or information regarding the individual's voting activity and/or the votes cast by the individual, if not already having been previously transmitted to the central processing computer 11, will be transmitted to, and received and processed by, the central processing computer 11 at step 1209.

At step 1210, the central processing computer 11 can store information regarding any and/or all of the votes cast by the individual, at and during step 1209, and/or via the e-voting ballot, in the database 11H. At step 1210, the central processing computer 11 can also close the e-voting forum on the user communication device 20.

At step 1211, in a preferred embodiment, the central processing computer 11 can store any and/or all data and/or information regarding each of, and/or all of, the votes cast by the individual, information regarding the date and time the individual accessed the e-voting forum, information regarding the date and time the central processing computer 11 received the votes cast by the individual and/or received information regarding the votes cast by the individual, information regarding the date and time the e-voting forum was closed, and/or information regarding and/or identifying the election, in the database 11H and in the distributed ledger/Blockchain technology system 12 of the central processing computer/distributed ledger/Blockchain technology system 10.

In another preferred embodiment, the central processing computer 11 can store any and/or all data and/or information regarding each of, and/or all of, the votes cast by the individual, information regarding the date and time the individual accessed the e-voting forum, information regarding the date and time the central processing computer 11 received the votes cast by the individual and/or received information regarding the votes cast by the individual, information regarding the date and time the e-voting forum was closed, and/or information regarding and/or identifying the election, in the database 11H, and/or the data and/or information regarding each of, and/or all of, the votes cast by the individual, information regarding the date and time the individual accessed the e-voting forum, information regarding the date and time the central processing computer 11 received the votes cast by the individual and/or received information regarding the votes cast by the individual, information regarding the date and time the e-voting forum was closed, and/or information regarding and/or identifying the election, can be stored in the distributed ledger/Blockchain technology system 12 of the central processing computer/distributed ledger/Blockchain technology system 10.

At step 1212, the central processing computer 11 can process information for generating an official vote tally or vote count for each public office race and for each referendum issue on the e-voting ballot, so as to keep a running tally of counted votes. At step 1212, the central processing computer 11 can transmit the official vote tally or vote count, for each public office race and for each referendum issue, to the public election administrator/governmental entity computer 40 for the governmental entity holding the election.

At step 1212, the central processing computer 11 can also store, in the database 11H of the central processing computer 11 and in the distributed ledger/Blockchain technology system 12 of the central processing computer/distributed ledger/Blockchain technology system 10, information regarding the official vote tally or vote count for each public office race and for each referendum issue, and/or the official vote tally or vote count for each public office race and for each referendum issue. In another preferred, at step 1212, the information regarding the official vote tally or vote count for each public office race and for each referendum issue, and/or the official vote tally or vote count for each public office race and for each referendum issue, can be stored by the central processing computer 11 in the database 11H, and/or the information regarding the official vote tally or vote count for each public office race and for each referendum issue, and/or the official vote tally or vote count for each public office race and for each referendum issue, can be stored in the distributed ledger/Blockchain technology system 12 of the central processing computer/distributed ledger/Blockchain technology system 10.

At step 1213, the central processing computer 11 can also generate, and can transmit to the user communication device 20, and/or to any number of user communication devices 20 of, or associated with, the individual, and/or can transmit to the public election administrator/governmental entity computer 40, a voting confirmation message containing information regarding the date and time the individual voted in the election, information regarding the election, information regarding any votes cast by the individual, if desired by the individual, and/or a link or hyperlink to the each of the voter account use message, the digital file containing the information regarding the picture, the photograph, or the video clip, of the individual, and/or any other information.

At step 1213, the central processing computer 11 can also store the voter account use message, the voting confirmation message, and/or the herein-described digital file, in the database 11H of the central processing computer 11 and/or in the distributed ledger/Blockchain technology system 12 of the central processing computer/distributed ledger/Blockchain technology system 10. At step 1213, information regarding the fact that the individual has voted in the election can also be stored by the central processing computer 11 in the database 11H and can also be stored in the distributed ledger/Blockchain technology system 12 of the central processing computer/distributed ledger/Blockchain technology system 10. At step 1213, the central processing computer 11 can also transmit information regarding the fact that the individual has voted in the election to the public election administrator/governmental entity computer 40. Thereafter, the operation of the apparatus 100 will cease at step 1207.

It is important to note that, in any and/or all of the preferred embodiments or other embodiments described herein, any data and/or information described herein as being stored in the distributed ledger/Blockchain technology system 12 of the central processing computer/distributed ledger/Blockchain technology system 10 can be processed and can be stored by the distributed ledger/Blockchain technology system 12 of the central processing computer/distributed ledger/Blockchain technology system 10 itself, and without any need for, or any use of, the central processing computer 11. In this regard, in any and/or all of the preferred embodiments and/or other embodiments described herein, any data and/or information described herein as being stored in the distributed ledger/Blockchain technology system 12 of the central processing computer/distributed ledger/Blockchain technology system 10 can be stored in the distributed ledger/Blockchain technology system 12 of the central processing computer/distributed ledger/Blockchain technology system 10 by using the central processing computer 11 and/or can be stored in the distributed ledger/Blockchain technology system 12 of the central processing computer/distributed ledger/Blockchain technology system 10 by the distributed ledger/Blockchain technology system 12 of the central processing computer/distributed ledger/Blockchain technology system 10 itself, and without any need for, or use of, the central processing computer 11.

In another preferred embodiment, the apparatus 100 and methods of the present invention can also be utilized in order to allow members of a voter group or a voting electorate to nominate a candidate or prospective candidate for any elected position or office by electronically signing, in any appropriate manner, the candidate's nominating petition for that elected position or office.

Figure 13:
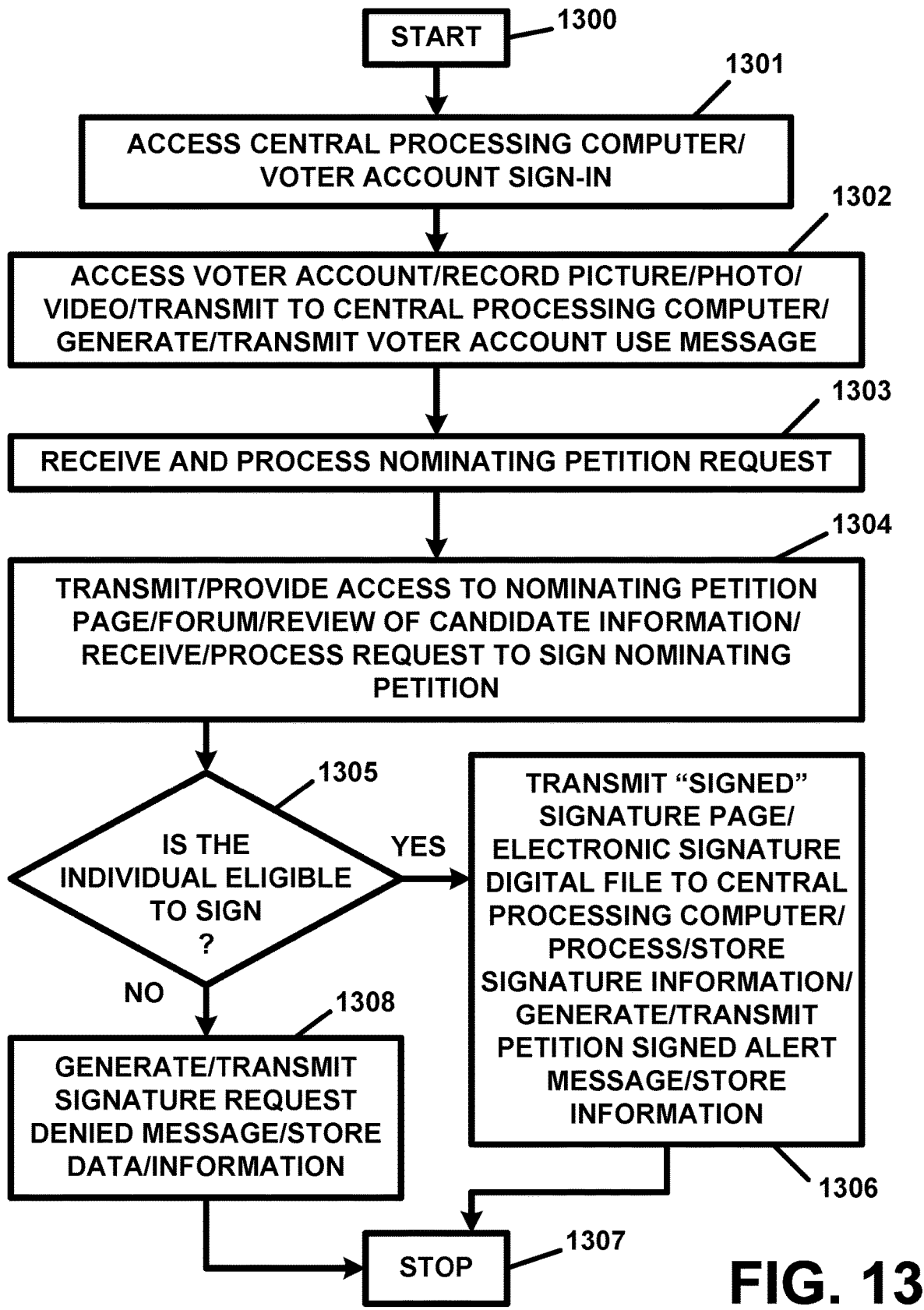
FIG. 13 illustrates another preferred embodiment method for utilizing the apparatus of the present invention, in flow diagram form.

FIG. 13 illustrates another preferred embodiment method of utilizing the apparatus 100 of the present invention, in flow diagram form. Although the preferred embodiment of FIG. 13 is described and illustrated as being used to allow an individual, who is a registered voter in a political subdivision, to nominate a candidate for public office by signing, or by electronically signing, the candidate's nominating petition, the apparatus 100 of FIG. 13 can also be utilized to allow any person to nominate, endorse, or support, any candidate, individual, entity, or cause, by allowing the person to sign, or electronically sign, any petition, nominating petition, or other document, relating to that particular candidate, individual, entity, or cause.

With reference to FIG. 13, the operation of the apparatus 100 commences at step 1300. At step 1301, the individual, who is a registered voter in a political subdivision, can access the central processing computer 11 using or via his or her user communication device 20. In a preferred embodiment, at step 1302, the individual can sign into his or her voter account by entering a username and password into his or her user communication device 20 and by transmitting the information regarding the same to the central processing computer 11. At step 1302, the central processing computer 11 can receive and process the information transmitted from the user communication device 20 at step 1301.

At step 1302, the central processing computer 20 can allow or can provide the individual with access to his or her voter account. At step 1302, upon the individual accessing his or her voter account, the video and/or audio recording device(s) 20J of the user communication device 20 can obtain or record a picture, a photograph, or a video clip, of the individual and can store the information regarding the same in a digital file. Thereafter, at step 1302, the user communication device 20 can transmit the digital file, containing the information regarding the picture, the photograph, or the video clip, of the individual, to the central processing computer 11. At step 1302, the central processing computer 11 can receive the digital file, can generate a voter account use message, and can transmit the voter account use message the user communication device 20 as well as to any and/or all user communication devices of, or associated with, the individual. In this regard, the individual can be informed of the use of his or her voter account in the event the voter account has been accessed in an unauthorized manner.

At step 1303, the individual can transmit, from his or user communication device 20, to the central processing computer 11, a request to access the nominating petition page/forum for the candidate, in an upcoming election, whose nominating petition the individual desires to electronically sign. In another preferred embodiment, at step 1303, the individual can also request that the central processing computer 11 provide or transmit, to the user communication device 20, a menu listing of all nominating petitions for all candidates in the political subdivision and/or in the individual's political party which are involved in, or are the subject of, an upcoming election. Thereafter, at step 1303, the central processing computer 11 can transmit the menu listing to the user communication device 20, and the individual can transmit, from his or her user communication device 20, to the central processing computer 11, a request to access the nominating page/forum of his or her choice or selection from among the nominating petitions identified in the menu listing and displayed on the display device 20E of the user communication device 20. At step 1303, the central processing computer 11 can receive and process the individual's request to access the nominating petition page/forum for the candidate whose nominating petition the individual desires to electronically sign.

At step 1304, the central processing computer 11 can transmit the requested nominating petition page/forum to the user communication device 20. In a preferred embodiment, the nominating petition page/forum can include or can contain, and/or can provide information regarding or including, a copy of the nominating petition, the candidate's name, the candidate's age, the candidate's place of residence, the elected office or position the candidate is seeking, the full text of the nominating petition, a signature line for allowing the individual to sign the nominating petition, information, and/or a link(s) or hyperlink(s) to information, regarding the candidate, including, but not limited to, the candidate's name, the candidate's campaign contact information, the candidate's party affiliation, the candidate's campaign platform, the candidate's position or certain or various issues, the candidate's education and/or work experience, the candidate's past voting history, if he or she previously or currently holds public office, the candidate's campaign commercials, campaign literature, a campaign video, a video clip of the candidate, the candidate's website or the candidate's campaign website, and/or any other information regarding the candidate (hereinafter also referred to as "candidate information"). In a preferred embodiment, the candidate information can be provided in or as text information, audio information, and/or video information, and/or any combination of the same.

At step 1304, the nominating petition page/forum can be displayed to the individual on or via the display device 20E of the user communication device 20, and the individual can review any information which is or which can be provided by or via the nominating petition page/forum. At step 1304, after the individual has completed reviewing any needed or desired information, and/or any needed or desired information candidate information, the individual can transmit, from his or her user communication device 20 to the central processing computer 11, a request to electronically sign the nominating petition for the candidate. At step 1304, the central processing computer 11 can receive and process the information regarding the individual's request to sign the nominating petition in conjunction with information regarding the individual's party affiliation, so as to ensure that only members of the candidate's political party can sign the nomination petition, and in conjunction with information regarding whether or not the individual has previously signed a nominating petition for another candidate or has previously signed nomination petitions or other candidates, which, depending on the election law of the individual's political subdivision, would render the individual ineligible to sign the candidate's nominating petition.

At step 1305, if the central processing computer 11 determines that the individual is a member of the candidate's political party, and also determines that the individual is not ineligible to sign the nominating petition, as a result of signing a previous nomination petition or nominating petitions, then the operation of the apparatus 100 will proceed to step 1306. In a preferred embodiment, at step 1306, the central processing computer 11 can provide or can transmit, to the user communication device 20, a signature page for the candidate's nominating petition, which signature page can allow the entry of the individual's electronic signature, for the individual to electronically sign. At step 1306, the user communication device 20 can display the signature page via the display device 20E.

At step 1306, in a preferred embodiment, the individual can electronically sign the nominating petition by typing or by entering his or her electronic signature on a designated signature line of or on the signature page by using the keyboard of the user input device 20D of the user communication device 20. In a preferred embodiment, the electronic signature can be the typed spelling of the name of the individual, such as, for example "John Doe", or the electronic signature can be the typed in, or entered or pasted, name of the individual, a mark used by the individual, a previously stored image of a signature of the individual, and/or any other indicia used by the individual as his or her electronic signature.

In a preferred embodiment, the user communication device 20 can also activate the video and/or audio recording device(s) 20J of the same and can obtain or record a picture, a photograph, or a video clip, of the individual during step 1306, and/or when the individual is entering his or her electronic signature, and/or at any time during step 1306 when the individual is performing any activity, and can store the information regarding the same in an electronic signature digital file. At step 1306, the individual can submit, and transmit, the signed signature page, containing the individual's electronic signature, for the nominating petition to the central processing computer 11. At step 1306, the user communication device 20 can also transmit the electronic signature digital file to the central processing computer 11.

At step 1306, the central processing computer 11 can receive and process the information regarding the submitted signed signature page for the nominating petition, can process information regarding the signatures and/or the number of signatures obtained for the nominating petition, and can process and store any and/or all of the information regarding, or relating to, the nominating petition, the submitted signed signature page and the electronic signature thereon, and/or any and/or all previous submitted signed signature pages with electronic signatures for or regarding the nominating petition. In a preferred embodiment, the central processing computer 11 can also, at step 1306, process information for keeping a running tally or all electronic signatures obtained for the nominating petition to date.

At step 1306, any and/or all information regarding the submitted signed signature page with the electronic signature for the nomination petition, and/or the electronic signature digital file, can be stored by the central processing computer 11 in the database 11H and can also be stored in the distributed ledger/Blockchain technology system 12 of the central processing computer/distributed ledger/Blockchain technology system 10. In another preferred embodiment, at step 1306, any and/or all information regarding the submitted signed signature page with the electronic signature for the nominating petition, and/or the electronic signature digital file, can be stored by the central processing computer 11 in the database 11H and/or can be stored in the distributed ledger/Blockchain technology system 12 of the central processing computer/distributed ledger/Blockchain technology system 10.

At step 1306, the central processing computer 11 can, in a preferred embodiment, also generate a candidate nominating petition signed alert message which can contain or can include information regarding the nominating petition which was electronically signed, the name of the candidate for whom the nominating petition was signed, the individual who electronically signed the nominating petition, the voter account used in submitting the electronic signature for the nominating petition was signed, the date and time of the submission of the electronically signed nominating petition, the current total number of electronic signatures obtained for the nominating petition, and/or any other desired information. In a preferred embodiment, the candidate nominating petition signed alert message can also include or contain, include or contain as an attachment, or include or contain a link or hyperlink to, the electronic signature digital file.

At step 1306, in a preferred embodiment, the central processing computer 11 can transmit the candidate nominating petition signed alert message and the attachment of, or the link or hyperlink to, the electronic signature digital file, to the user communication device 20 used by the individual and/or to any other user communication devices 20 of or associated with the individual. At step 1306, in a preferred embodiment, the central processing computer 11 can also transmit the candidate nominating petition signed alert message and the attachment of, or the link or hyperlink to, the electronic signature digital file, to the campaign/project manager computer 30 of or associated with the candidate. Thereafter, the central processing computer 11, at step 1306, can also store the nominating petition signed alert message and the electronic signature digital file in the database 11 and/or the nominating petition signed alert message and the electronic signature digital file can also be stored in the distributed ledger/Blockchain technology system 12 of the central processing computer/distributed ledger/Blockchain technology system 10. Thereafter, the operation of the apparatus 100 will cease at step 1307.

If, however, at step 1305, the central processing computer 11 determines that the individual is either not a member of the candidate's political party or that the individual is ineligible to sign the nominating petition, because he or she has previously signed the nomination petition of another candidate or the nomination petitions of other candidates and is, therefore, ineligible to sign the nominating petition for the candidate, then the operation of the apparatus 100 will proceed to step 1308. At step 1308, the central processing computer 11 can generate a signature request denied message and can transmit the signature request denied message to the user communication device being used by the individual. Thereafter, at step 1308, the central processing computer 11 can store information regarding the individual's attempt to electronically sign the nominating petition, the date and time of the attempt, the signature request denied message, and/or any other desired information, in the database 11, and the information regarding the individual's attempt to electronically sign the nominating petition, the date and time of the attempt, the signature request denied message, and/or any other desired information can also be stored in the distributed ledger/Blockchain technology system 12 of the central processing computer/distributed ledger/Blockchain technology system 10. Thereafter, the operation of the apparatus 100 will cease at step 1307.

In another preferred embodiment, the apparatus 100 and methods of the present invention can also be utilized to allow a prospective candidate for an elected position or office to circulate a nominating position to members of a voting group or electorate, provide information about himself or herself, engage with any member or members of the voting group or electorate, electronically collect electronic or other signatures for his or her nominating petition, and/or submit his or her nominating petition via the apparatus 100 of the present invention to the appropriate entity, organization, or authority.

Figure 14:
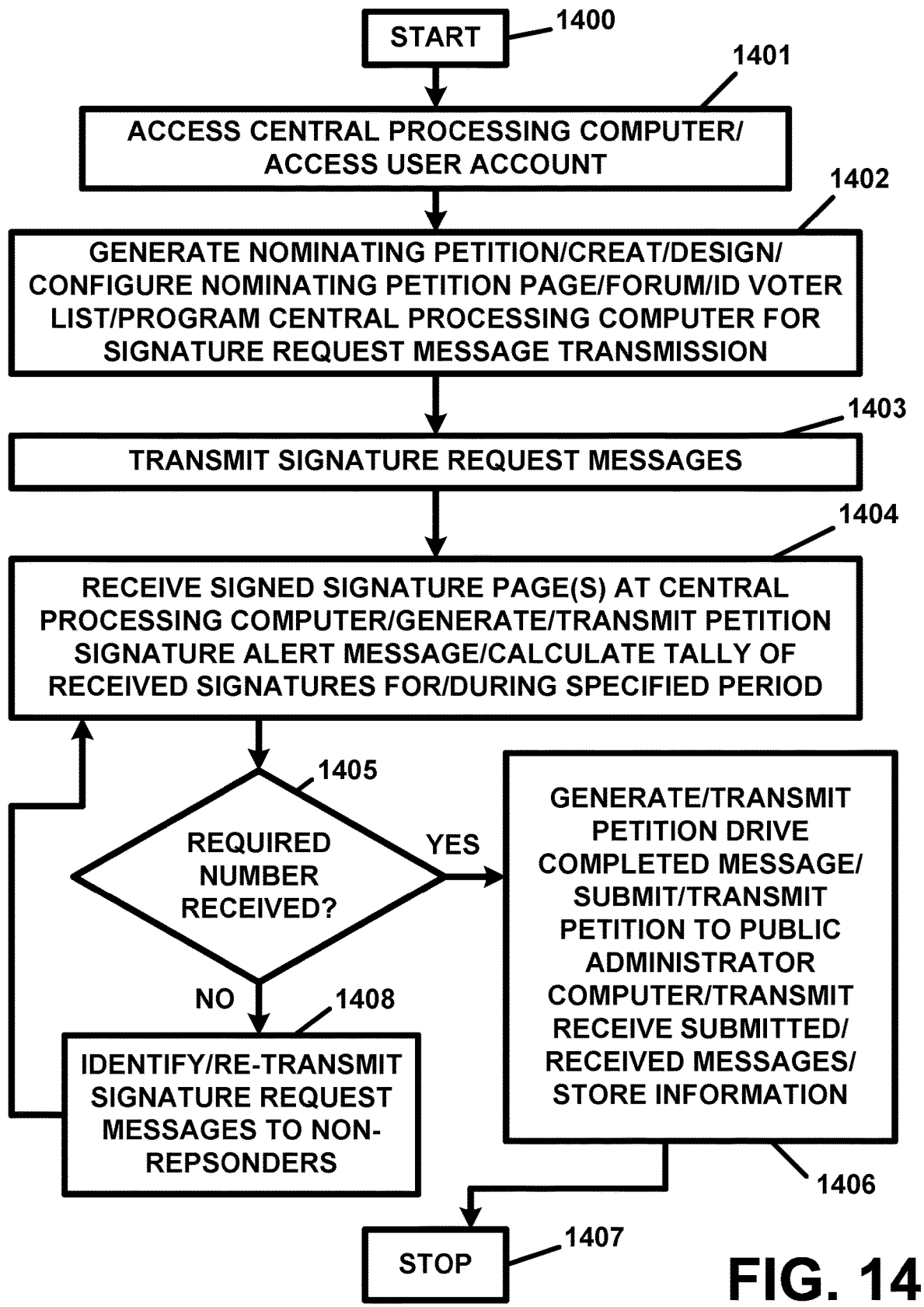
FIG. 14 illustrates still another preferred embodiment method for utilizing the apparatus of the present invention, in flow diagram form.

FIG. 14 illustrates another preferred embodiment method for utilizing the apparatus 100 of the present invention. Although the preferred embodiment of FIG. 14 is directed to allowing a candidate, a campaign, or a campaign staff member, to circulate nominating petitions for or on behalf of the candidate, and receiving electronically signed petitions in return, it is to be understood that the apparatus 100 of FIG. 14 can also be utilized in a same, a similar, and/or an analogous, manner by any individual or entity in circulating and/or disseminating any information, a poll, or a survey, and/or in performing any other activity involving disseminating information, wherein a response is sought from those individuals to whom the respective information, poll, or survey, was disseminated or from those individuals to whom the activity was directed.

With reference to FIG. 14, the operation of the apparatus 100 commences at step 1400. At step 1401, the individual, who, in the preferred embodiment, can be a candidate for public office, a campaign manager for the candidate, or a campaign staff member for the candidate, can access the central processing computer 11 using or via his or her user communication device 20. At step 1401, the individual can also access his or her user account.

At step 1402, the individual can request to generate a nominating petition for the candidate using his or her user account. In a preferred embodiment, the nominating petition can be generated by the central processing computer 11 in response to the individual selecting, via the user communication device 20, a nominating petition template, which is approved by the governmental entity or political subdivision in which the candidate is seeking public office, and/or in response to the individual entering and transmitting any needed or appropriate information to the central processing computer 11. At step 1402, the central processing computer 11 can generate and can store, in the database 11H, the nominating petition for the candidate. At step 1402, the individual can also create, via the user communication device 20 and using the central processing computer 11, a nominating petition page/forum for use in allowing individual voters to obtain information regarding the candidate and to access the candidate's nominating petition.

At step 1402, the individual can also configure or design the nominating petition page/forum so as to provide, or so as to provide a link(s) or hyperlink(s), to any information regarding the candidate, including, but not limited to, the candidate's name, the candidate's age, the candidate's place of residence, the candidate's campaign contact information, the candidate's party affiliation, the candidate's campaign platform, the candidate's position or certain or various issues, the candidate's education and/or work experience, the candidate's past voting history, if he or she previously or currently holds public office, the candidate's campaign commercials, campaign literature, a campaign video, a video clip of the candidate, the candidate's website or the candidate's campaign website, and/or any other information regarding the candidate (hereinafter also referred to as "candidate information"). At step 1402, the central processing computer 11 can generate and/or create and store information regarding the nominating petition page/forum.

At step 1402, the individual can also identify, from a voter registration list of or for the political subdivision in which the candidate is seeking office, which voter registration list can be stored in the database 11H, a voter list of individual voters or prospective voters who, by party affiliation, are eligible to electronically sign the candidate's nominating petition and/to who are eligible to vote in an upcoming primary or general election. At step 1402, the central processing computer 11 can store the voter list or information regarding the same in the database 11H of same.

At step 1402, the individual can, via the user communication device 20 and the central processing computer 11, generate and store, in the database 11H, a nominating petition signature request message which can be transmitted to the respective user communication device(s) 20 of each individual voter or prospective voter identified in the voter list. At step 1402, the nominating petition signature request message can include a message from the candidate, a request that the recipient electronically sign his or her nominating petition, a link to the nominating petition, and a link(s) or hyperlink to the nominating petition page/forum of the candidate, and/or a link(s) or hyperlink(s) to any candidate information and/or other information. At step 1402, the individual can also instruct, or can program, the central processing computer 11 to transmit the nominating petition signature request message to one or more of the user communication devices 20 of or associated with each individual voter or prospective voter identified in the voter list.

At step 1403, the central processing computer 11 can transmit the nominating petition signature request message to one or more of the user communication devices 20 of or associated with each individual voter or prospective voter identified in the voter list. Thereafter, at step 1404, for and/or during a preset time interval, which can be pre-selected by the candidate or by his or her campaign manager or a campaign staff member, to be any pre-specified number of days which can represent a first petition signature drive period and only a portion of the entire nominating petition drive period, any individual voter(s) or prospective voter(s) can utilize the apparatus 100 and/or the central processing computer 11 of the embodiment of FIG. 13 and, in particular, any of the needed or relevant steps or processing routines utilized in, during, or regarding, any of steps 1304, 1305, and 1306, in order to electronically sign the candidate's nominating petition and to submit the signed signature page(s) of the same to the central processing computer 11. At step 1404, the central processing computer 11 can receive and process information regarding any number of signed signature pages transmitted from the respective user communication devices 20 of or associated with any responding individual voter(s) or prospective voter(s). For each signed signature page transmitted to, and received by, the central processing computer 11, at step 1404, the central processing computer 11 can generate a petition signature alert message and can transmit the same to the campaign/project manager computer 30 of or associated with the candidate.

In a preferred embodiment, the central processing computer 11, at step 1404, can also calculate and store a running tally of the number of signatures received for the nominating petition. In a preferred embodiment, each respective petition signature alert message can include a running total number of signatures obtained to date including the signature which is associated with the respective petition signature alert message. In this regard, the apparatus 100 can keep a candidate or his or her campaign apprised as to the status of the nominating petition signatures obtained for the candidate.

At step 1405, the central processing computer 11 can determine if the required number, or if more than the required number, of nominating petition signatures, as required by the law(s) of the political subdivision, has been obtained for the candidate's nominating petition. If, at step 1405, it is determined that the required number, or more than the required number, of nominating petition signatures have been obtained, then the operation of the apparatus 100 will proceed to step 1406.

At step 1406, the central processing computer 11 can generate a nominating petition signature drive completed message and can transmit the same to the campaign/project manager computer 30 of or associated with the candidate. In a preferred embodiment, the nominating petition signature drive completed message can be transmitted in or as an e-mail transmission, an e-mail message, an instant message, a text message, an SMS message, an MMS message, an electronic transmission, or a telephone message. In a preferred embodiment, if transmitted as an e-mail transmission, an e-mail message, an instant message, a text message, or any other suitable electronic transmission, the nominating petition signature drive completed message can also contain a link or hyperlink to the central processing computer 11 and/or to the candidate's user account. Thereafter, at step 1406, the candidate, or the campaign manager or a campaign staff member for the candidate, can access the central processing computer 11 using or via the campaign/project manager computer 30, directly or by using any link or hyperlink in the nominating petition signature drive completed message, and can access and review information regarding the obtained signed signature pages and the respective electronic signature contained in each of the same. After the review of the obtained signed signature pages has been performed, and if all signed signature pages and/or information contained in, or relating to same, appears to be correct and in order, the candidate, or the campaign manager or a campaign staff member for the candidate, can, using the campaign/project manager computer 30, officially submit or transmit the candidate's nominating petition, with all attached signature pages, by transmitting all of the same, or a copy of the same, the appropriate public election administrator/governmental entity computers 40 overseeing the election in which the candidate is running. Thereafter, at step 1406, the central processing computer 11 can generate a nominating petition submitted message can transmit the same to the candidate's the campaign/project manager computer 30. In another preferred embodiment, the public election administrator/governmental entity computers 40 can also generate a nominating petition received message can transmit the same to the candidate's the campaign/project manager computer 30 and to the central processing computer 11. Thereafter, at step 1406, the central processing computer 11 can store any and/or all information regarding the candidate's nominating petition, all of the signed signature pages obtained for the nomination petition, any and/or all of the herein-described petition signature alert messages, the nominating petition signature drive completed message, the nominating petition submitted message, and the nominating petition received message, in the candidate's user account, in the database 11H, and/or in the distributed ledger/Blockchain technology system 12 of the central processing computer/distributed ledger/Blockchain technology system 10. Thereafter, the operation of the apparatus 100 will cease at step 1407.

If, however, at step 1405, it is determined that the required number of nominating petition signatures have not been obtained, then the operation of the apparatus 100 will proceed to step 1408. At step 1408, the central processing computer 11 can identify the individual voters or prospective voters, previously identified in the voter list, who have yet to respond, and the central processing computer 11 can, with and using a new pre-selected petition signature drive period, re-transmit the nominating petition signature request message to one or more of the user communication devices 20 of or associated with each of those individual voters or prospective voters who have yet to respond. Thereafter, the operation of the apparatus can proceed to step 1404 and the above process at steps 1404, 1405, and 1408 can be repeated the required number of signature pages are obtained or until the operation of the apparatus 100 is manually stopped by the individual.

In another preferred embodiment, the apparatus 100 and methods of the present invention can also be utilized in order to provide an on-line election and/or campaign forum for allowing members of a voting group or electorate to attend and/or to engage in virtual and/or on-line campaign events, on-line campaigning events or activities, on-line candidates events and/or debates, and/or online town hall meetings.

Figure 15:
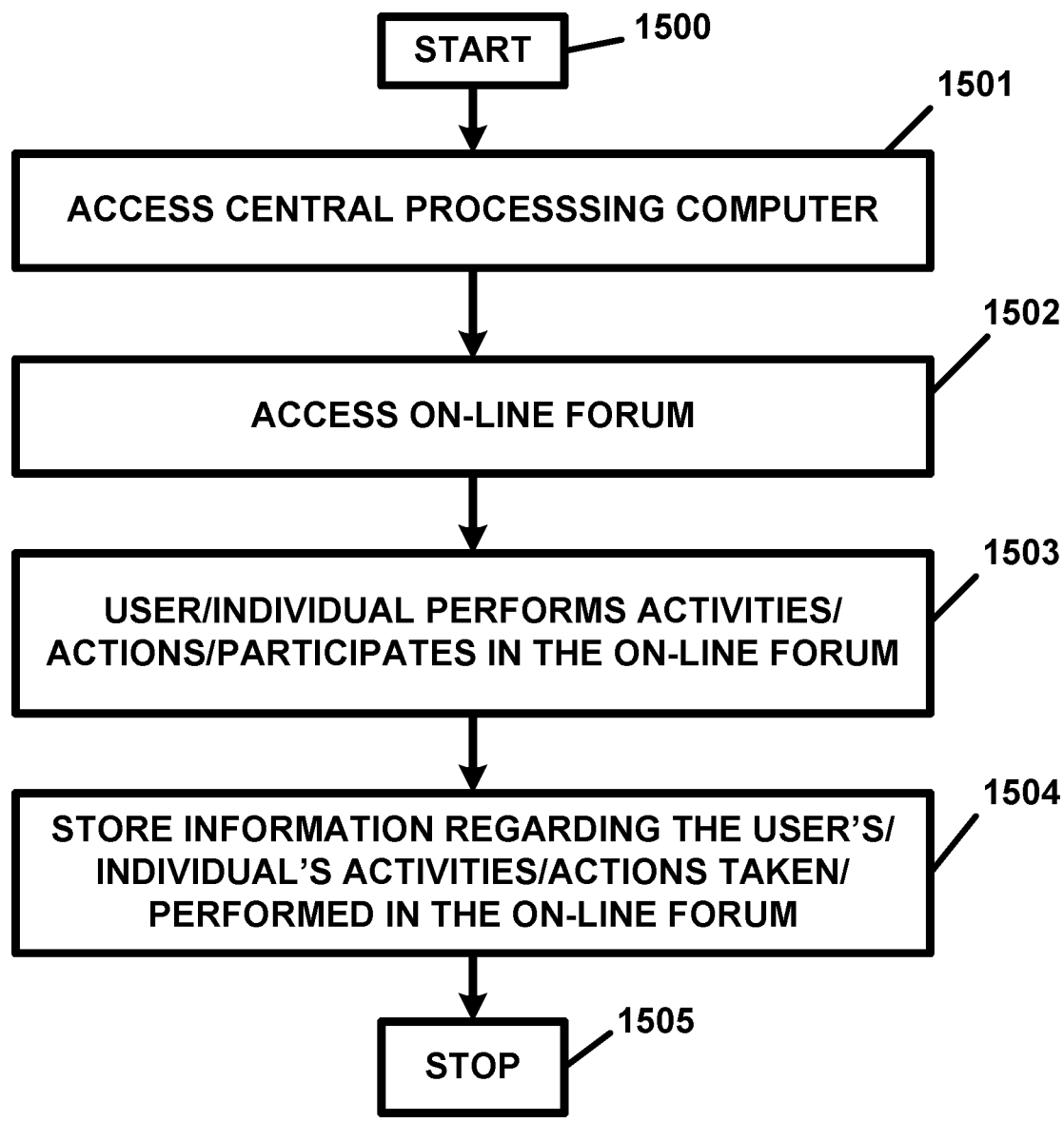
FIG. 15 illustrates yet preferred embodiment method for utilizing the apparatus of the present invention, in flow diagram form.

FIG. 15 illustrates another preferred embodiment method for utilizing the apparatus 100 of the present invention, in flow diagram form. In the preferred embodiment of FIG. 15, the apparatus 100 can be utilized to provide an on-line election forum or an on-line campaign forum. In the preferred embodiment of FIG. 15, any of the herein-described users, individuals, or entities, can utilize the apparatus 100 in order to obtain information about public elections, private elections, campaigns, contests, tournaments, competitive events, competitions, and/or pageants, of any type or kind, to attend on-line campaign events, candidate forums or town hall events, to obtain information regarding any candidate(s) or contestant(s) in an upcoming election(s), to interact with, and/or to communicate with, candidates or any candidate campaign staff member(s), to electronically sign nominating petitions for a candidate(s), to make a financial contribution(s) to a candidate(s), to his or her campaigns, and/or to a political cause, a social cause, or any other cause or issue, and/or to perform and/or engage in any number of other activities.

With reference once again to FIG. 15, the operation of the apparatus 100 commences at step 1500. At step 1501, the user or individual can access the central processing computer 100 using or via his or her user communication device 20. At step 1502, the user or individual can access the desired on-line election forum or the on-line campaign forum.

At step 1503, the user or individual can perform any number of activities within the on-line election forum or the on-line campaign forum. For example, at step 1503, the user or individual can request and obtain information regarding an upcoming election, campaign, contest, tournament, competitive event, competition, and/or pageant, of any type or kind, and/or can request and obtain information regarding any candidate(s) or contestant(s) running in or competing in, involved in, and/or relating to, the upcoming election, campaign, contest, tournament, competitive event, competition, and/or pageant, and/or the user or individual can view, and/or participate in asking questions in and/or during, an on-line campaign event, a candidate forum, a candidate debate, an on-line campaign rally, an issue forum, an on-line town hall meeting, and/or the user or individual can obtain platform and/or issue information for or regarding candidate(s) or contestant(s) in an upcoming election(s), and/or the user or individual can interact with, and/or to communicate with, and/or can send a messages to a candidate, or a candidate's campaign staff member, and/or the user or individual can participate in video conference with a candidate or a contestant and/or a representative of same, and/or the user or individual can electronically sign a nominating petition for a candidate or for candidates, and/or the user or individual can make a financial contribution to a candidate's campaign, to a political action committee, and/or to a political cause, a social cause, or any other cause or issue, and/or the user or individual can engage in any other activities while in the on-line election forum or the on-line campaign forum. In a preferred embodiment, the on-line election forum or the on-line campaign forum can be provided by or sponsored by any public election administrative person or entity, governmental entity, private election administrative person or entity, and/or by an political party or organization, and/or by any candidate or contestant, and/or by any group or organization endorsing, supporting, or sponsoring, candidate, contestant, or issue or cause.

At step 1503, the user or individual can also access, via his or her user communication device 20, any of the herein-described campaign/project manager computers 30, public election administrator/governmental entity computers 40, private election administrator computers 50, provider computers 60, media computers 70, external information source computers 80, social network computers 85, and/or financial institution computers 90, in order to interact with the same, in order to communicate with any respective operator or operators of same, and/or in order to request, and receive, information from the same.

During step 1503, the user or individual can engage in, or can participate in, any number of activities while in the on-line election forum or the on-line campaign forum. Upon his or her completion of all activities, while in the on-line election forum or the on-line campaign forum, the user or individual can thereafter exit from, or sign-off from, the on-line election forum or the on-line campaign forum. Thereafter, the operation of the apparatus 100 will proceed to step 1504.

At step 1504, the central processing computer 11 will store, in the database 11H of the central processing computer 11 and/or in the distributed ledger/Blockchain technology system 12 of the central processing computer/distributed ledger/Blockchain technology system 10, any and/or all data and/or information regarding, or relating to, any and/or all of the user's or individual's activities and/or actions taken, and/or any and/or all of the activities in which the user or individual participated or performed, while in the on-line election forum or the on-line campaign forum. In another preferred embodiment, at step 1504, the central processing computer 11 will store, in the database 11H of the central processing computer 11 and in the distributed ledger/Blockchain technology system 12 of the central processing computer/distributed ledger/Blockchain technology system 10, any and/or all data and/or information regarding, or relating to, any and/or all of the user's or individual's activities and/or actions taken, and/or any and/or all activities in which the user or individual participated or performed, while in the on-line election forum or the on-line campaign forum. Thereafter, the operation of the apparatus 100 will cease at step 1505.

In another preferred embodiment, the apparatus 100 and methods of the present invention can also be utilized in order to provide or transmit electronic notifications or notification messages to members of a voting group or an electorate regarding the scheduling and/or occurrences of elections and/or campaigns for public offices, pubic elections, private elections, entity or organizational elections, voting activities regarding contests, tournaments, competitive events, competitions, and/or pageants, of any type or kind, voting and/or polling activities in marketing campaigns, and/or in conducting polling activities and/or in conducting surveys or any type or kind, and/or the scheduling and/or occurrences of any activities or events relating thereto.

Figure 16:
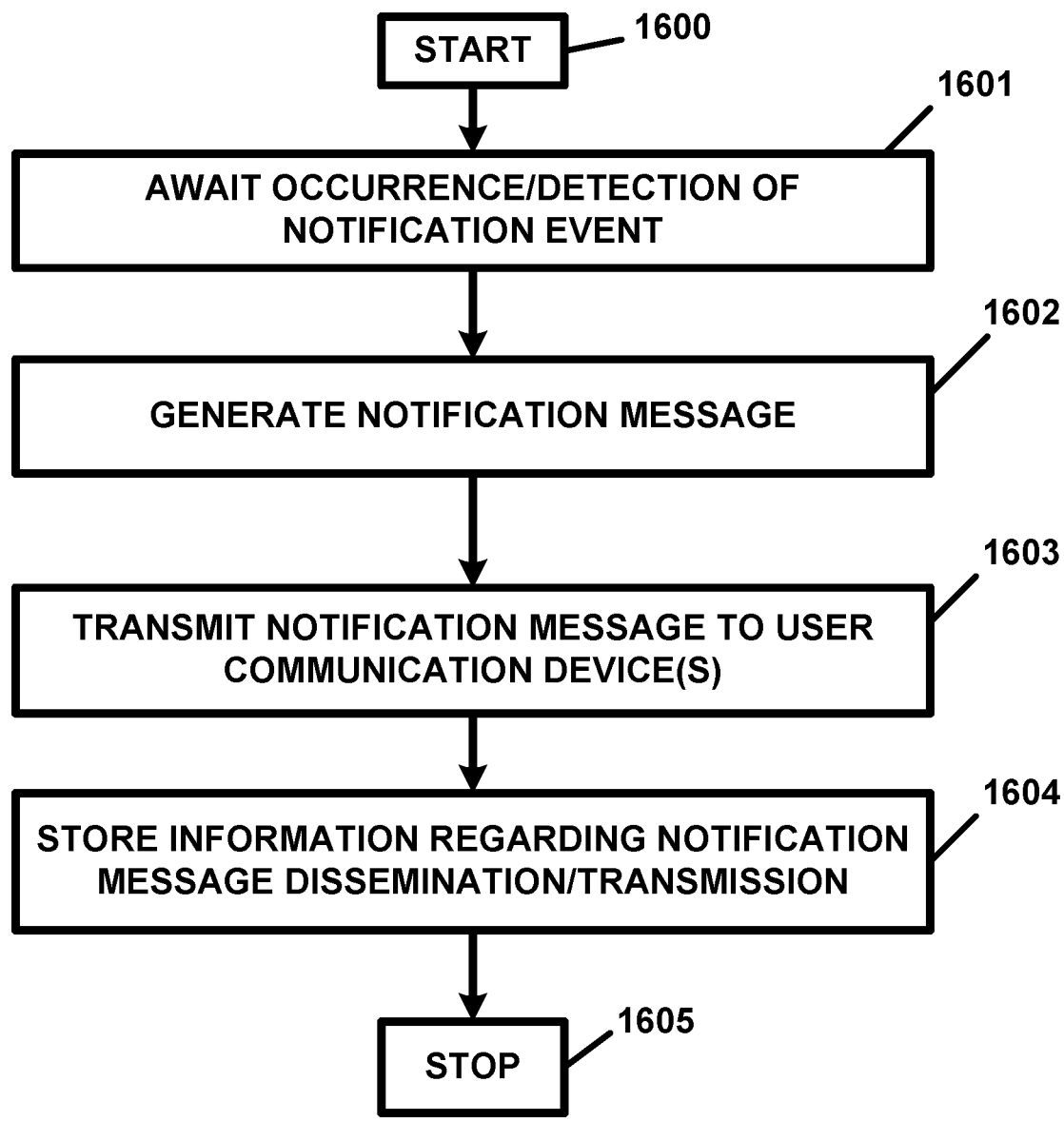
FIG. 16 illustrates another preferred embodiment method for utilizing the apparatus of the present invention, in flow diagram form.

FIG. 16 illustrates another preferred embodiment method for utilizing the apparatus 100 of the present invention, in flow diagram form. Although the preferred embodiment of FIG. 16 is described and illustrated herein as being utilized in order to provide notification messages to individuals who are members of a voter group or who are members of a voting electorate regarding an upcoming election for elected public officials and/or for or regarding public referendum issues, the preferred embodiment of FIG. 16 can also be utilized in a same, a similar, and/or an analogous, manner so as to provide notification messages to individuals for or regarding any public or private election, contest, tournament, competitive event, competition, and/or pageant, and/or any marketing campaign, polling activity, or survey.

In the preferred embodiment of FIG. 16, it is envisioned that any candidate, campaign manager for a candidate, campaign staff member for a candidate, governmental entity, public election administrator, or any other individual or entity, can access the central processing computer 11, using their respective user communication device 20, campaign/project manager computer 30, or public election administrator/governmental entity computer 40, and can program the central processing computer 11 to generate, send, and/or transmit, notification messages to identified individuals, to a particular individual, to an identified voter group, to an identified voting electorate, to any identified voter groups, and/or to any identified voting electorates. In a preferred embodiment, the candidate, campaign manager for a candidate, campaign staff member for a candidate, governmental entity, public election administrator, or any other individual or entity, can also provide or supply information should be contained in the notification messages. In a preferred embodiment, the notification messages can contain information regarding an upcoming election, offices or referendum issues for which the election is being held, candidates for each office, information regarding and/or a link or hyperlink to information regarding each candidate and/or information regarding arguments for and/or against an issue, information regarding a news event(s), updates regarding a candidate or issue, the date and time or times of the election, and/or any other information which can be the subject of a notification message.

In a preferred embodiment, the notification messages can also contain a link or hyperlink to the central processing computer for allowing an individual to schedule an appointment to vote or cast a ballot in the election, a link or hyperlink to an electronic voting forum associated with the election, a link or hyperlink to an electronic voting ballot for, or associated with, the election, and/or a link or hyperlink to an electronic campaign forum for or associated with the election. In a preferred embodiment, the respective candidate, campaign manager for a candidate, campaign staff member for a candidate, governmental entity, public election administrator, or any other individual or entity, can program the central processing computer to generate and transmit the notification messages on a certain date or on certain dates, at a certain time or times, and/or at certain time intervals, and/or automatically upon an detected update of or to any information regarding the election, any office or issue and/or any candidate. In a preferred embodiment, the notification messages can serve to provide information or updated information regarding the election, any office or issue and/or any candidate, can serve to advertise the election, a candidate, or an issue position, can serve to promote a candidate or an issue, and/or can serve to remind and/or to encourage the identified individuals, the particular individual, the identified voter group, the identified voting electorate, the identified voter groups, and/or the identified voting electorates, to get out and vote in the election.

With reference once again to FIG. 16, the operation of the apparatus 100 commences at step 1600. At step 1601, the central processing 11 can await the occurrence of, or the detection of, a notification event. In a preferred embodiment, the notification event can be the detection of a date or a time or times, when notification messages are to be generated and transmitted, an elapsing of a certain time interval or time intervals after which notification messages are to be generated and transmitted, an automatically detected update of or to any information regarding the election, any office or issue and/or any candidate, and/or any other defined or predefined occurrence or happening.

Upon the detection of the occurrence of the notification event, the operation of the apparatus 100 will proceed to step 1602 and the central processing computer 11 will generate the desired notification message including any and/or all information which should be included in the same. At step 1603, the central processing computer 11 can transmit the notification messages to the user communication device(s) 20 of the particular individual, to each individual of the identified individuals, to each individual in the identified voter group, to each individual in the identified voting electorate, to each individual in the identified voter groups, and/to each individual in the identified voting electorates. In a preferred embodiment, at step 1603, the notification message can be transmitted to the respective user communication device(s) 20 as or in an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

Thereafter, at step 1604, the central processing computer 11 will store, in the database 11H of the central processing computer 11 and in the distributed ledger/Blockchain technology system 12 of the central processing computer/distributed ledger/Blockchain technology system 10, any and/or all data and/or information regarding the dissemination or transmission of the notification message, any information contained in the notification message herein, the data and time of the dissemination or transmission of the notification message, and an identification of the individual or individuals to who the notification message was transmitted. In this manner, the apparatus 100 can be utilized to monitor the information transmitted or disseminated to individual, voter groups, and/or voting electorates, in and during an election campaign and/or regarding an election. Thereafter, the operation of the apparatus 100 will cease at step 1605.

In another preferred embodiment, the apparatus 100 and methods of the present invention can also provide members of a voting group or electorate with the ability to schedule an appointment to vote in or for an election, contest, tournament, competitive event, competition, and/or pageant, and/or in or for any marketing campaign, polling activity, or survey.

Figure 17:
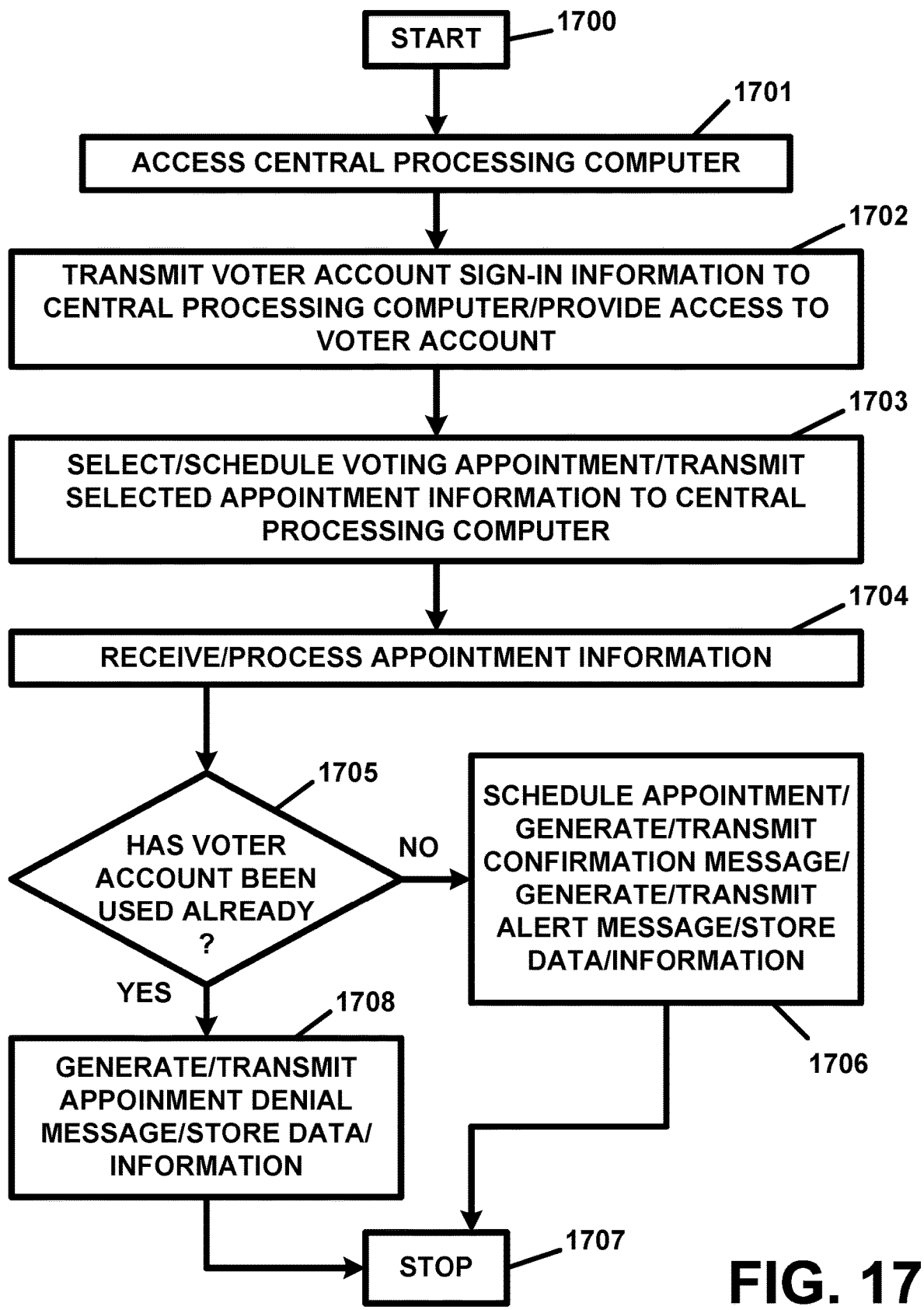
FIG. 17 illustrates a preferred embodiment method for utilizing the apparatus of the present invention, in flow diagram form.

FIG. 17 illustrates another preferred embodiment method for utilizing the apparatus 100 of the present invention in, flow diagram form. Although the preferred embodiment of FIG. 17 is described and illustrated herein as being utilized in order to allow an individual, who is a member of a voting electorate or a voting group, in and/or for an election for elected public officials and/or for or regarding public referendum issues, to make an appointment to vote or cast a ballot in the election on-line and/or via the e-voting forum described herein as being provided by the apparatus 100, the preferred embodiment of FIG. 17 can also be utilized in a same, a similar, and/or an analogous, manner so as to allow any user or individual, or other voting entity, to vote or cast a ballot in any public or private election, contest, tournament, competitive event, competition, and/or pageant, and/or in or for any marketing campaign, polling activity, or survey.

With reference to FIG. 17, the operation of the apparatus 100 commences at step 1700. At step 1701, the individual can access the central processing computer 11 using or via his or her user communication device 20. In a preferred embodiment, at step 1702, the individual can sign into his or her voter account by entering a username and password into his or her user communication device 20 and by transmitting the information regarding the same to the central processing computer 11. At step 1702, the central processing computer 11 can receive and process the information transmitted from the user communication device 20 at step 1701. At step 1702, the central processing computer 20 can allow or provide the individual with access to his or her voter account.

At step 1703, the individual can select to schedule an appointment in order to vote or cast a ballot, in the upcoming election for elected public officials and/or for or regarding public referendum issues, on-line and/or via an e-voting forum as provided by the apparatus 100. At step 1703, the individual can, using his or her user communication device 20, select an allowed voting appointment time slot, date, and/or time, from among available voting appointment time slots, dates, and/or times, for the upcoming election which are transmitted from the central processing computer 11 and which are received by the user communication device 20 and displayed by the display device 20E. At step 1703, the individual can select a voting appointment time slot, date, and/or time, and the user communication device 20 can transmit information regarding the individual's selected voting appointment time slot, date, and/or time, to the central processing computer 11.

At step 1704, the central processing computer 11 can receive and process the information regarding the individual's selected voting appointment time slot, date, and/or time. At step 1705, the central processing computer 11 can process information for determining whether or not the individual, or any other person, has already voted or cast a ballot in or for the upcoming election using the individual's voter account. In this manner, the apparatus 100 can be utilized to prevent or prohibit users and/or individuals from voting more than once in an election and/or to prevent or prohibit a voter account from be used more than once in an election.

If, at step 1705, it is determined by the central processing computer 11 that the voter account has not already been used to vote in, or has not already been used to cast a ballot in, the upcoming election, then the central processing computer 11 will, at step 1706, process information for making the appointment for the individual so that the individual can vote in, or can cast a ballot in or for, the upcoming election on-line and/or via the e-voting forum described herein as being provided by the apparatus 100. At step 1706, the central processing computer 11 will process information for making the individual's appointment and can generate a voting appointment confirmation message containing information for confirming the voting appointment for the individual.

In a preferred embodiment, the voting appointment confirmation message can contain or include information regarding the individual's voter account, account identification information, a pass code for accessing the e-voting forum, the date and time of the appointment, information regarding all public offices and/or referendum issues which are to be voted on in the upcoming election, information and/or links or hyperlinks to information regarding all of the candidates for each public office and/or information regarding any and/or all referendum issues to be voted on in the upcoming election, and/or any other information deemed useful or desirable for the individual. At step 1706, the central processing computer 11 can transmit the voting appointment confirmation message to the user communication device 20 of the individual and/or to any number of other user communication devices 20 of or associated with the individual.

At step 1706, the central processing computer 11 can also generate a voter appointment alert message containing information regarding the voting appointment made by the individual to vote or to cast a ballot on-line and via the e-voting forum. At step 1706, the central processing computer 11 can also transmit the voter appointment alert message to the campaign/project manager computer 30 for, or associated with, each candidate running in for any public office in the upcoming election, and/or the central processing computer 11 can also transmit the voter appointment alert message to the campaign/project manager computer 30 for, or associated with, each reference issue to be voted on in the upcoming election.

Thereafter, at step 1706, the central processing computer 11 can store, in the database 11H of the central processing computer 11 and/or in the distributed ledger/Blockchain technology system 12 of the central processing computer/distributed ledger/Blockchain technology system 10, any and/or all data and/or information regarding the voting appointment made by the individual, including the voting appointment confirmation message for the individual and/or any other data and/or information regarding the individual's use of, and/or the individual's use session in and/or during, the preferred embodiment of FIG. 17. In a preferred embodiment, the central processing computer 11 will store, in the database 11H of the central processing computer 11 and in the distributed ledger/Blockchain technology system 12 of the central processing computer/distributed ledger/Blockchain technology system 10, any and/or all data and/or information regarding the voting appointment made by the individual, including the voting appointment confirmation message for the individual and/or any other data and/or information regarding the individual's use of, and/or the individual's use session in and/or during, the preferred embodiment of FIG. 17. Thereafter, the operation of the apparatus 100 will cease at step 1707.

If, at step 1705, it is determined that the voter account has already been used to vote in, or to cast a ballot in, the upcoming election, then the central processing computer 11 can, at step 1708, generate an appointment denial message and can transmit the appointment denial message to the user communication 20. At step 1708, the central processing computer 11 can also store, in the database 11H of the central processing computer 11 and/or in the distributed ledger/Blockchain technology system 12 of the central processing computer/distributed ledger/Blockchain technology system 10, any and/or all data and/or information regarding the attempt to schedule a voting appointment using the individual's voter account. Thereafter, the operation of the apparatus 100 will cease at step 1707.

In any and/or all of the preferred embodiments described herein, any type of Blockchain technology can be utilized in connection with the apparatus 100 and methods of the present invention. In a preferred embodiment, for example, the apparatus 100 and methods of the present invention can utilize a distributed ledger(s) along with any Blockchain technology or technologies, Bitcoin Blockchain technology or technologies, Ethereum Blockchain technology or technologies, Bitcoin Cash Blockchain technology or technologies, Litecoin Blockchain technology or technologies, Privacy Coin Bitcoin technology or technologies, and/or any other suitable Blockchain technology or technologies, and/or Smart contracts and/or Smart contract technology or technologies and/or decentralized autonomous organizations (DAOs), decentralized autonomous organizations (DAOs) technology or technologies, and/or any combination of same.

By utilizing a distributed ledger and a suitable Blockchain technology, the apparatus 100 and methods of the present invention can reduce the amount of processing performed by, and reliance on, a central processing computer and/or can eliminate the need for a central processing computer and/or any centralized entity which might operate the central processing computer. The use of a distributed ledger and a suitable Blockchain technology can also provide for less reliance on a central processing computer for certain tasks and functions. By utilizing a central processing computer in connection with a distributed ledger and a suitable Blockchain technology, the apparatus 100 can allow for certain functions to be performed by and with the central processing computer or central processing computer component and allows for certain functions to be performed by the distributed ledger and a suitable Blockchain technology.

It is important to note that the distributed ledger and the Blockchain technology utilized with the apparatus 100 can also be referred to herein as a "distributed ledger/Blockchain technology", "distributed ledger and Blockchain technology", "distributed ledger/Blockchain technology system", or "distributed ledger and Blockchain technology system", or that the distributed ledger and the Blockchain technology utilized with same can also be referred by using any suitable phrase or terminology indicative of an application or system which utilizes or which includes a distributed ledger which is used with any Blockchain technology or which is used in connection, or in conjunction, with any Blockchain technology.

In any and/or all of the embodiments described herein, the apparatus 100 and methods of the present invention, can also be utilized in conjunction with a campaign(s) or election(s) for public offices, private offices, private organization elections, corporate elections of any kind, union elections, school elections, student body elections, trade association elections, civic association elections, and/or any other public elections, private elections, quasi-public elections, and/or quasi-private elections, of any type or kind, as well as can be utilized in conjunction with any contests, tournaments, competitive events, or pageants, polling activities, marketing campaigns, and/or surveys, of any type or kind.

Figure 18A:
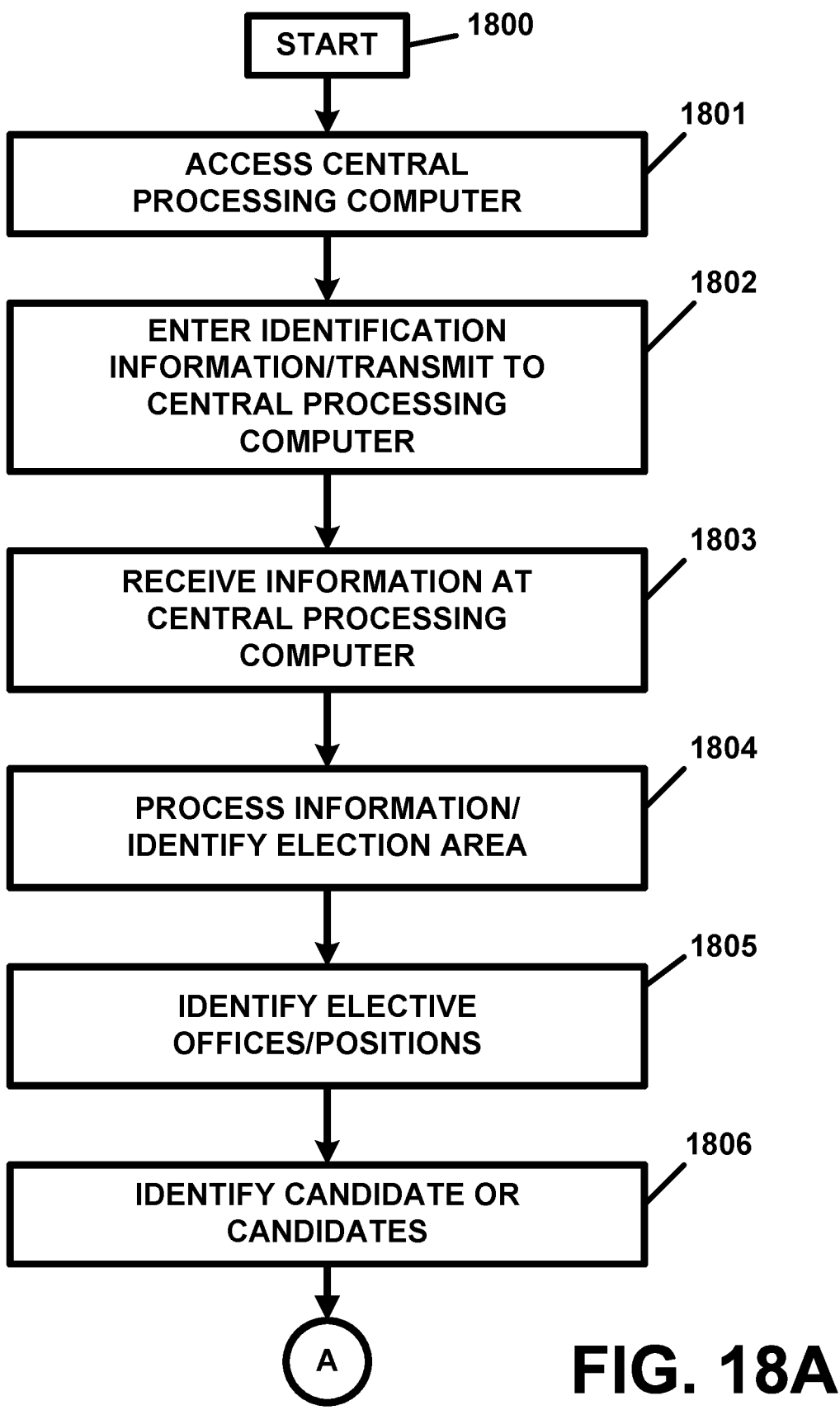
FIGS. 18A and 18B illustrate another preferred embodiment method for utilizing the apparatus of the present invention, in flow diagram form.
Figure 18B:
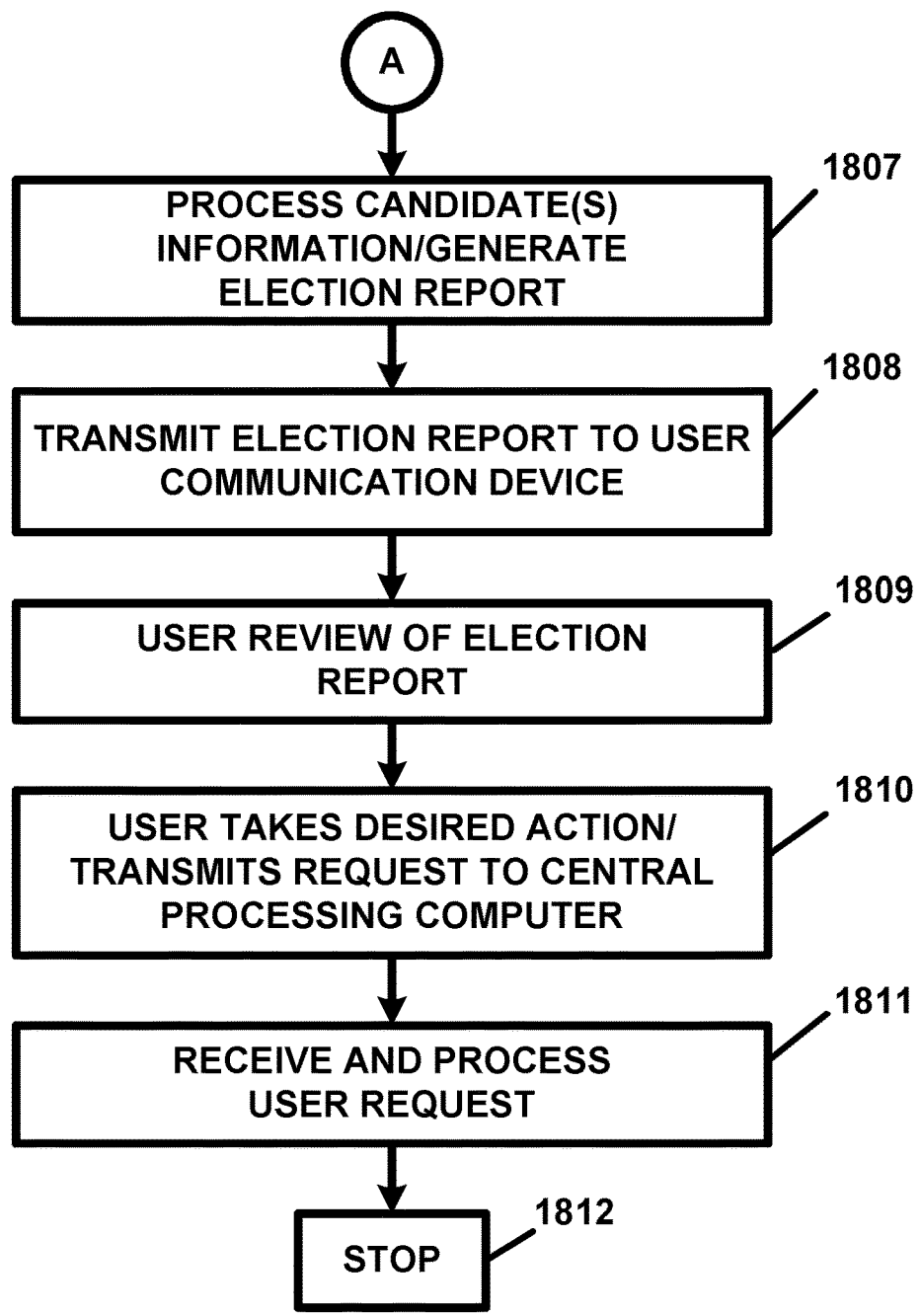

In a preferred embodiment, the apparatus 100 and methods of the present invention can also be utilized in order to provide campaign and/or campaigning information to any user of the present invention. FIGS. 18A and 18B illustrate another preferred embodiment method for utilizing the apparatus 100 of the present invention, in flow diagram form.

The embodiment of FIGS. 18A and 18B can be utilized for providing information for any type or kind of election and/or campaign, including elections for public office or public offices and/or elections for offices and/or positions in private organizations, quasi-public organizations, and/or quasi-private organizations, as well as for any contests, tournaments, competitive events, or pageants, polling activities, marketing campaigns, and/or surveys, of any type or kind which involving voting, or the casting of votes, by individuals or entities.

As an example, the embodiment of FIGS. 18A and 18B will be herein-described as being utilized in order to provide information to users, individuals, voters, and/or constituents (hereinafter referred to as "user" or "users"), regarding elections and/or campaigns for public office or public offices. It is, however, important to note that the preferred embodiment of FIGS. 18A and 18B can be utilized in a same, a similar, and/or an analogous, manner in connection with voting campaign and/or voter or selection activities relating to, or involving, contests, tournaments, competitive events, or pageants, polling activities, marketing campaigns, and/or surveys, of any type or kind.

In the embodiment of FIGS. 18A and 18B, it is envisioned that a user, a candidate, a campaign manager, a campaign staff member or entire staff, a political party, and/or any other individual(s) and/or entity, can register and/or post any relevant information with the apparatus 100 and/or with the central processing computer 11.

With reference to FIGS. 18A and 18B, the operation of the apparatus 100 commences at step 1800. At step 1801, the user accesses the central processing computer 11 via the respective user communication device 20. At step 1802, the user can enter identification information, which can be his or her name, voter registration number, and/or address or residence information, and can the transmit same to the central processing computer 11.

At step 1803, the central processing computer 11 can receive the user-entered and transmitted information. At step 1804, the central processing computer 11 can process the user information and identify the user's election district or election area. At step 1805, the central processing computer 11 can identify and/or ascertain the offices or positions for which elections are to be held. For example, a certain election district or municipality may be voting in the next or upcoming election in order to elect a congressman or congresswomen, a mayor, a town council representative, and a judge. The apparatus 100 of the present invention and/or the central processing computer 11 can also process any of the herein-described information for any election, general election, primary election, and/or special election.

At step 1806, the central processing computer 11 can identify all of the candidates for all of the offices or positions which are identified at step 1805. At step 1807, the central processing computer 11 can process the information regarding the candidates identified at step 1806.

In a preferred embodiment, the central processing computer 11, at step 1806, can process, collect, and/or aggregate, any and/or all candidate information which can be stored in the database 11H and/or which can include, but which is not limited to, candidate name, profile, resume, credentials, platform, position on issues, campaign literature, campaign advertisements, campaign commercials, campaign polls, campaign surveys, campaign fundraiser or fundraising information, and/or any other candidate and/or campaign related information regarding and/or related to the candidate.

At any time, any candidate(s), campaign(s), campaign staff member(s), campaign staff(s), political party or parties, group(s) or slate(s) of candidates, public elections administrator(s), private elections administrators, group(s), association(s), organization(s), and/or any other individual or entity, can access the central processing computer 11 and can post information concerning any of the elections, offices, positions, candidates, campaigns, and/or any and/or all candidate information which can include, but which is not limited to, candidate name, profile, resume, credentials, platform, position on issues, campaign literature, campaign advertisements, campaign commercials, campaign polls, campaign surveys, campaign fundraiser or fundraising information, and/or any other candidate and/or campaign related information regarding and/or related to the candidate.

Any of the herein-described information can be processed by the central processing computer 11, can be stored in the database 11H, and can be made available for any processing and/or for the generation of any of the election reports and/or information described herein.

In a preferred embodiment, at step 1807, the central processing computer 11 can generate an election report. In a preferred embodiment, the election report can contain information describing each office or position, its duties and responsibilities, and/or the voting records or platforms of the candidates regarding issues associated with and/or corresponding to the office or position. In a preferred embodiment, the election report can also contain any of the herein-described information, and/or links or hyperlinks to, any of the herein-described and/or related information, for each of the candidates for office in the upcoming election.

At step 1808, the central processing computer 11 can transmit the election report to the user communication device 20 associated with the user. At step 1809, the user can review the information contained in the election report for any of the campaigns and/or candidates described herein.

In another preferred embodiment, the user can, at step 1809, receive compensation and/or can be paid for viewing an advertisement and/or commercial for, and/or for participating in a survey or poll performed by, a candidate or group of candidates.

At step 1810, the user can take any desired action such as transmit comments or questions, including e-mail messages, to any candidate or group of candidates, make and/or transmit fundraising contributions or pledges to any candidate or group of candidates, transmit messages volunteering to serve as a campaign worker and/or fundraiser for the candidate or group of candidates, volunteer to post a lawn sign or window sign for a candidate or group of candidates, and/or transit a message containing any other messages and/or information to any candidate or candidates. At step 1810, the user can also schedule an appointment for a videoconference call or a telephone call in order to speak to any candidate or campaign staff member of the candidate in order to ask questions of, or receive information from, the candidate or his or her campaign staff member.

At step 1810, the user can also transmit, to the central processing computer 11, a request to be notified regarding any new developments, information, polls, surveys, advertisements, scheduling of fundraisers, scheduling of events, and/or any other information, which may be posted at the central processing computer 11 regarding the upcoming election, any of the offices or positions which are to be filled by the election, and/or any information regarding and/or provided by any candidate or group of candidates. For example, a user may request to be notified by the central processing computer 11 if a candidate, whom the user wants to support, posts new campaign materials or the scheduling of a fundraiser.

At step 1811, the central processing computer 11 can receive and process the user's message or messages and can perform any of the tasks required and/or requested thereby. In the case of a user's request to be notified upon the posting of information regarding an election, an office or position, or a candidate or candidates, the central processing computer 11 can also process and store this information at step 1811.

As noted above, at any time, any candidate(s), campaign(s), campaign staff member(s), political party or parties, group(s) or slate(s) of candidates, public elections administrators), private elections administrators, group(s), association(s), organization(s), and/or any other individual or entity, can access the central processing computer 11 and can post information concerning any of the elections, offices, positions, candidates, and/or campaigns, and/or any other activities, described herein. This information can be processed by the central processing computer 11, can be stored in the database 11H, and can be made available for any processing and/or for the generation of any of the election reports and/or information described herein. Thereafter, the operation of the central processing computer 11 will proceed to step 1812. The operation of the apparatus 100 will thereafter cease at step 1812.

In a preferred embodiment, at any time and/or upon the posting of any new development(s) and/or information regarding an election(s), an office or offices, a candidate(s), a campaign(s), and/or any other organizations or entities involved in, and/or related to, an election, an office, a candidate(s), and/or a campaign(s), the central processing computer 11, can process the information and determine if a notification request has been made pertaining to same.

If the central processing computer 11 determines that a notification request has been made, the central processing computer 11 can generate an appropriate message and/or an election report, which can include a notification message and/or the information which the user has requested and/or which is the subject matter of the development and/or the information, and can transmit the same to a user communication device 20 or communication device associated with the requesting user. The election report and/or the information contained therein can be transmitted in or as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

Upon receipt of any election report by the user communication device 20 at step 1808, the operation of the apparatus 100 can proceed from and/or continue from step 1808 as described above.

In the above-described manner, the apparatus 100 and methods of the present invention can be utilized to provide a centralized election and/or campaign information center and/or clearinghouse for information and/or for communications regarding and/or occurring between any of the users, individuals, and/or entities, described herein.

Figure 19A:
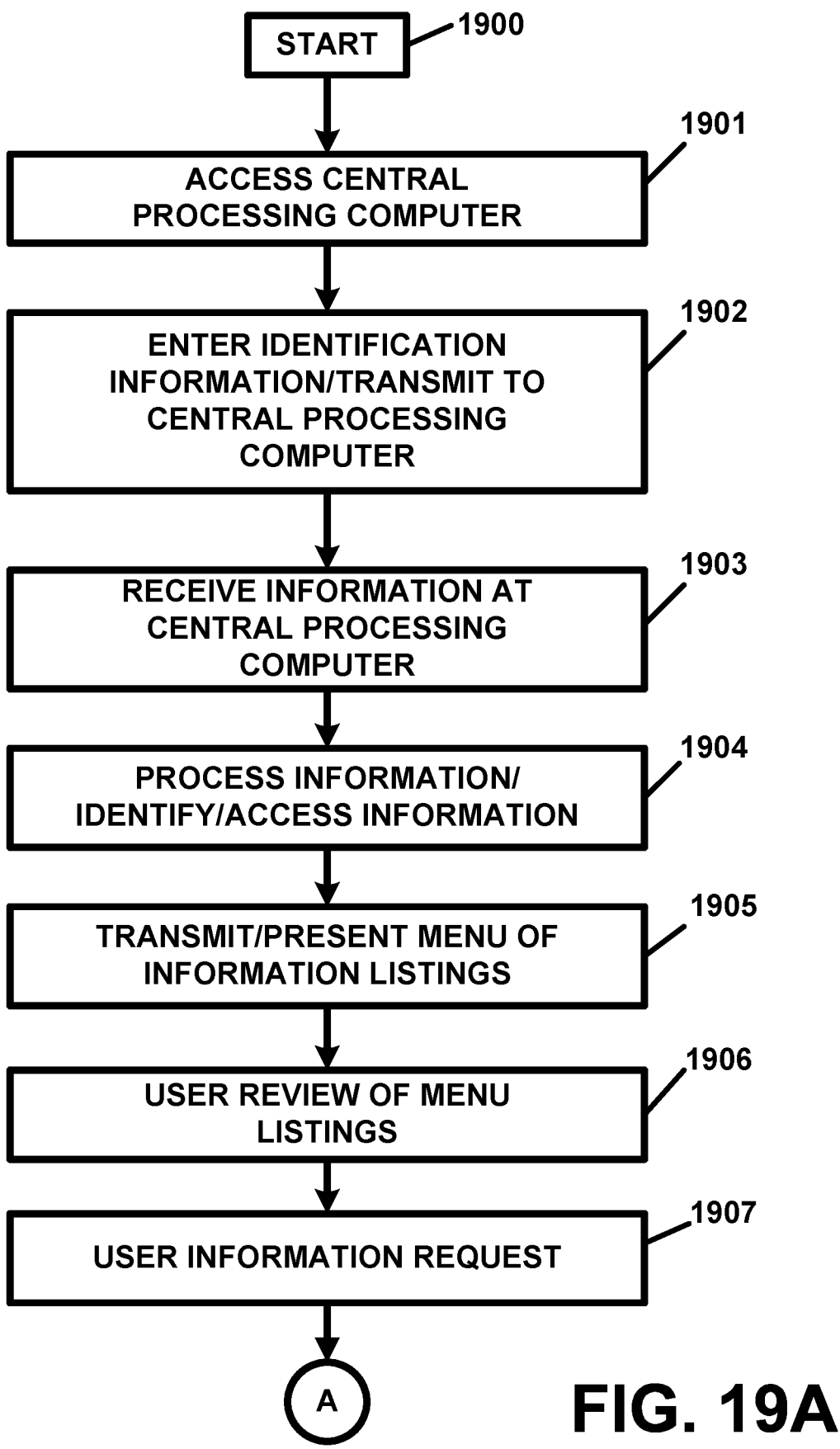
FIGS. 19A and 19B illustrate still another preferred embodiment method for utilizing the apparatus of the present invention, in flow diagram form.
Figure 19B:
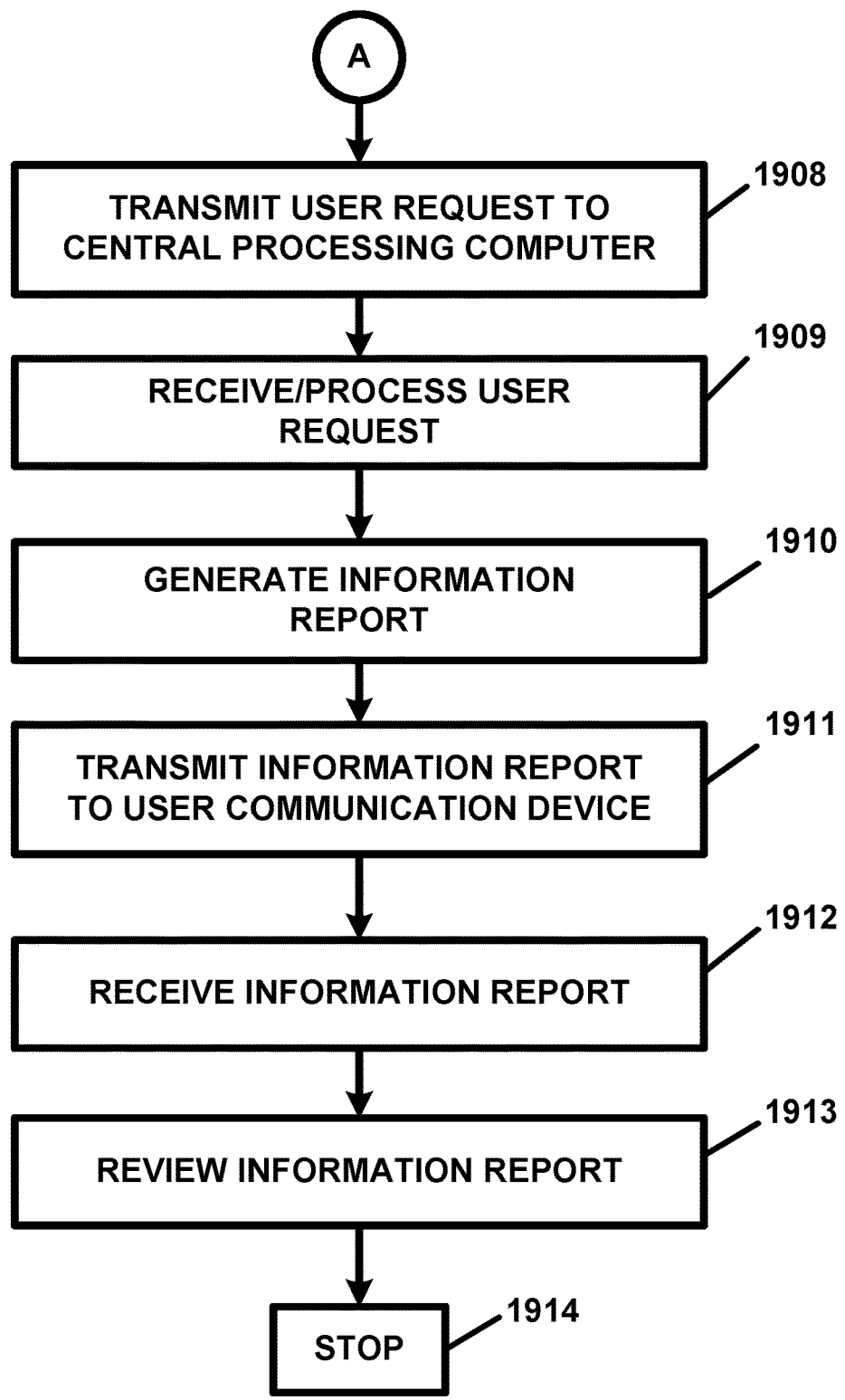

In another preferred embodiment, the apparatus 100 and methods of the present invention can also be utilized in order to provide campaign management information and/or information for assisting in managing and/or in conducting a campaign. FIGS. 19A and 19B illustrate another preferred embodiment method for utilizing the apparatus 100 of the present invention, in flow diagram form.

In the preferred embodiment of FIGS. 19A and 19B, it is envisioned that a candidate, a campaign manager, a campaign staff member, a political party, and/or any other individual and/or entity, will register their respective activities and/or efforts with the apparatus 100 and/or with the central processing computer 11.

With reference to FIGS. 19A and 19B, the operation of the apparatus 100 commences at step 1900. At step 1901, the user, individual, candidate, campaign manager, and/or campaign staff worker (hereinafter referred to as the "user"), can access the central processing 11 via the respective user communication device 20 or campaign/project manager computer 30, if utilized. At step 1902, the user can enter identification information and/or campaign identification information and can transmit the same from the user communication device 20 to the central processing computer 11.

At step 1903, the central processing computer 11 can receive and process the identification information. At step 1904, the central processing computer 11 can process the user or campaign identification information, identify the user or campaign, and access any information from the database 11H which can or may pertain to the candidate, the campaign, and/or the election. At step 1905, the central processing computer 11 can transmit, to the user communication device 20, a menu of information item listings for display via the display device 20E.

In a preferred embodiment, the menu items can contain any one or more of a number of subject areas, including, but not limited to, campaign, election, and/or election-related laws, rules, and/or regulations, filing requirements and/or filing forms regarding nominating petitions, financial disclosure forms, voter registration forms, absentee ballot forms, absentee ballots, election ballots, disclosure forms of any kind, and/or any other campaign and/or election forms and/or documents, voter registration lists, registered voter lists, preferred voter lists, political party information, and/or voter information of any kind.

In a preferred embodiment, the menu items can also contain event schedules, event listings, important dates, information regarding events, information regarding event information, polls, political polls, issue polls, surveys, issues pertinent to a campaign and/or an election, news, news regarding issues, developments regarding issues, and/or any other pertinent information.

In a preferred embodiment, the menu items can also contain information regarding fundraising, contributors, campaign contributors, fundraising filings of candidates, financial disclosure filings of candidates, fundraiser schedules, and/or any other pertinent information. In a preferred embodiment, the menu items can also contain information regarding the activities, press releases, petition filings, financial disclosure filings, and/or other filings and/or information regarding any activities, of candidates and/or any other organizations.

In a preferred embodiment, the menu items can also contain information regarding any of the goods providers, products providers, and/or services providers, described herein regarding any of the campaign and/or related goods, products, and/or services. In a preferred embodiment, the menu items can also contain any other information regarding any of the campaigns, elections, candidates, and/or organizations, described herein. The menu items can also include links and/or hyperlinks to any of the herein-described and/or related information.

At step 1906, the user communication device 20 can receive, and the user can review via the display device 20E, any information contained in, or the, menu items. At step 1907, the user can request any information in which he or she is interested by transmitting an appropriate request from the user communication device 20 to the central processing computer 11.

In a preferred embodiment, the request can be for, or regarding, any of the information which is contained in, and/or related to, the above-described menu items. For example, the user can request any one or more of a nominating petition, a voter list, information regarding polls, surveys, information regarding other candidates, information regarding events, event schedules, information regarding campaign related goods, products, and/or services, and/or any other information which may be useful to, and/or desired by, a candidate, a campaign, a campaign manager, and/or any other individual.

At step 1908, the user's request can be received by the central processing computer 11. At step 1909, the central processing computer 11 can process the user's request. At step 1910, the central processing computer 11 can generate an information report which can contain the requested information and/or a link or links to the requested information. At step 1911, the information report can be transmitted from the central processing computer 11 to user communication device 20 associated with the user.

At step 1912, the user communication device 20 can receive the information report. At step 1913, the user can review the information contained in, or provided via, the information report and can utilize the same in any appropriate manner. Thereafter, the operation of the apparatus 100 will cease at step 1914.

In a preferred embodiment, the information report, as well as any of the information transmitted to the user or the user communication device 20, can also be transmitted as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

In another preferred embodiment, the user can also, at step 1907, request to be notified regarding any new developments, information, polls, surveys, advertisements, scheduling of fundraisers, scheduling of events, and/or any other information, which may be posted at the central processing computer 11 regarding the upcoming election, any of the offices or positions which are to be filled by the election, and/or any information regarding and/or provided by any candidate, group of candidates, and/or any other information sources. In a preferred embodiment, the central processing computer 11 can receive and process any and/or all of the user's requests for notification regarding any event, occurrence, and/or other happening.

As noted above, any candidate(s), campaign(s), campaign staff member(s), political party or parties, group(s) or slate(s) of candidates, public elections administrator(s), private elections administrator(s), group(s), association(s), organization(s), and/or any other individual or entity, can access the central processing computer 11 and can post any of the herein-described information at any time. This information can also be processed by the central processing computer 11, can be stored in the database 11H, and can be made available for any processing and/or for the generation of any of the information reports and/or information described herein.

In a preferred embodiment, at any time and/or upon the posting of any information regarding any new developments, information, polls, surveys, advertisements, scheduling of fundraisers, scheduling of events, and/or any other information, the central processing computer 11 can also process such information and determine if a notification request has been made, by any user or users, pertaining to the same.

In a preferred embodiment, if the central processing computer 11 determines that a notification request has been made, then the central processing computer 11 can generate an appropriate message and/or information report, which can include a notification message and/or the information which the user has requested and/or which is the subject matter of the development and/or information, and can transmit the same to a user communication device 20 or communication device associated with the requesting user.

In a preferred embodiment, the information report and, and/or information contained therein, can be transmitted as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method. The information report can also contain information reminding an individual, candidate, campaign, political party, and/or organization, to perform a task, take an action, and/or effectuate a required filing.

In a preferred embodiment, the present invention can also be utilized by a candidate, a campaign, and/or a political party, in order to ascertain a candidate's standing in a poll or survey at any time. The candidate, campaign, or political party, can request that polls or surveys be performed by the apparatus 100 and/or by the central processing computer 11 in any appropriate polling and/or surveying manner. The central processing computer 11 can also be programmed to perform polls, poll taking, and/or surveys, at any time, at a pre-determined time interval(s), and/or in any other appropriate and/or selected manner. In this regard, the central processing computer 11 can perform polls or surveys for a candidate and/or for any issues or areas of interest, and can make these polls or surveys available to a candidate, a campaign, and/or a political party.

In a preferred embodiment, the central processing computer 11 can also provide the results of a poll(s) or survey(s) when the latest information becomes available and/or at any other time. The polling information or survey information can also be provided to the respective candidate, campaign, and/or political party, as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

In another preferred embodiment, the central processing computer 11 can maintain event schedules and/or calendars for any of the individuals, candidates, campaigns, political parties, and/or organizations, described herein. In another preferred embodiment, the central processing computer 11 can receive event scheduling information from any of the herein-described users, individuals, candidates, campaigns, political parties, and/or organizations, and/or any other third parties, who or which can utilize the apparatus 100. In another preferred embodiment, the central processing computer 11 can process any received event scheduling information, identify the individual(s), candidate(s), campaign(s), political party or parties, and/or organization(s), who or which may have an interest in the event, and update the schedule or calendar of the respective individual(s), candidate(s), campaign(s), political party, and/or organization(s), so as to include the event in their respective schedule(s) and/or calendar(s) of the respective individual(s), candidate(s), campaign(s), political party, and/or organization(s).

In another preferred embodiment, the apparatus 100 and methods of the present invention can be utilized in order to record and to store information regarding financial transactions for, and/or campaign contributions, financial as well as non-financial, and/or in-kind, which are received by, an individual, a candidate, a campaign, a political party, and/or organization. The central processing computer 11 can process the stored financial transaction information and/or campaign contribution information in conjunction with financial disclosure requirements and generate appropriate financial disclosure report(s) for, or on behalf of, the individual, candidate, campaign, political party, and/or organization.

In a preferred embodiment, the central processing computer 11 can generate, and can effectuate the filing, by electronic transmission or electronic submission from the central processing computer 11 to the appropriate public election administrator/governmental entity computer 40, of the financial disclosure form with the appropriate public election administrator or governmental entity. The central processing computer 11 can also perform any other financial accounting processing routines in order to provide financial accounting services for, or on behalf of, the individual, candidate, campaign, political party, and/or organization.

In the above-described manner, the apparatus 100 of the present invention can be utilized in order to provide an information clearinghouse for any or the campaign information and/or election information, and/or any other related information, described herein, which can be utilized in managing and/or conducting campaign activities.

Figure 20A:
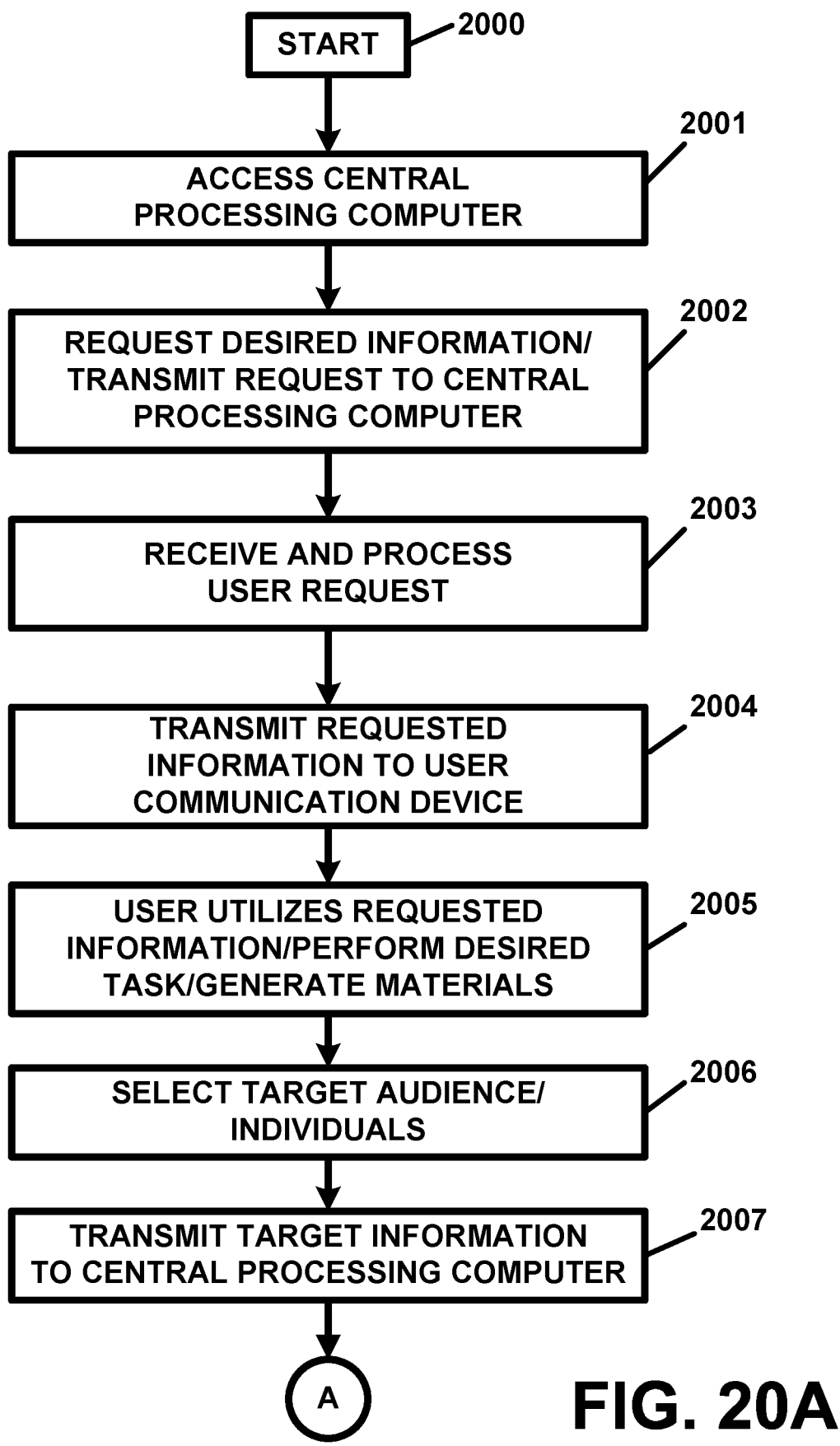
FIGS. 20A and 20B illustrate yet preferred embodiment method for utilizing the apparatus of the present invention, in flow diagram form.
Figure 20B:
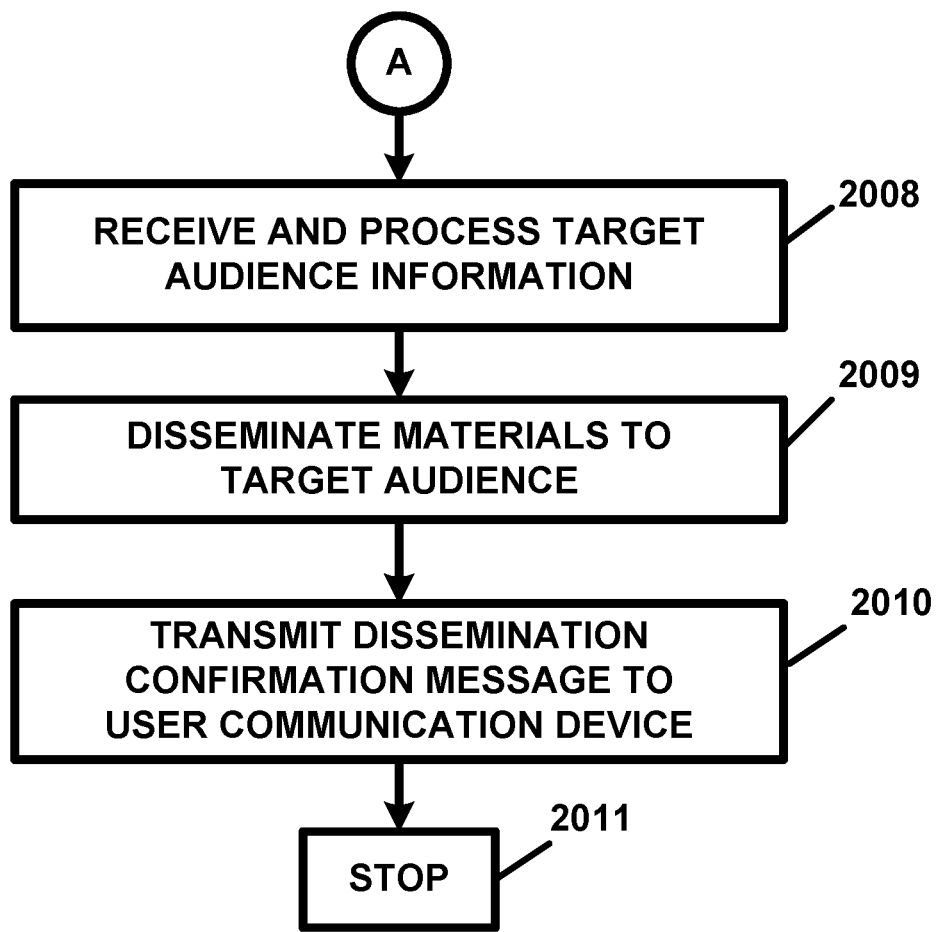

In another preferred embodiment, the apparatus 100 and methods of the present invention can be utilized in order to generate, produce, and/or disseminate, campaign materials, campaign literature, and/or press releases. FIGS. 20A and 20B illustrate another preferred embodiment method for utilizing the apparatus 100 of the present invention, in flow diagram form.

With reference to FIGS. 20A and 20B, the operation of the apparatus 100 commences at step 2000. At step 2001, the user, individual, candidate, campaign manager, and/or campaign worker (hereinafter referred to as the "user"), can access the central processing computer 11 using his or her user communication device 20. At step 2002, the user can request to obtain information needed for generating, designing, and/or producing, campaign literature, campaign information, campaign materials, campaign mailings, campaign e-mailings, and/or press releases (hereinafter referred to as the "materials"), and can transmit the request from the user communication device 20 to the central processing computer 11.

At step 2003, the central processing computer 11 can receive and process the user's request. At step 2004, the central processing computer 11 can transmit, to the user communication device 20, information, templates, document templates, literature templates, mailing templates, e-mailing templates, press release templates, and/or any other information which can assist the user in generating, designing, and/or producing, any of the herein-described and/or requested materials. At step 2005, the user, using and via his or her user communication device 20, can thereafter generate, design, and/or produce, the materials. In a preferred, the materials can be produced and/or generated by and/or at the central processing computer 11 pursuant to user transmitted instructions for or regarding the generating, designing, and/or producing, of the same. In a preferred embodiment, the materials can be text materials, audio materials, video materials, audio/video materials, and/or any combination thereof.

In another preferred embodiment, the materials can also be produced and/or generated by or at the user communication device 20 and can be transmitted to the central processing computer 11. Thereafter, the materials can be stored at the central processing computer 11 in the database 11H of same, at the user communication device 20 in the database 20H of same, or at both computers.

At step 2006, the user can select the individuals, voters, voter groups, groups of individuals and/or entities, organizations, associations, and/or the media, press, newspapers, radio stations, television stations, social networks, and/or any other entities (hereinafter referred to as the "target audience") to whom the materials can be disseminated by the central processing computer 11. For example, the user can select to have campaign literature disseminated and/or sent to voters enrolled in a certain political party or parties, and/or can have literature disseminated and/or sent to certain unions, trade associations, and/or the press entities, social networks, social groups, and/or any other entities or groups.

At step 2007, the user's audience selection information can be transmitted from the user communication device 20 to the central processing computer 11. At step 2008, the central processing computer 11 can process the user's audience selection and identify the members of the target audience and any correspondence information or contact information, such as, but not limited to, mailing address, e-mail address, an instant messaging number, text messaging number, SMS messaging number, MMS messaging number, telephone number, or any other contact information, for each member.

At step 2009, the central processing computer 11 can thereafter disseminate the materials to the user communication devices 20 of each of the members of the target audience. At step 2010, the central processing computer 11 can generate and can transmit a materials dissemination confirmation message to the user communication device 20 of the user so as to confirm to the user that the materials have been disseminated. Thereafter, the operation of the apparatus 100 will cease at step 2011.

In the above-described manner, the apparatus 100 and method of the present invention can be utilized to generate, design, and/or produce, campaign materials and/or campaign-related materials and to disseminate the same to a user selected target audience. The apparatus 100 of the present invention can also be utilized in order to provide campaign materials which can include video clips, audio clips, and/or audio/video clips.

In another preferred embodiment, the apparatus 100 and methods of the present invention can be utilized in order to perform polling and/or surveys and/or to make the results of the respective polls and/or surveys available to any respective users of apparatus 100 of the present invention.

Figure 21:
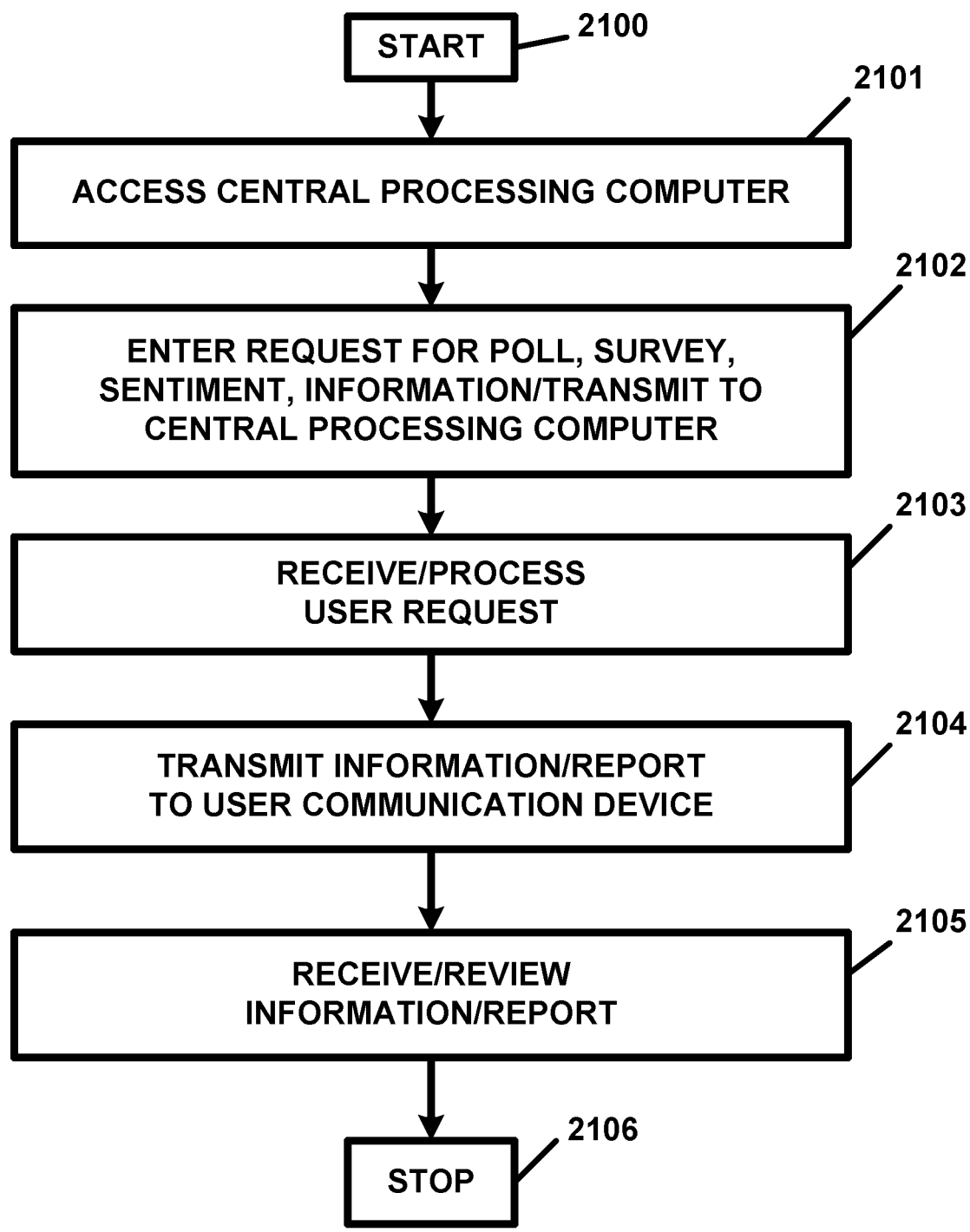
FIG. 21 illustrates another preferred embodiment method for utilizing the apparatus of the present invention, in flow diagram form.

FIG. 21 illustrates another preferred embodiment method for utilizing the apparatus 100 and methods of the present invention, in flow diagram form. With reference to FIG. 21, the operation of the apparatus 100 commences at step 2100. At step 2101, the user, individual, candidate, campaign manager, and/or campaign worker (hereinafter referred to as the "user"), can access the central processing computer 11 via and/or using the user communication device 20. At step 2102, the user can request to obtain information regarding polls, surveys, and/or other information regarding public sentiment (hereinafter referred to as "polls"), for or regarding, any issues which may be of interest to candidates and/or campaigns and/or which may be pertinent to an election, and can transmit the request from the user communication device 20 to the central processing computer 11.

At step 2103, the central processing computer 11 can receive and process the information regarding the user's request. At step 2103, the central processing computer 11 can identify the poll, polls, survey, and/or surveys, which are of interest to the user. If the user requested that a poll or survey be performed, then the central processing computer 11 can identify the poll or survey, perform the poll or survey, and compile the results of the same into a respective poll report or survey report which be generated by the central processing computer 11 at step 2103.

In a preferred embodiment, the polls or surveys can be stored in the database 11H and/or can be obtained by the central processing computer 11 from an external information source or provider, such as a pollster and/or survey taking entity. In a preferred embodiment, the polls and/or surveys can also be obtained from any of the respective external information source computer(s) 80 described herein. If the poll, polls, survey, or surveys, already exist, then the central processing computer 11 can generate a respective poll report or survey report.

At step 2104, the central processing computer 11 can transmit information regarding the poll, polls, survey, or surveys, and/or the respective poll report or survey report, to the user communication device 20. In a preferred embodiment, the poll report or survey report, as well as any of the information transmitted to the user or the user communication device 20, can also be transmitted as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

At step 2105, the user communication device can receive, process, and/or display on or via the display device 20E, any information regarding the poll, polls, survey, or surveys, and/or the respective poll report or survey report, of interest. Thereafter, the operation of the apparatus 100 can cease at step 2106.

Figure 22A:
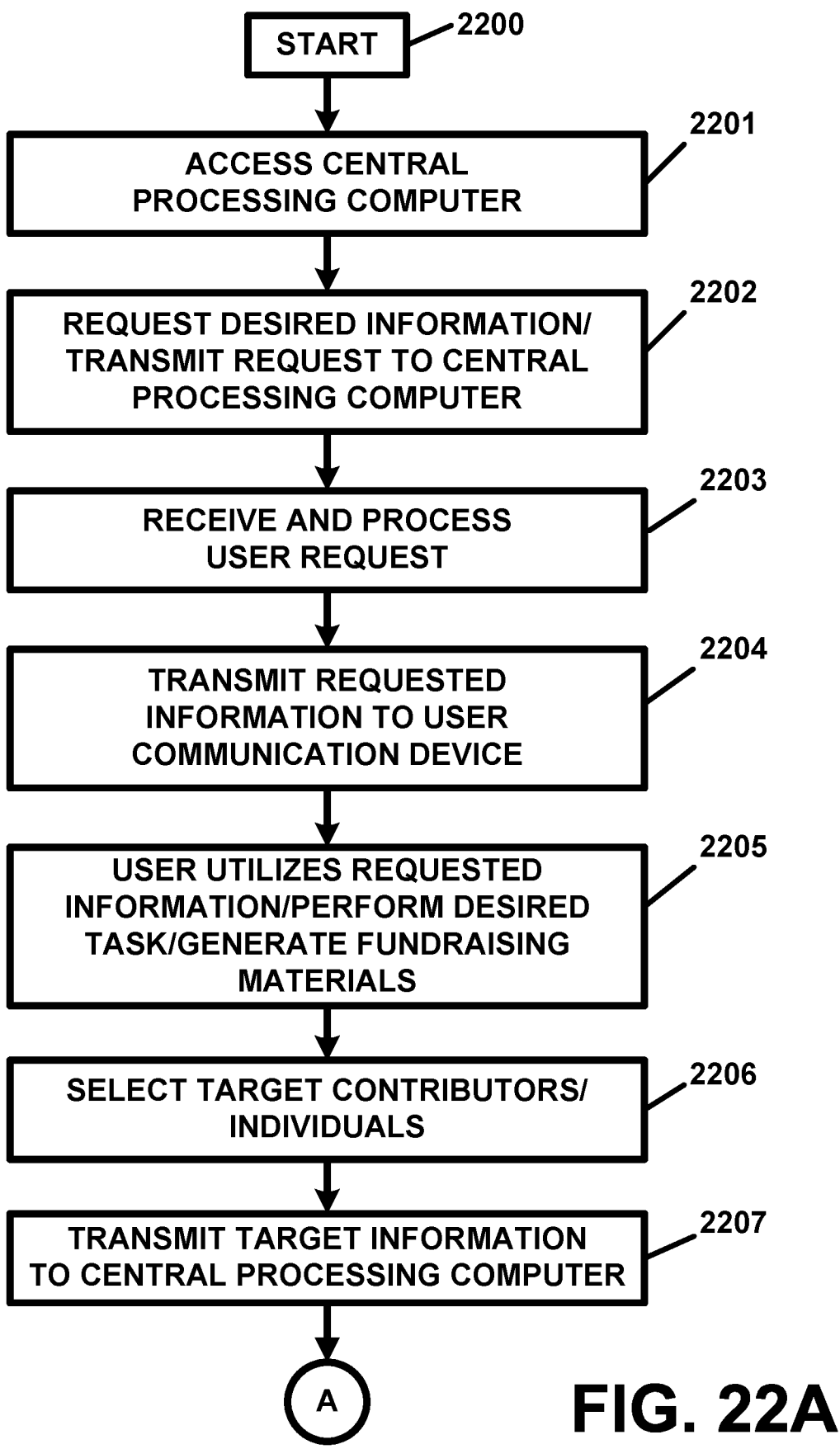
FIGS. 22A and 22B illustrate another preferred embodiment method for utilizing the apparatus of the present invention, in flow diagram form.
Figure 22B:
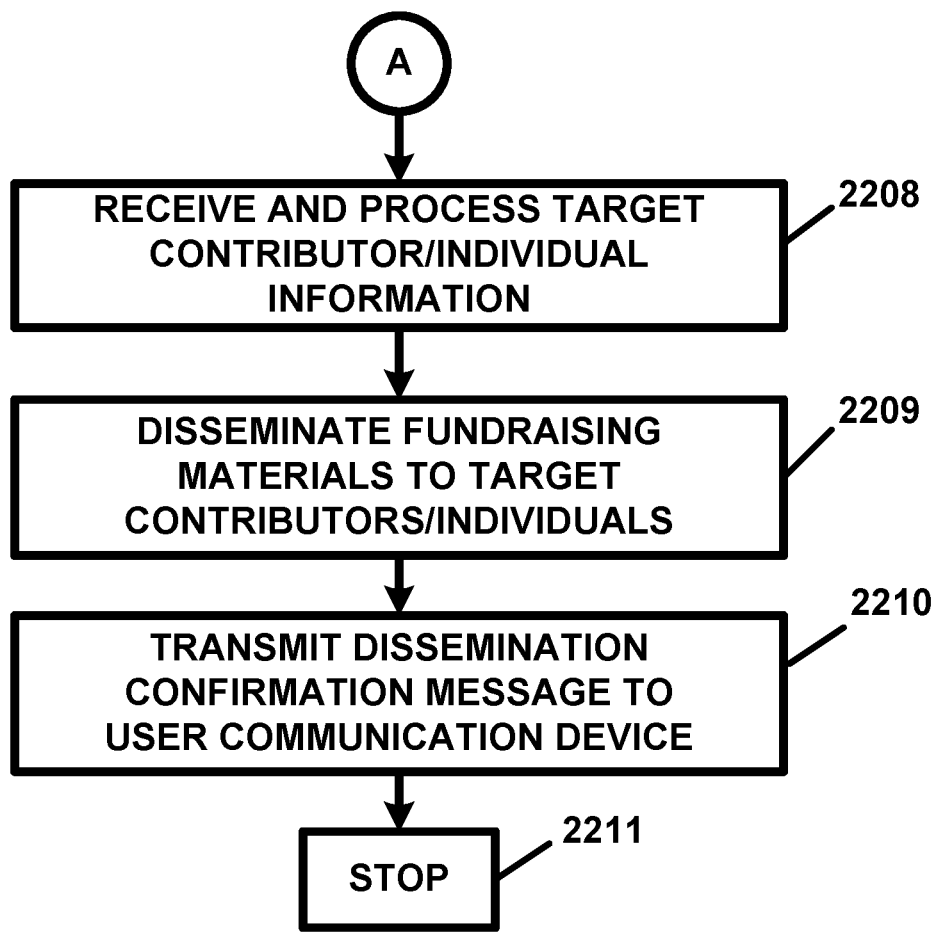

In another preferred embodiment, the apparatus 100 and methods of the present invention can also be utilized in order to perform targeted information dissemination, such as information regarding campaign fundraising and/or targeted fundraising activities. FIGS. 22A and 22B illustrate another preferred embodiment method for utilizing the apparatus 100 and methods of the present invention, in flow diagram form.

With reference to FIGS. 22A and 22B, the operation of the apparatus 100 commences at step 2200. At step 2201, the user, individual, candidate, campaign manager, and/or campaign worker (hereinafter referred to as the "user"), can access the central processing computer 11 using a user communication device 20. At step 2202, the user can request to obtain information needed for generating, designing, and/or producing, campaign fundraising materials and can transmit information regarding the request from the user communication device 20 to the central processing computer 11.

At step 2203, the central processing computer 11 can receive and process the information regarding the user's request. At step 2204, the central processing computer 11 can transmit information, templates, and/or any other information, which can assist the user in generating, designing, and/or producing, any of the herein-described and/or requested materials. At step 2205, the user can thereafter generate, design, and/or produce, the fundraising materials. The materials can be produced and/or generated by and at the central processing computer 11. In a preferred embodiment, the materials can be text materials, audio materials, video materials, audio/video materials, and/or any combination thereof The materials can also be produced and/or can be generated at the user communication device 20 and can be transmitted to the central processing computer 11. Thereafter, the materials can be stored at the central processing computer 11 and/or in the database 11H of the same, at the user communication device 20 and/or in the database 20H of same, or at both the central processing computer 11 and the user communication device 20.

At step 2206, the user can select the individuals, voters, voter groups, groups of individuals and/or entities, organizations, and/or associations, and/or any other individuals and/or entities (hereinafter referred to as the "prospective contributors"), to whom the materials can be disseminated. For example, the user can select to have fundraising materials disseminated to certain constituents, associations, trade unions, and/or any other individual, entity, and/or organization.

At step 2207, the user's audience selection information can be transmitted to the central processing computer 11. At step 2208, the central processing computer 11 can receive and process the information regarding the user's prospective contributor(s) selection, and can identify the prospective contributors and any correspondence information associated therewith and/or corresponding thereto.

At step 2209, the central processing computer 11 can disseminate the materials to each of the prospective contributors by transmitting the same to the respective user communication devices 20 of each of the prospective contributors. The materials transmitted to the prospective contributors or to their respective user communication devices 20 can also be transmitted as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

At step 2210, the central processing computer 11 can transmit a materials dissemination confirmation message to the user communication device 20 of the requesting user so as to confirm to the user that the materials have been disseminated. In a preferred embodiment, the materials can contain information, links, and/or hyperlinks, to a candidate's or a campaign's correspondence location, web site, or web page, so that prospective contributor(s) can effectuate a financial contribution and/or a non-financial contribution(s) to the candidate or campaign via the materials. Thereafter, the operation of the apparatus 100 will cease at step 2211.

Figure 23:
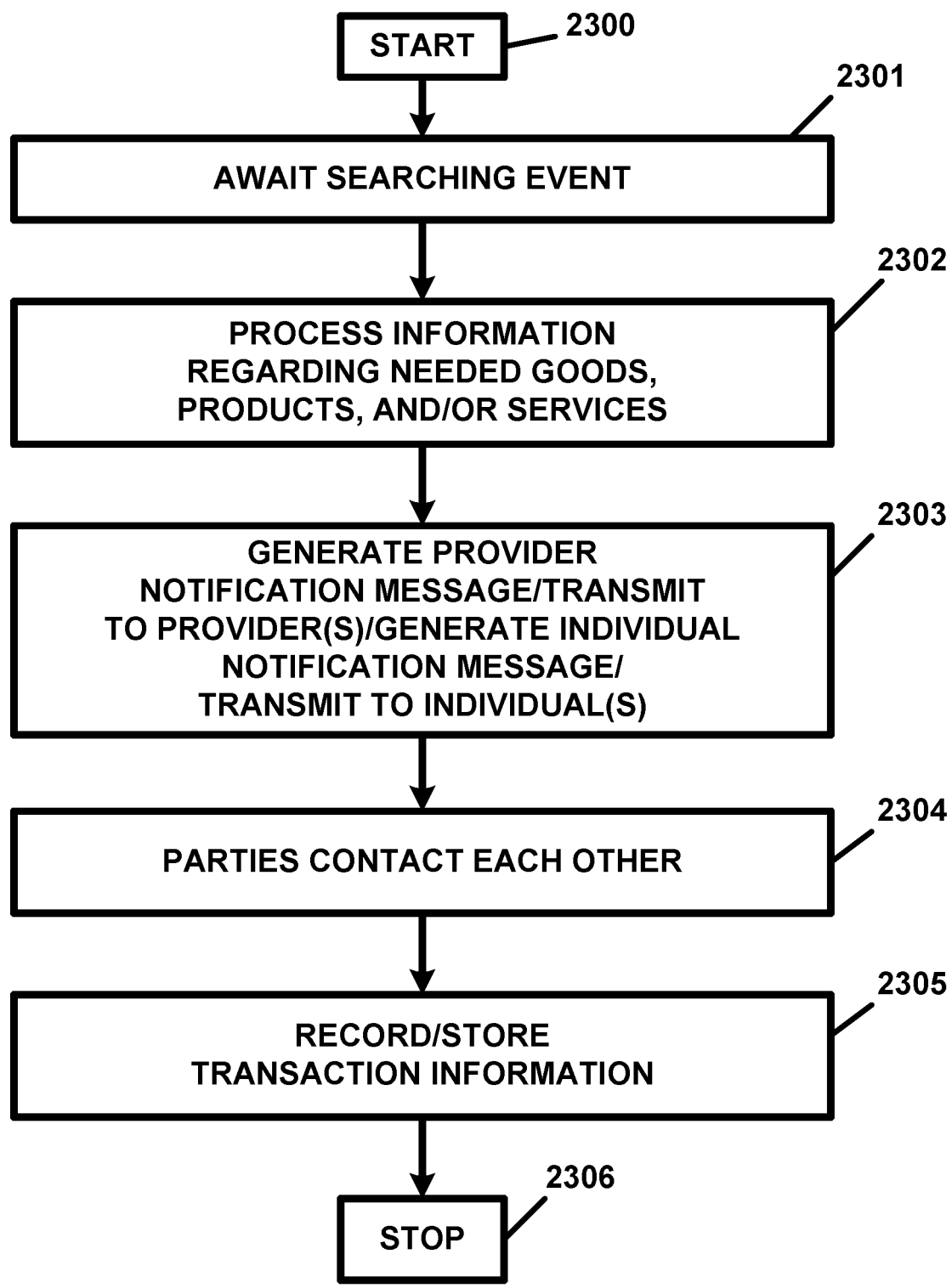
FIG. 23 illustrates still another preferred embodiment method for utilizing the apparatus of the present invention, in flow diagram form.

In another preferred embodiment, the apparatus 100 and methods of the present invention can also be utilized in order to provide notification to an individual, a candidate, a campaign, and/or an organization, of the existence of, and/or of the availability of, a provider of campaign goods, campaign products, and/or campaign services, and/or any other campaign-related goods, products, and/or services. FIG. 23 illustrates another preferred embodiment method for utilizing the present invention, in flow diagram form. In a preferred embodiment, the apparatus 100 and methods of the present invention can also be utilized to identify and/or to locate providers of campaign goods, campaign products, and/or campaign services, for any of the herein-described elections for public office, pubic elections, private elections, entity or organizational elections, voting activities regarding contests, tournaments, competitive events, or pageants, of any type or kind, voting and/or polling activities in marketing campaigns, and/or in conducting polling activities and/or in conducting surveys or any type or kind.

In the embodiment of FIG. 23, the various and/or respective providers of various campaign goods, products, and/or services, can access the central processing computer 11, via a user communication device 20, and can transmit information for posting information regarding their respective campaign goods, products, and/or services. In a preferred embodiment, the campaign or campaign-related goods and/or products can include, but are not limited to, campaign buttons, bumper stickers, literature, palm cards, advertisements of all kinds or types, business cards, balloons, posters, signs, pens, pencils, and any other campaign-related goods and/or products, and/or election-related goods and/or products.

In a preferred embodiment, the campaign or campaign-related services can include, but are not limited to, campaign management services, campaign consulting services, campaign advisory services, campaigning services, petition gathering services, printing services, publicity services, promotional services, advertising services, fundraising services, accounting services, legal services, staffing services, marketing services, polling services, survey services, and/or any other campaign-related services and/or election-related services.

In a preferred embodiment, the information can include the types and/or kinds of campaign goods, products, and/or services, the descriptions of the respective campaign goods, products, and/or services, the cost and/or price information, the conditions for sale of the respective goods and/or products and/or for performing the respective services, information regarding the suitability of, and/or the effectiveness of using, the respective goods and/or products and/or the effectiveness of employing the respective services, and/or any other information which may be considered for or when purchasing the respective goods and/or products, and/or for engaging the services of the respective providers.

The information which is posted by the respective providers or users can be stored in the database 11H. The information which is posted by the respective providers or users can also include data and/or information regarding any of the campaign goods and/or products which are typically employed in a campaign or promotional activities, specialized and/or custom tailored goods and/or products, and/or campaign provider services which are typically employed in a campaign or promotional activities, as well as campaign consulting services, campaign analyst services, campaign strategy specialists, campaign advisory services, and/or any other specialized services.

The operation of the apparatus 100 will commence at step 2300. At step 2301, the central processing computer will await the occurrence of a searching event. In a preferred embodiment, the searching event can be any event which can result in the need for any individual, user, candidate, campaign, campaign staff member, political party, and/or organization, to obtain any of the respective goods, products, and/or services, which are offered by, and/or which are provided by, any of the respective providers described herein.

In a preferred embodiment, the searching event(s) can also include the posting of a request for any campaign and/or campaign-related goods, products, and/or services, which can be offered by, and/or which can be provided by, any of the respective providers described herein. In a preferred embodiment, the searching event(s) can also include the generation of any of the reports or messages described herein as serving to provide campaign management information, and/or which can serve as a reminder to perform a campaign activity, a campaign function, a campaign-related filing, and/or any other campaign-related, and/or election-related activity, which may result in the respective individual, user, candidate, campaign, campaign staff member, political party, and/or organization, needing and/or desiring to obtain and/or to utilize any of the goods, products and/or services, provided by any of the providers described herein.

In a preferred embodiment, the searching event can also include any other event or occurrence which can result in the need for, and/or the desirability of obtaining, any of the goods, products, and/or services, which are offered by and/or provided by any of the providers described herein.

At step 2302, the central processing computer 11 will process information regarding the posted request for needed goods, products, and/or services, of other event giving rise to the searching event in conjunction with the postings from the various providers in order to ascertain the existence and identities of the respective providers who or which can fulfill the needs or desires of the respective individual, user, candidate, campaign, campaign staff member, political party, and/or organization.

At step 2303, the central processing computer 11 can generate a provider notification message and can transmit the same to the respective provider computer 60 of or associated with each provider or who or which can fulfill the request, need, or desire, of the respective individual, user, candidate, campaign, campaign staff member, political party, and/or organization. In a preferred embodiment, the provider notification message can contain the identity and/or contact information regarding the respective individual, user, candidate, campaign, campaign staff member, political party, and/or organization. In a preferred embodiment, the provider notification message can also contain the price which the individual, user, candidate, campaign, campaign staff member, political party, and/or organization is willing to pay for the respective goods, products, and/or services.

In a preferred embodiment, the provider notification message, as well as any of the information transmitted to the provider or the provider computer 60, can also be transmitted as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

At step 2303, the central processing computer 11 can also generate a user notification message for the individual, user, candidate, campaign, campaign staff member, political party, and/or organization, and can transmit the same to the user communication device 20 of or associated with the respective individual, user, candidate, campaign, campaign staff member, political party, and/or organization. In a preferred embodiment, the user notification message can contain the identity and/or contact information for each of the providers identified and/or included in the user notification message.

In a preferred embodiment, the user notification message can also contain the cost or price for the respective goods, products, and/or services. The user notification message, as well as any of the information transmitted to the user or the user communication device 20, can also be transmitted as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

Thereafter, at step 2304, the respective parties can contact each other and can enter into any agreements and/or contracts related to the obtaining and/or the providing of the respective goods, products, and/or services. At step 2305, the central processing computer 11 can record any data and/or information regarding any transactions which may occur at step 2304 between the respective parties and can store said data and/or information in the database 11H. Thereafter, the operation of the apparatus 100 will cease at step 2306.

In another preferred embodiment, the apparatus 100 and methods of the present invention can also be utilized in order to provide notification to a provider(s) of campaign and/or campaign-related goods, products, and/or services, of the existence of a user, an individual, a candidate, a campaign, and/or an organization, who or which may be interested in and/or who or which may be in need of, and/or desirous of obtaining and/or utilizing, any of the respective goods, products, and/or services, which are provided by the respective provider(s).

Figure 24:
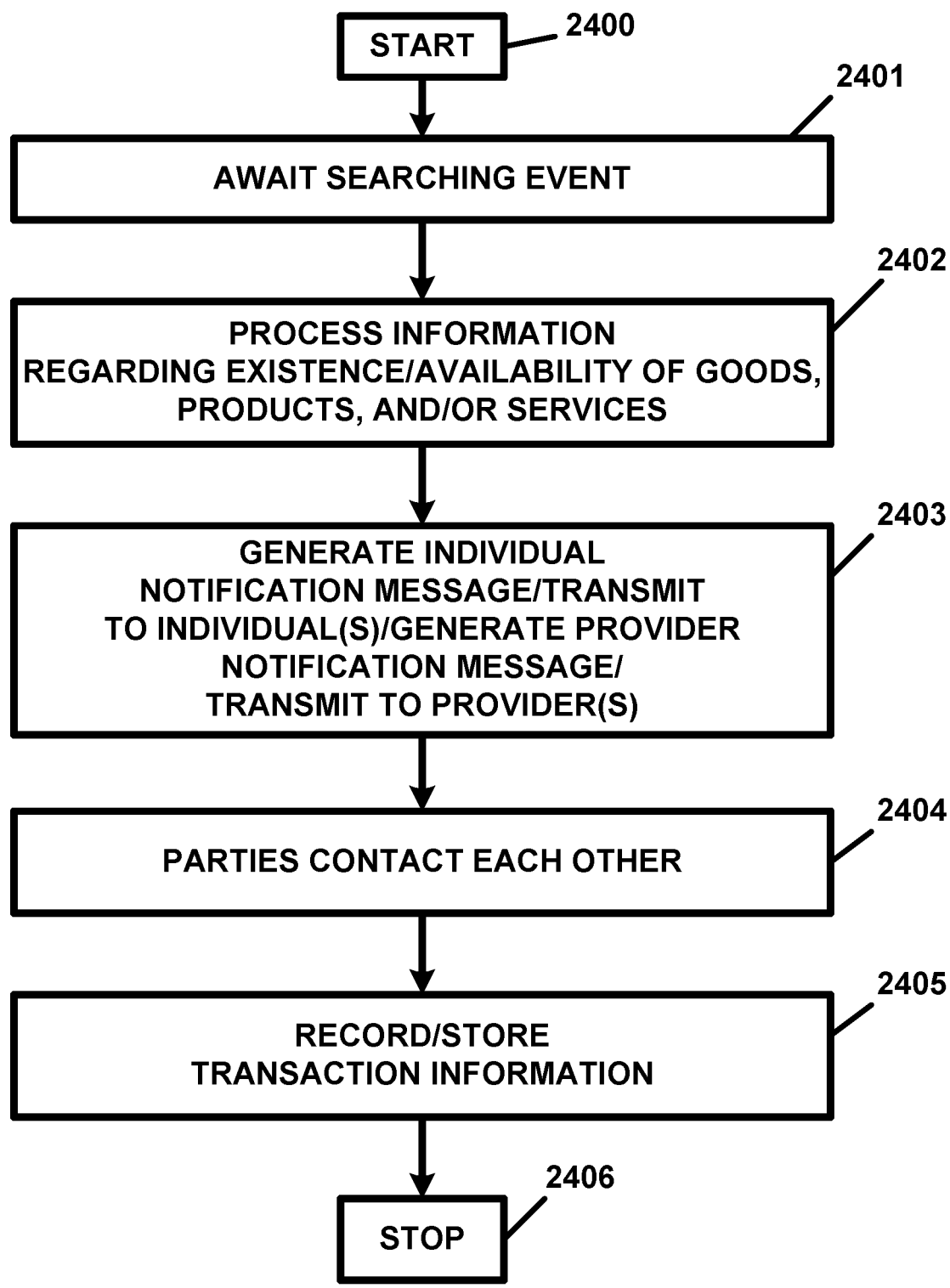
FIG. 24 illustrates yet preferred embodiment method for utilizing the apparatus of the present invention, in flow diagram form.

FIG. 24 illustrates another preferred embodiment method for utilizing the apparatus 100 of the present invention, in flow diagram form. In a preferred embodiment, the apparatus 100 and method of the present invention can also be utilized to identify and/or to locate users, individuals, candidates, campaigns, and/or organization, who or which may need of, and/or who or which may desire to obtain, campaign goods, campaign products, and/or campaign services, which are provided by any of the herein-described providers.

In the preferred embodiment of FIG. 24, the various and/or respective individuals, users, candidates, campaigns, campaign staff members, political party or political parties, and/or organizations, can access the central processing computer 11 via or using a user communication device 20 and can post information regarding their requests, needs, and/or desires, for obtaining and/or for utilizing any respective campaign goods, products, and/or services.

The campaign or campaign-related goods and/or products can include, but are not limited to, campaign buttons, bumper stickers, literature, palm cards, advertisements of all kinds or types, business cards, balloons, posters, signs, pens, pencils, and any other campaign-related goods and/or products, and/or election-related goods and/or products. The campaign or campaign-related services can include, but are not limited to, campaign management services, campaign consulting services, campaign advisory services, campaigning services, petition gathering services, printing services, publicity services, promotional services, advertising services, marketing services, fundraising services, accounting services, legal services, staffing services, and/or any other campaign-related services and/or election-related services.

The information can include the types and/or kinds of campaign goods, products, and/or services, needed or desired, the descriptions of the respective campaign goods, products, and/or services, the desired price or prices which the individuals, users, candidates, campaigns, campaign staff members, political party or political parties, and/or organizations, are willing to pay for the respective campaign goods, products, and/or services, any conditions for purchasing the respective goods and/or products and/or for utilizing or employing the respective services, any information regarding the expected suitability of, and/or the expected effectiveness of using, the respective goods and/or products, and/or the expected effectiveness of utilizing or employing the respective services, and/or any other information relating to purchasing the respective goods and/or products, and/or for engaging the services of the respective providers.

The information which is posted by the respective individuals, users, candidates, campaigns, campaign staff members, political party or political parties, and/or organizations, can be transmitted from the user communication device 20 to, and received by, the central processing computer 11, and can be stored in the database 11H. In a preferred embodiment, the information which is posted by the respective individuals, users, candidates, campaigns, campaign staff members, political party or political parties, and/or organizations, can also include data and/or information regarding specialized requirements and/or custom requirements for the goods, products, and/or services, which are requested, needed, or desired, by the individuals, users, candidates, campaigns, campaign staff members, political party or political parties, and/or organizations.

With reference to FIG. 24, the operation of the apparatus 100 will commence at step 2400. At step 2401, the central processing computer 11 will await the occurrence of a searching event. In a preferred embodiment, the searching event can be any event which can result in the request, need, or desire, for any of the respective campaign goods, campaign products, and/or campaign services, by any of the respective individuals, users, candidates, campaigns, campaign staff members, political party or political parties, and/or organizations, described herein.

In a preferred embodiment, the searching event(s) can also include the posting of the availability of any campaign and/or campaign-related goods, products, and/or services, which can be offered by, and/or which can be provided by, any of the respective providers described herein. In a preferred embodiment, the searching event(s) can also include the generation of any of the reports or messages described herein as serving to provide campaign management information, and/or a reminder to perform a campaign activity, a campaign function, a campaign-related filing, and/or any other campaign-related and/or election-related activity, which may result in the respective individual, user, candidate, campaign, campaign staff member, political party, and/or organization, needing and/or desiring to obtain and/or to utilize any of the campaign and/or campaign-related goods, products and/or services, which are provided by any of the providers described herein.

In a preferred embodiment, the searching event can also include any other event or occurrence which can result in the need and/or the desirability for any of the goods, products, and/or services, which are offered by and/or provided by any of the providers described herein.

At step 2402, upon detecting the occurrence of the event, the central processing computer 11 can process the information regarding the existence of and/or the availability of the respective campaign and/or campaign-related goods, products, and/or services, in conjunction with the postings from the various individuals, users, candidates, campaigns, campaign staff members, political party or political parties, and/or organizations, in order to ascertain the existence and identities of the respective individuals, users, candidates, campaigns, campaign staff members, political party or political parties, and/or organizations, who or which may desire to obtain the respective campaign and/or campaign-related goods, products, and/or services.

At step 2403, the central processing computer 11 generate a user notification message, for the respective individual, user, candidate, campaign, campaign staff member, political party, and/or organization, and can transmit the same to the user communication device 20 of, or associated with, the respective individual, user, candidate, campaign, campaign staff member, political party, and/or organization.

In a preferred embodiment, the user notification message can contain the identity and/or contact information for each of the providers identified or included in the user notification message. The user notification message can also contain information regarding the cost or price of or for the respective goods, products, and/or services. The user notification message, as well as any of the information transmitted to the user or the user communication device 20, can also be transmitted as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

At step 2403, the central processing computer 11 can also generate a provider notification message and can transmit the same to each provider identified in the user notification message and/or who or which can fulfill the request, need, or desire, of the respective individual, user, candidate, campaign, campaign staff member, political party, and/or organization.

In a preferred embodiment, the provider notification message can contain the identity and/or contact information regarding the respective individual, user, candidate, campaign, campaign staff member, political party, and/or organization. In a preferred embodiment, the provider notification message can also contain the price which the individual, user, candidate, campaign, campaign staff member, political party, and/or organization is willing to pay for the respective goods, products, and/or services. In a preferred embodiment, the provider notification message, as well as any of the information contained therein, can be transmitted from the central processing computer 11 to the provider computer 60 of or associated with each identified provider, and can also be transmitted as an e-mail transmission, an e-mail message, an instant message, a text message, an SMS message, an MMS message, an electronic transmission, a telephone message, a letter mail delivery, a telephone transmission, a facsimile transmission, a beeper or a pager message, and/or via any other notification means or method.

Thereafter, at step 2404, the respective parties can contact each other and can enter into any agreements and/or contracts related to the obtaining and/or the providing of the respective goods, products, and/or services. At step 2405, the central processing computer 11 can record any data and/or information regarding any transactions which may occur at step 2404 between the respective parties and can store said data and/or information in the database 11H. Thereafter, the operation of the apparatus 100 will cease at step 2406.

In another preferred embodiment, the apparatus 100 and methods of the present invention can be utilized in order to conduct a poll, polls, a survey, or surveys, for any of the users, individuals, candidates, campaigns, political parties, and/or organizations, described herein.

Figure 25A:
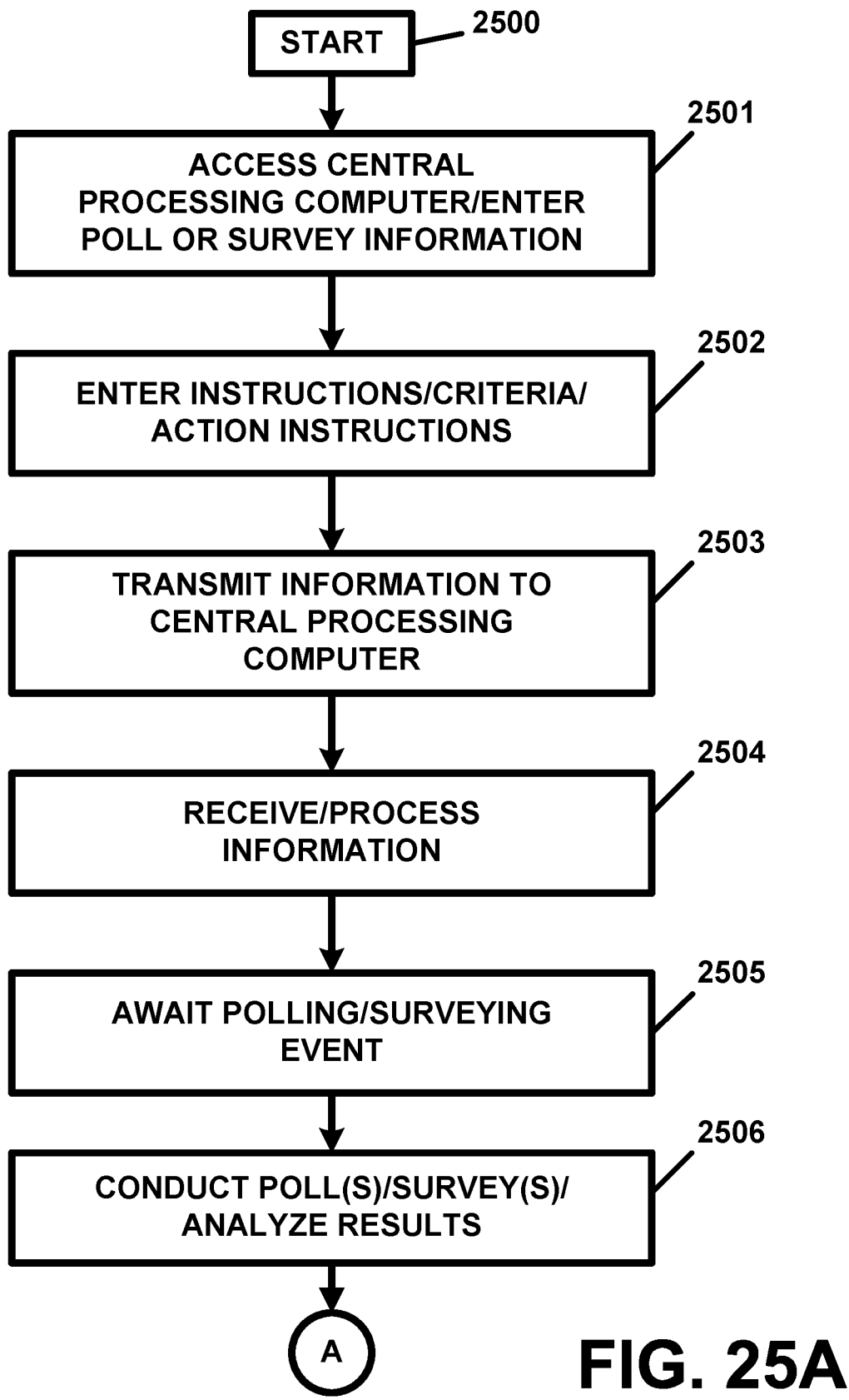
FIGS. 25A and 25B illustrate another preferred embodiment method for utilizing the apparatus of the present invention, in flow diagram form.
Figure 25B:
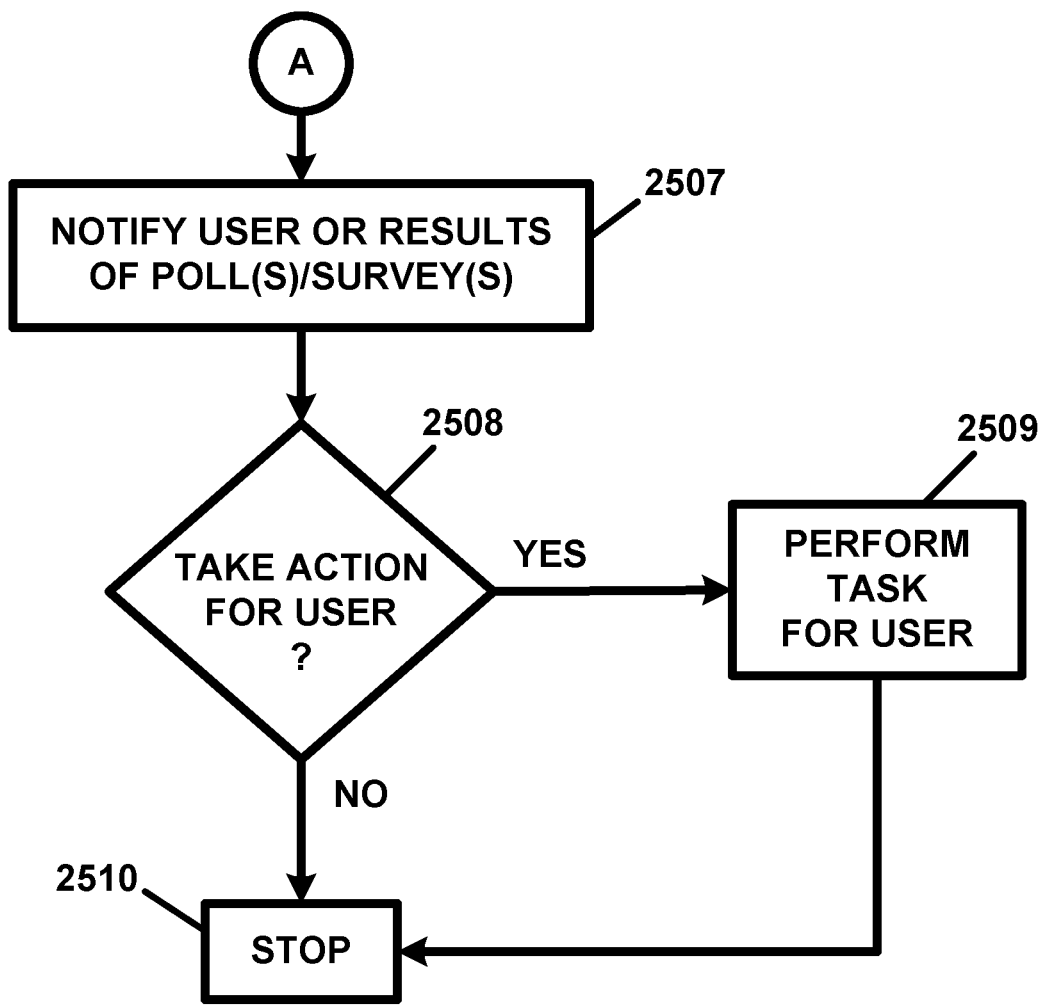

In a preferred embodiment, the apparatus 100 and methods of the present invention and/or the central processing computer 11 can be programmed to analyze the results of a poll, polls, a survey, or surveys, identify areas of weakness or vulnerability, and disseminate campaign materials to targeted voters, groups or voters, and/or areas, in order to attempt to overcome the weakness or vulnerability. FIGS. 25A and 25B illustrate another preferred embodiment method for utilizing the apparatus 100 and methods of the present invention.

With reference to FIGS. 25A and 25B, the operation of the apparatus 100 commences at step 2500. At step 2501, a respective user, individual, candidate, campaign, political party, and/or organization, can access the central processing computer 11 via the user communication device 20. At step 2501, the respective user, individual, candidate, campaign, political party, and/or organization, can enter information regarding the type of poll, polls, survey, or surveys, for or from which he or she desires to obtain information. For example, the respective user, individual, candidate, campaign, political party, and/or organization, can enter information for requesting or obtaining information regarding candidate approval, candidate popularity, issue sentiment, or any other any other subject or matter.

At step 2501, the respective user, individual, candidate, campaign, political party, and/or organization, can also enter or request that multiple polls or surveys be performed. At step 2502, the respective user, individual, candidate, campaign, political party, and/or organization, can enter information regarding the frequency and/or other criteria for conducting poll, polls, survey, and/or surveys. For example, the frequency and/or other criteria for conducting a poll, polls, a survey, and/or surveys, can include the specific time intervals for conducting a poll, polls, a survey, and/or surveys, that a poll, polls, a survey, and/or surveys, be conducted at specific times during a campaign, or after a debate(s), or after a certain event(s) and/or activities, or after the issuance of certain press releases and/or after the dissemination of campaign literature, or after the taking of other polls or surveys.

At step 2502, the respective user, individual, candidate, campaign, political party, and/or organization, can also enter any action(s) which the respective user, individual, candidate, campaign, political party, and/or organization, desires that the central processing computer 11 take or perform on his, her, or its behalf. For example, the respective user, individual, candidate, campaign, political party, and/or organization, can program, or can request that, the central processing computer 11 to perform targeted campaign literature dissemination or transmissions to certain voters, voter groups, election districts, election districts identified as being an area of concern or identified as being an area of weakness or vulnerability, to order the shipping of campaign goods and/or products, to order campaign services, to order or run campaign commercial programming, to order or run campaign advertisements, to issue or to disseminate press releases, and/or to perform any other desired task or function for, or on behalf of, the respective user, individual, candidate, campaign, political party, and/or organization.

Any of the polls, surveys, campaign literature, campaign goods, products, and/or services, and/or other information and/or materials, which specified by the respective user, individual, candidate, campaign, political party, and/or organization, can be pre-selected and can information regarding the same can be entered into the central processing computer 11 at any time.

At step 2503, any and/or all of the entered information and/or instructions can be transmitted from the user communication device 20 to the central processing computer 11. At step 2504, the central processing computer 11 can receive and process the user entered and/or transmitted information and/or instructions. At step 2505, the central processing computer 11 can then await the polling or the surveying event.

At step 2506, the central processing computer 11, can process information fro conducting, and/or conduct, the poll, polls, survey, and/or surveys, and can analyze and process the results of the poll, the polls, the survey, and/or the surveys. At step 2507, the central processing computer 11 can notify the respective user, individual, candidate, campaign, political party, and/or organization, of the results of the poll, the polls, the survey, and/or the surveys.

At step 2508, the central processing computer 11 can determine if the results of the poll, the polls, the survey, and/or the surveys, are such so as to require that the central processing computer 11 take any specified action and/or perform any specified task for, or on behalf of, the respective user, individual, candidate, campaign, political party, and/or organization. For example, the candidate could have instructed the central processing computer 11 to disseminate campaign literature via e-mail, an instant message, a text message, an SMS message, an MMS message, an electronic transmission, an automated telephone call message, letter mail, and/or via any other method or means, to targeted voters, certain voters, voter groups, voting areas, election districts, and/or election districts identified as being an area of concern or identified as being an area of weakness or vulnerability, in response to a low candidate popularity polling score.

If, at step 2508, it is determined that the central processing computer 11 is to perform a task(s) or function(s) for, or on behalf of, the respective user, individual, candidate, campaign, political party, and/or organization, then the operation of the apparatus 100 will proceed to step 2509 and the central processing computer 11 can perform the task(s) or the function(s). Thereafter, the operation of the apparatus 100 will cease at step 2510.

If, however, at step 2508, it is determined that the central processing computer 11 is not required to perform a task or function for, or on behalf of, the respective user, individual, candidate, campaign, political party, and/or organization, then the operation of the apparatus 100 will proceed directly to step 2510 and the operation of the apparatus 100 will cease.

In another preferred embodiment of each of the preferred embodiments of each of FIGS. 18A and 18B, 19A and 19B, 20A and 20B, 21, 22A and 22B, 23, 24, and 25A and 25B, and/or in any and/or all of the other embodiments described herein, any data and/or information regarding any action taken, and/or any transaction performed, by any respective user, individual, candidate, campaign, governmental entity, political party, and/or organization, can be stored by the central processing computer 11 in the database 11H of the same, and/or can also be stored in the distributed ledger/Blockchain technology system 12 of the central processing computer/distributed ledger/Blockchain technology system 10.

In another preferred embodiment, the apparatus 100 and/or the central processing computer 11 can be programmed to become automatically activated and/or self-activated upon a detection of a completion of a next the polling event or a next surveying event and/or can be programmed to perform any number of task(s) or function(s) for, or on behalf of, the respective user, individual, candidate, campaign, political party, and/or organization. In this manner, the apparatus 100 of the present invention can perform programmed campaign and/or programmed campaigning functions or tasks for, or on behalf of, any of the respective users, individuals, candidates, campaigns, political party or political parties, and/or organizations, described herein.

In any and/or all of the embodiments described herein, the apparatus 100 and method of the present invention can also be utilized by any of the respective users, individuals, candidates, campaigns, political party or political parties, and/or organizations, described herein, in order to bid for, and/or to auction off, any of the campaign and/or campaign-related goods, products, and/or services, described herein, and/or any other goods, products, and/or services, which can be utilized in a campaign and/or in an election.

In any and/or all of the embodiments described herein, the apparatus 100 and methods of the present invention can also be utilized in order to provide recruitment services and/or to facilitate recruitment activities for, or regarding, any campaign and/or campaign-related positions and/or jobs.

In another preferred embodiment, the apparatus 100 and methods of the present invention can also be utilized in order to administer and/or to manage financial accounts, such as by utilizing the financial institution computers 90 described herein, and/or to transmit and/or to receive payments and/or a funds transfer, for, or on behalf of, any of the respective users, individuals, candidates, campaigns, political party or political parties, and/or organizations, described herein.

The apparatus 100 and methods of the present invention can be utilized in order to perform secured and informed on-line voting in any of the herein-described elections and/or campaigns. In such a preferred embodiment, any voter may vote in any election by casting his or her vote via his or her user communication device 20 and/or via a kiosk. In a preferred embodiment, the voter's vote or ballot can be transmitted to the central processing computer 11 and, thereafter, can be transmitted to the respective public election administrator/governmental entity computer 40 or private election administrator computer 50. In another preferred embodiment, the voter's vote or ballot can be transmitted directly from the user communication device 20 to the respective public election administrator/governmental entity computer 40 or private election administrator computer 50.

In another preferred embodiment, the apparatus 100 and/or the central processing computer 11 can receive campaign contributions and/or campaign donations for, or on behalf of, any of the candidates, campaigns, political parties, and/or organizations, described herein.

In another preferred embodiment, the apparatus 100 and methods of the present invention can be utilized in order to monitor the activities of registered voters, eligible voters, or eligible participants, in and/or during an election. The central processing computer 11 can monitor the respective individuals who have voted or cast ballots, determine and/or identity the individuals who have not yet voted or cast ballots, and transmit a message to the respective user communication devices 20 of or associated with each of the identified individuals. In a preferred embodiment, the message can be transmitted from any candidate, campaign, political party, or organization, and/or can include information reminding the individual to vote or cast a ballot, and/or can contain information for promoting, or for requesting support and/or a vote(s), for a particular candidate, campaign, political party, or organization. In this manner, the apparatus 100 and methods of the present invention can also be programmed to promote voting or ballot casting in an election, to promote or campaign for a candidate(s), campaign(s), political party or political parties, or organization(s), and/or to perform "get-out-the-vote" activities or functions.

In another preferred embodiment, the apparatus 100 and/or the central processing computer 11 can also administer and/or manage financial accounts for any of the users, candidates, campaigns, groups of candidates, political parties, public elections administrators, private elections administrators, campaign administrators and/or campaign workers, goods providers, products providers, service providers, external information sources, media entities, social networks, financial institutions, individuals, organizations, associations, political action committees, and/or any other entities, who or which utilize the apparatus 100 of the present invention. In this manner, the apparatus 100 and/or the central processing computer 11 can effectuate financial and/or monetary transfers to, from, and/or between, any of the financial accounts for any of the parties described herein, thereby providing a billing and payment clearing platform for any of the financial transactions which can be facilitated by, and/or which can occur in conjunction with, use of the apparatus 100 and methods of the present invention.

In any and/or all of the embodiments described herein, the apparatus 100 and methods of the present invention can also be utilized as a clearinghouse for buying and for selling campaign goods, campaign products, campaign services, campaign-related goods, campaign-related products, and/or campaign-related services.

In another preferred embodiment, the apparatus 100 and/or the central processing computer 11 can also administer and/or manage financial accounts for any of the providers and/or clients described herein. In this manner, the apparatus 100 and/or the central processing computer 11 can also effect financial and/or monetary transfers to, from, and/or between, any of the financial accounts for any of the parties described herein, thereby providing a billing and payment clearing platform for any of the financial transactions which can be facilitated by the apparatus 100 and method of the present invention.

In any and/or all of the embodiments described herein, any of the operations, tasks, and/or functions, described herein can also be implemented by and/or executed by intelligent agents, software agents, and/or mobile agents. The respective intelligent agent (s), software agent(s), mobile agent(s), (hereinafter referred to collectively as "intelligent agent" or "intelligent agents") can be programmed and/or can be designed to act on behalf of any of the respective users, individuals, candidates, campaigns, political parties, organizations, elections administrators, providers, media entities, external information sources, social networks, financial institutions, and/or any other individuals and/or entities, described herein and/or otherwise, who or which utilize the apparatus 100 and methods of the present invention. In a preferred embodiment, an intelligent agent can act on behalf of a respective party in performing any of the activities described herein. In this regard, the apparatus 100 of the present invention can be utilized in order to provide an agent-based apparatus and method for providing campaign information and/or campaign-related information.

In another preferred embodiment, as well as any and/or all of the embodiments described herein, the apparatus 100 of the present invention and/or the central processing computer 11, and/or any of the communication devices or computers 20, 30, 40, 50, 60, 70, 80, 85, and/or 90, described herein, can also be programmed to be self-activating, self-operating, automatically activated, and/or automatically operated.

In another preferred embodiment, as well as any and/or all of the embodiments described herein, any and/or all of the communications, as well as any of the data and/or information transmissions, which are described as occurring between any of the herein-described users, individuals, candidates, campaigns, administrators, providers, media entities, external information sources, and/or financial institutions, and/or any communications and/or data and/or information transmissions between and/or among any of the computers or communication devices 10, 20, 30, 40, 50, 60, 70, 80, 85, and/or 90, can be encrypted in any appropriate manner so as to provide for secured communications and/or transmissions. In this manner, the apparatus 100 of the present invention can provide for secured and/or confidential communications and/or transmissions between any of the respective parties who or which utilize the apparatus 100 and methods of the present invention.

In any and/or all of the embodiments described herein, any of the herein-described candidate information for or regarding a candidate can also include negative information regarding the candidate's opponent. In any and/or all of the embodiments described herein, any of the herein-described information regarding a referendum issue can also contain negative information regarding the positions for or against the referendum issue or negative information regarding people or organizations who or which are for or against the referendum issue.

In any and/or all of the preferred embodiments, and/or any of the other embodiments, described herein, the apparatus 100 and methods of the present invention can be utilized in connection with public elections, general elections, primary elections, campaigns, elections for any public office, private elections, entity or organizational elections, voting activities regarding contests, tournaments, competitive events, or pageants, of any type or kind, and/or in conducting polling, marketing, and/or survey, campaigns.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. An apparatus, comprising:
    a central processing computer, wherein the central processing computer further comprises:
        a receiver;
        a processor;
        a database; and
        a transmitter; and
    a distributed ledger and Blockchain technology system,
    wherein the central processing computer receives voter account sign-in information for a voter account of an individual, wherein the voter account sign-in information is transmitted from a first user communication device, wherein the central processing computer processes the voter account sign-in information and identifies the voter account of the individual, and further wherein the central processing computer provides access to the voter account, and further wherein the central processing computer receives a digital file containing information regarding a picture, a photograph, or a video clip, of the individual, wherein the picture, the photograph, or the video clip, of the individual, is obtained or recorded by the first user communication device, and further wherein the central processing computer generates a voter account use message and transmits the voter account use message to the first user communication device or to a second user communication device,
    wherein the central processing computer receives a request to access an electronic voting forum and to obtain an electronic voting ballot for an election, wherein the central processing computer processes information regarding the request to access the electronic voting forum and to obtain the electronic voting ballot for the election, and further wherein the central processing computer determines whether or not the individual has already voted in the election, and further wherein, if the central processing computer determines that the individual has already voted in, or has already cast a ballot in, the election, the central processing computer generates a voting denial message, and further wherein the central processing computer transmits the voting denial message to the first user communication device, and further wherein the central processing computer stores the voting denial message and the digital file containing the information regarding the picture, the photograph, or the video clip, of the individual, in the database, and further wherein, if the central processing computer determines that the individual has not already voted in the election, the central processing computer provides the electronic voting forum and the electronic voting ballot to the first user communication device,
    wherein the election pertains to an elected office race or pertains to a referendum issue, and wherein the electronic voting ballot contains information regarding the elected office race or the referendum issue, and further wherein the electronic voting ballot also contains a link or a hyperlink to information regarding a candidate in the elected office race or information regarding the referendum issue, wherein the information regarding the candidate includes the candidate's campaign contact information, the candidate's campaign platform, the candidate's education or work experience, the candidate's past voting history, the candidate's campaign commercials, campaign literature, campaign video, or a video clip of the candidate, or the candidate's website or the candidate's campaign website, or wherein the information regarding the referendum issue includes information on or regarding positions in favor of the referendum issue, information on or regarding positions against the referendum issue, people or organizations in favor of the referendum issue, or people or organizations against the referendum issue,
    wherein the apparatus provides to the first user communication device, via the electronic voting forum and during voting activity, the information regarding the candidate or candidates in the elected office race, or the information regarding the referendum issue, prior to any voting for any candidate or candidates in the elected office race or prior to any voting on the referendum issue,
    wherein the central processing computer receives and stores information transmitted from the first user communication device regarding a vote cast or any number of votes cast by the individual in the election and in the electronic voting forum, and via or pursuant to the electronic voting ballot, and further wherein the central processing computer stores information regarding the vote cast or the any number of votes cast by the individual, and further wherein the apparatus stores information regarding the vote cast or the any number of votes cast by the individual in the distributed ledger and Blockchain technology system, and further wherein the apparatus generates a voting confirmation message and transmits the voting confirmation message to the first user communication device, wherein the voting confirmation message contains information regarding the date and time the individual voted in the election and a link or a hyperlink to the voter account use message and the digital file containing the information regarding the picture, the photograph, or the video clip, of the individual, and further wherein the central processing computer stores the voter account use message, the voting confirmation message, or the digital file, in the database, and further wherein the central processing computer stores information regarding a date and a time the electronic voting forum was accessed, information regarding a date and a time the central processing computer received information regarding the vote cast or the votes cast, and information regarding a date and a time the electronic voting forum was closed, in the database and in the distributed ledger and Blockchain technology system.

2. The apparatus of claim 1, wherein the apparatus stores the voting confirmation message in the distributed ledger and Blockchain technology system.

3. The apparatus of claim 1, wherein the apparatus transmits information regarding the vote cast or the any number of votes cast by the individual to a computer associated with a governmental entity or a public election administrator.

4. The apparatus of claim 1, wherein the electronic voting ballot is provided in, or in conjunction with, the electronic voting forum, wherein the electronic voting forum and the electronic voting ballot is provided to, or transmitted to, the first user communication device, and further wherein the electronic voting forum and the electronic voting ballot is viewable via a display device of the first user communication device.

5. The apparatus of claim 1, wherein the apparatus processes information for generating an official vote tally or a vote count.

6. The apparatus of claim 1, wherein the apparatus processes information for generating an official vote tally or a vote count, and further wherein the apparatus stores the information regarding the official vote tally or the vote count in the distributed ledger and Blockchain technology system.

7. The apparatus of claim 1, wherein the apparatus processes information for generating an official vote tally or a vote count, and further wherein the apparatus transmits the information regarding the official vote tally or the vote count to a computer associated with a governmental entity or a public election administrator.

8. The apparatus of claim 1, wherein the apparatus generates and stores information indicating that the individual has voted in the election, and further wherein the apparatus transmits the information indicating that the individual has voted in the election to a computer associated with a governmental entity or a public election administrator.

9. The apparatus of claim 1, wherein the apparatus generates and stores information indicating that the individual has voted in the election, and further wherein the apparatus stores the information indicating that the individual has voted in the election in the distributed ledger and Blockchain technology system.

10. The apparatus of claim 1, wherein the first user communication device is a kiosk, and further wherein the kiosk further comprises:
an RFID reader, wherein the RFID reader reads or obtains data from an RFID tag associated with the voter account.

11. The apparatus of claim 1, wherein the first user communication device is a personal computer, a laptop computer, or a tablet computer.

12. The apparatus of claim 1, wherein the first user communication device is an interactive television.

13. The apparatus of claim 1, wherein the apparatus transmits an electronic nominating petition regarding the elected office race or regarding a second elected office race to the second user communication device or to a third user communication device.

14. The apparatus of claim 1, wherein the apparatus receives an electronically signed signature page for a nominating petition regarding the elected office race or a second elected office race.

15. The apparatus of claim 1, wherein the apparatus processes information for submitting a nominating petition regarding the elected office race or a second elected office race, and further wherein the apparatus transmits the nominating petition electronically to a computer associated with a governmental entity or a public election administrator.

16. The apparatus of claim 1, wherein the apparatus processes information for transmitting a nominating petition to a plurality of user communication devices, wherein each of the plurality of user communication devices is associated with a registered voter.

17. The apparatus of claim 1, wherein the apparatus transmits an on-line campaign forum to the first user communication device or to a third user communication device, wherein the on-line campaign forum provides election information, candidate information, referendum issue information, a candidates debate, or an on-line town hall meeting.

18. The apparatus of claim 1, wherein the apparatus processes information regarding a second request for access to the electronic voting forum or a second request for an electronic voting ballot for the election or for a second election, and further wherein the apparatus determines that the individual has already voted in the election or in the second election, or has already cast a ballot in the election or in the second election, and further wherein the apparatus generates a voting denial message, and further wherein the apparatus transmits the voting denial message to the first user communication device or to a third user communication device.

19. The apparatus of claim 1, wherein the apparatus processes information for conducting an election regarding a contest, a competition, a tournament or a pageant.

20. The apparatus of claim 1, wherein the apparatus processes information for conducting a marketing campaign, a polling activity, or a survey.

21. A computer-implemented method, comprising:
receiving, with or using a central processing computer, voter account sign-in information for a voter account of an individual, wherein the voter account sign-in information is transmitted from a first user communication device;
processing, with or using the central processing computer, the voter account sign-in information;

identifying, with or using the central processing computer, the voter account of the individual;

providing, with or using the central processing computer, access to the voter account;

receiving, with or using the central processing computer, a digital file containing information regarding a picture, a photograph, or a video clip, of the individual, wherein the picture, the photograph, or the video clip, of the individual, is obtained or recorded by the first user communication device;

generating, with or using the central processing computer, a voter account use message;

transmitting, from or using the central processing computer, the voter account use message to the first user communication device or to a second user communication device;

receiving, with or using the central processing computer, a request to access an electronic voting forum and to obtain an electronic voting ballot for an election;

processing, with or using the central processing computer, information regarding the request to access the electronic voting forum and to obtain the electronic voting ballot for the election;

determining, with or using the central processing computer, whether or not the individual has already voted in the election, and further wherein, if the central processing computer determines that the individual has already voted in, or has already cast a ballot in, the election, generating, with or using the central processing computer, a voting denial message, and transmitting, with or using the central processing computer, the voting denial message to the first user communication device, and storing, in a database of the central processing computer, the voting denial message and the digital file containing the information regarding the picture, the photograph, or the video clip, of the individual, and further wherein, if the central processing computer determines that the individual has not already voted in the election, providing, with or using the central processing computer, the electronic voting forum and the electronic voting ballot to the first user communication device, wherein the election pertains to an elected office race or pertains to a referendum issue, and wherein the electronic voting ballot contains information regarding the elected office race or the referendum issue, and further wherein the electronic voting ballot also contains a link or a hyperlink to information regarding a candidate in the elected office race or information regarding the referendum issue, wherein the information regarding the candidate includes the candidate's campaign contact information, the candidate's campaign platform, the candidate's education or work experience, the candidate's past voting history, the candidate's campaign commercials, campaign literature, campaign video, or a video clip of the candidate, or the candidate's website or the candidate's campaign website, or wherein the information regarding the referendum issue includes information on or regarding positions in favor of the referendum issue, information on or regarding positions against the referendum issue, people or organizations in favor of the referendum issue, or people or organizations against the referendum issue;

providing, with or using the central processing computer, to the first user communication device, via the electronic voting forum and during voting activity, the information regarding the candidate or candidates in the elected office race, or the information regarding the referendum issue, prior to any voting for any candidate or candidates in the elected office race or prior to any voting on the referendum issue;

receiving and storing, with or using the central processing computer, information transmitted from the first user communication device regarding a vote cast or any number of votes cast by the individual in the election and in the electronic voting forum, and via or pursuant to the electronic voting ballot;

storing, with or using the central processing computer, information regarding the vote cast or the any number of votes cast by the individual;

storing, with or using the central processing computer, information regarding the vote cast or the any number of votes cast by the individual in a distributed ledger and Blockchain technology system;

generating, with or using the central processing computer, a voting confirmation message;

transmitting, with or using the central processing computer, the voting confirmation message to the first user communication device, wherein the voting confirmation message contains information regarding the date and time the individual voted in the election and a link or a hyperlink to the voter account use message and the digital file containing the information regarding the picture, the photograph, or the video clip, of the individual;

storing, in the database of the central processing computer, the voter account use message, the voting confirmation message, or the digital file;

storing, in the database of the central processing computer and in the distributed ledger and Blockchain technology system, information regarding a date and a time the electronic voting forum was accessed, information regarding a date and a time the central processing computer received information regarding the vote cast or the votes cast, and information regarding a date and a time the electronic voting forum was closed.

* * * * *